(12) United States Patent
Gutmann et al.

(10) Patent No.: US 10,683,937 B2
(45) Date of Patent: Jun. 16, 2020

(54) BUTTERFLY VALVE

(71) Applicant: Hayward Industries, Inc., Berkeley Heights, NJ (US)

(72) Inventors: Paul M. Gutmann, Knoxville, TN (US); Joshua Lee Hoots, Clemmons, NC (US); Gary A. Moren, Advance, NC (US); Jon Terence Stone, Clemmons, NC (US)

(73) Assignee: Hayward Industries, Inc., Berkeley Heights, NJ (US)

( * ) Notice: Subject to any disclaimer, the term of this patent is extended or adjusted under 35 U.S.C. 154(b) by 0 days.

(21) Appl. No.: 15/372,705

(22) Filed: Dec. 8, 2016

(65) Prior Publication Data
US 2017/0089468 A1 Mar. 30, 2017

Related U.S. Application Data

(62) Division of application No. 13/954,130, filed on Jul. 30, 2013, now Pat. No. 9,989,154.

(51) Int. Cl.
*F16K 1/22* (2006.01)
*F16K 31/60* (2006.01)
(Continued)

(52) U.S. Cl.
CPC ............ *F16K 1/221* (2013.01); *F16K 1/224* (2013.01); *F16K 15/026* (2013.01);
(Continued)

(58) Field of Classification Search
CPC .......... F16K 1/22; F16K 1/2268; F16K 1/222; F16K 1/225; F16K 1/224; F16K 27/0218; F16K 27/0272; F16K 1/221
(Continued)

(56) References Cited

U.S. PATENT DOCUMENTS 2,076,839 A 4/1937 Heggern
2,077,997 A 4/1937 Hedene
(Continued)

FOREIGN PATENT DOCUMENTS

AT 350864 B 6/1979
DE 2325623 A1 12/1974
(Continued)

OTHER PUBLICATIONS

B1-RLO Wafer Style PVC Butterfly Valve, Matco-Norca, Date Unknown—Applicant Admitted Prior Art (1 page).
(Continued)

*Primary Examiner* — Mary E McManmon
*Assistant Examiner* — Nicole Gardner
(74) *Attorney, Agent, or Firm* — McCarter & English, LLP

(57) ABSTRACT

Exemplary embodiments are directed to butterfly valves, generally including a body assembly. The body assembly generally includes a body, a disc rotationally disposed inside an opening of the body, a bearing disposed inside the disc and the body, and a stem passing through the disc, the bearing and the body. The bearing generally includes an internal bearing edge. The stem generally includes an external stem edge to engage the internal bearing edge to prevent stem blowout from the body. Methods of assembling and positioning a butterfly valve are also provided.

24 Claims, 42 Drawing Sheets

(51) Int. Cl.
*F16K 35/02* (2006.01)
*F16K 15/02* (2006.01)
*F16K 31/53* (2006.01)
*F16K 35/10* (2006.01)
*F16K 37/00* (2006.01)
*G05G 1/12* (2006.01)

(52) U.S. Cl.
CPC .......... *F16K 31/535* (2013.01); *F16K 31/602* (2013.01); *F16K 35/022* (2013.01); *F16K 35/025* (2013.01); *F16K 35/10* (2013.01); *F16K 37/0016* (2013.01); *G05G 1/12* (2013.01); *Y10T 137/0525* (2015.04)

(58) Field of Classification Search
USPC .............................................. 251/308, 305
See application file for complete search history.

(56) References Cited

U.S. PATENT DOCUMENTS

| | | | |
|---|---|---|---|
| 2,161,509 A | 6/1939 | Farber | |
| 2,271,475 A | 1/1942 | Clade | |
| 2,780,333 A | 2/1957 | Hyman et al. | |
| 2,815,058 A | 12/1957 | Neuschotz | |
| 2,936,014 A | 5/1960 | Kraus et al. | |
| 3,016,226 A | 1/1962 | Freeman | |
| 3,024,802 A | 3/1962 | Stillwagon | |
| 3,078,069 A * | 2/1963 | Broadbent | F16K 1/228 251/173 |
| 3,173,650 A | 3/1965 | Cotterman | |
| 3,311,128 A | 3/1967 | Taylor | |
| 3,341,170 A | 9/1967 | Housworth | |
| 3,355,141 A | 11/1967 | Cooper | |
| 3,403,718 A | 10/1968 | Hughes | |
| 3,447,780 A | 6/1969 | Hobson | |
| 3,497,890 A | 3/1970 | Coyle | |
| 3,537,473 A | 11/1970 | DeZurik | |
| 3,552,434 A | 1/1971 | Haenky | |
| 3,565,394 A | 2/1971 | Smith | |
| 3,591,127 A | 7/1971 | Luger et al. | |
| 3,692,276 A | 9/1972 | Conners et al. | |
| 3,778,028 A | 12/1973 | Graves et al. | |
| 3,808,895 A | 5/1974 | Fitzwater | |
| 3,858,843 A | 1/1975 | Hartmann | |
| 3,904,173 A | 9/1975 | Naylor | |
| 4,093,180 A | 6/1978 | Strabala | |
| 4,133,513 A * | 1/1979 | Meyer | F16K 1/2268 251/306 |
| 4,173,150 A | 11/1979 | Gray | |
| 4,176,675 A | 12/1979 | Liberman | |
| 4,266,754 A | 5/1981 | Ninomiya et al. | |
| 4,358,086 A | 11/1982 | Hiltebrand | |
| 4,516,597 A * | 5/1985 | Ueda | F16K 1/2265 137/314 |
| 4,815,693 A | 3/1989 | James | |
| 4,961,443 A | 10/1990 | Buccicone et al. | |
| 4,967,779 A | 11/1990 | Scobie | |
| 5,029,917 A | 7/1991 | Szerlag et al. | |
| 5,062,328 A | 11/1991 | Demurger | |
| 5,299,597 A | 4/1994 | Fort et al. | |
| 5,370,148 A | 12/1994 | Shafer | |
| 5,401,131 A | 3/1995 | Yoshino | |
| 5,490,660 A | 2/1996 | Kamezawa | |
| 5,533,232 A | 7/1996 | Boyer | |
| 5,544,675 A | 8/1996 | Dean | |
| 5,879,115 A | 3/1999 | Medal | |
| 6,189,860 B1 | 2/2001 | Sato et al. | |
| 6,193,456 B1 | 2/2001 | Stumpf et al. | |
| 6,378,841 B1 | 4/2002 | Russell | |
| 7,063,303 B2 * | 6/2006 | Makino | B29C 45/14 123/337 |
| 8,727,310 B2 * | 5/2014 | Helfer | F16K 41/026 251/214 |
| 9,695,947 B2 | 7/2017 | Gutmann et al. | |
| 9,702,480 B2 | 7/2017 | Hoots et al. | |
| 2007/0009341 A1 | 1/2007 | Nagayama | |
| 2007/0063157 A1 | 3/2007 | Miklo et al. | |
| 2008/0173841 A1 | 7/2008 | Sisk | |
| 2009/0114867 A1 | 5/2009 | Miller et al. | |
| 2010/0243937 A1 | 9/2010 | Bommann et al. | |
| 2010/0308246 A1 | 12/2010 | Witkowski et al. | |
| 2015/0071729 A1 | 3/2015 | Stone et al. | |

FOREIGN PATENT DOCUMENTS

| | | |
|---|---|---|
| DE | 2724007 A1 | 12/1978 |
| DE | 19922769 A1 | 11/1999 |
| EP | 0569931 A1 | 11/1993 |
| EP | 0667473 A1 | 8/1995 |
| EP | 1342942 A1 | 9/2003 |
| EP | 1750044 A1 | 2/2007 |
| GB | 1220141 A | 1/1971 |

OTHER PUBLICATIONS

Butterfly Valve type 57, Asahi/America (May 18, 2005) (4 pages).
Butterfly Valves, Spears Manufacturing Company, Inc. (Aug. 2004) (2 pages).
Notice of Allowance dated Dec. 14, 2017 issued in connection with U.S. Appl. No. 13/954,130 (5 pages).
Notice of Allowance dated Dec. 22, 2016, issued in connection with U.S. Appl. No. 14/020,719 (7 pages).
Notice of Allowance dated Jan. 25, 2018, issued in connection with U.S. Appl. No. 13/954,130 (7 pages).
Notice of Allowance dated Mar. 2, 2017, issued in connection with U.S. Appl. No. 14/020,719 (7 pages).
Office Action dated Aug. 24, 2016, issued in connection with U.S. Appl. No. 14/020,719 (11 pages).
Office Action dated Jan. 24, 2018, issued in connection with U.S. Appl. No. 15/372,747 (9 pages).
Office Action dated Jun. 9, 2016 from U.S. Appl. No. 13/954,130 (9 pages).
Office Action dated May 31, 2017, issued in connection with U.S. Appl. No. 13/954,130 (19 pages).
Office Action dated Sep. 7, 2016, issued in connection with U.S. Appl. No. 13/954,130 (22 pages).
European extended Search Report, dated Jan. 14, 2015, issued in connection with European Patent Application No. 14178895.0 (6 pages).
European extended Search Report, dated Mar. 30, 2016, issued in connection with European Patent Application No. 14178897.6 (10 pages).
European extended Search Report, dated Nov. 24, 2015, issued in connection with European Patent Application No. 14178898.4 (11 pages).
European Office Communication dated Jul. 25. 2016, issued in 22 connection with European Patent Application No. 14178898.4 (5 pages).
European partial Search Report, dated Jul. 21, 2015, issued in connection with European Patent Application No. 14178898.4 (6 pages).
European Search Report and Written Opinion for Application No. EP17174504.5 dated Dec. 1, 2017.
George Fischer Type 567 Wafer Style Butterfly Valve, George Fischer, Inc. (Mar. 2007) (4 pages).
Hayward Plastic Butterfly Valves, Bulletin BY-89, Hayward Industrial Products, Inc. (1989) (3 pages).
Keystone CompoSeal Resilient Seated Butterfly Valves, Pentair Ltd. (2009) (4 pages).
Mexican Patent Application No. MX/a/2014/009189, corresponding to U.S. Appl. No. 13/954,130, filed (239 pages).
New Composite Valve Range Launched by Tyco Flow Control, Valve User Magazine (Summer 2009) (2 pages).
Wafer Style Butterfly Valve for ANSI Flanges, Thermoplastic Valves Inc. (Jan. 1996) (1 page).
Office Action dated Sep. 7, 2016 from U.S. Appl. No. 13/954,130 (22 pages).

(56) References Cited

OTHER PUBLICATIONS

Office Action dated Oct. 20, 2016 from Mexican Application No. MX/a/2014/009189 (3 pages).
Office Action dated Oct. 31, 2016 from U.S. Appl. No. 14/691,148 (16 pages).
Office Action dated Sep. 24, 2015 from U.S. Appl. No. 14/020,632 (12 pages).
Australian first Examination Report issued in connection with Australian Patent Application No. 2014208193, dated Jun. 28, 2018 (5 pages).
European Office Action dated Jan. 29, 2019, issued in connection with European Patent Application No. 17174504.5 (5 pages).
Office Action dated Nov. 13, 2018, issued in connection with U.S. Appl. No. 15/372,822 (15 pages).
Office Action dated Oct. 12, 2018, issued in connection with U.S. Appl. No. 15/372,747 (14 pages).
Australian first Examination Report dated Jun. 7, 2018, issued in connection with Australian Patent Application No. 2014208197 (3 pages).
Office Action dated Mar. 7, 2018, issued in connection with U.S. Appl. No. 15/372,822 (9 pages).
Mexican Office Action dated Jul. 19, 2017, issued in connection with Mexican Patent Application No. MX/a/2014/009189 (with machine-generated English translation prepared using Google Translate) (8 pages).
Mexican Office Action dated Nov. 18, 2016, issued in connection with Mexican Patent Application No. MX/a/2014/009190 (3 pages).
Mexican Office Action dated Oct. 20, 2016, issued in connection with Mexican Patent Application No. MX/a/2014/009189 (with machine-generated English translation prepared using Google Translate) (7 pages).
Office Action dated Dec. 23, 2015, issued in connection with U.S. Appl. No. 14/020,719 (12 pages).
European partial Search Report, dated Nov. 11, 2015, issued in connection with European Patent Application No. 14178897.6 (6 pages).
Office Action dated Oct. 26, 2015, issued in connection with U.S. Appl. No. 13/954,130 (7 pages).
Australian Examination Report No. 2, dated Jun. 20, 2019, issued in connection with Australian Patent Application No. 2014208193 (7 pages).
Communication under Rule 71(3) EPC (Intention to Grant) dated Jun. 28, 2019, issued in connection with European Patent Application No. 17174504.5 (5 pages).
Office Action dated Jun. 25, 2019, issued in connection with U.S. Appl. No. 15/372,747 (13 pages).
Office Action dated Sep. 17, 2019, issued in connection with U.S. Appl. No. 15/372,822 (12 pages).
Office Action dated Dec. 30, 2019, issued in connection with U.S. Appl. No. 15/372,747 (15 pages).
Notice of Allowance dated Feb. 7, 2020, issued in connection with U.S. Appl. No. 15/372,822 (8 pages).
Australian Examination Report dated Mar. 26, 2020, issued in connection with Australian Patent Application No. 2019204517 (7 pages).
Interview Summary dated Mar. 30, 2020, issued in connection with U.S. Appl. No. 15/372,747 (5 pages).
Office Action dated Apr. 1, 2020, issued in connection with U.S. Appl. No. 16/143,679 (15 pages).
Notice of Allowance dated Apr. 14, 2020, issued in connection with U.S. Appl. No. 15/372,747 (9 pages).

\* cited by examiner

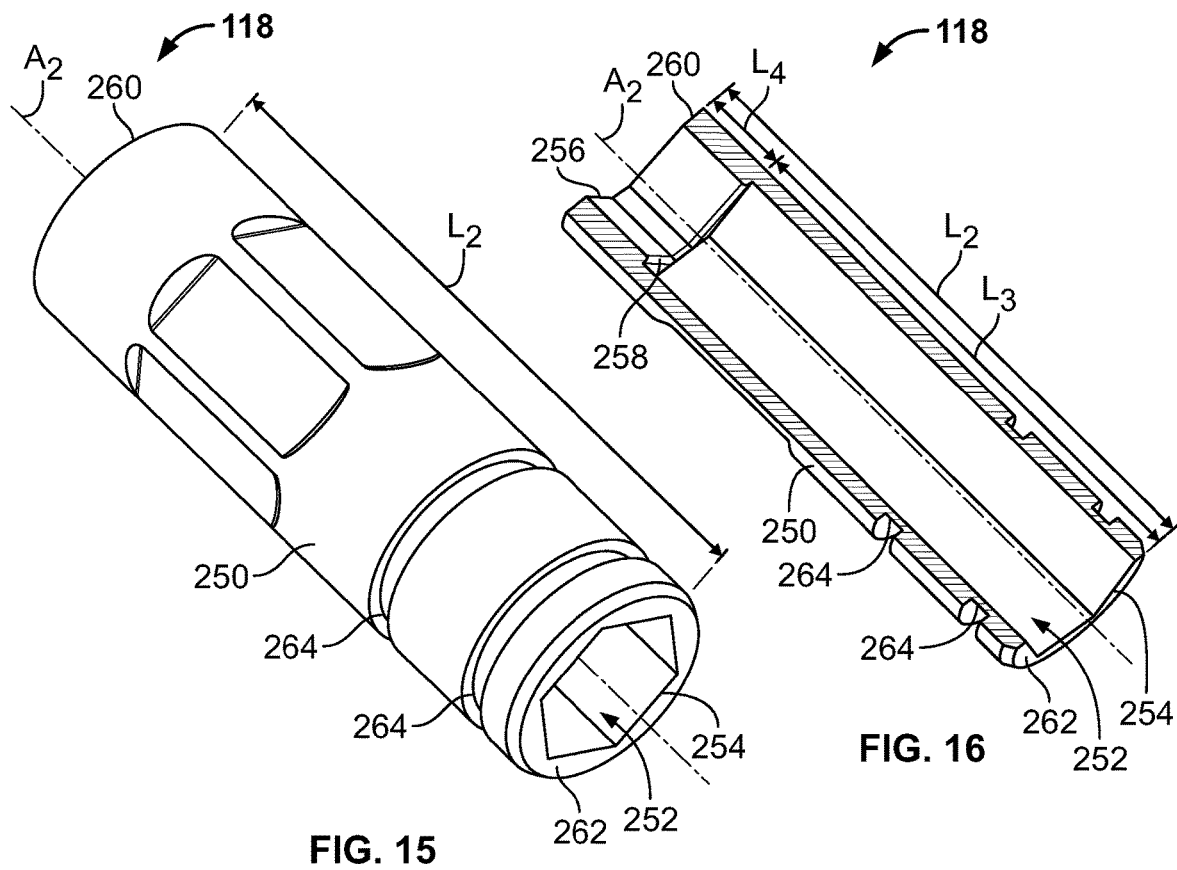
FIG. 15
FIG. 16
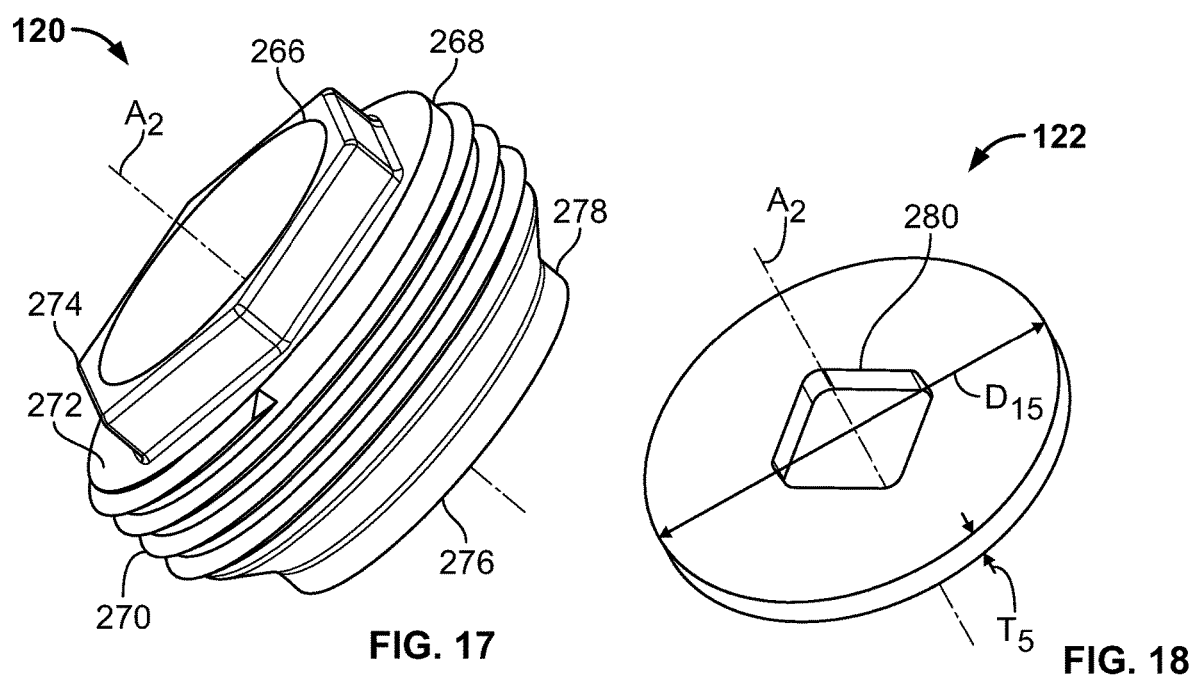
FIG. 17
FIG. 18

BUTTERFLY VALVE

CROSS-REFERENCE TO RELATED APPLICATIONS

The present application is a divisional application of, and claims the benefit of priority to, U.S. patent application Ser. No. 13/954,130, filed Jul. 30, 2013, which is hereby incorporated by reference in its entirety.

TECHNICAL FIELD

The present disclosure relates to butterfly valves and associated methods and, in particular, to butterfly valves for controlling the flow of fluid through a valve body.

BACKGROUND

A variety of butterfly valves are known in the industry for controlling a flow of fluid through a conduit from one location to another. The conduit can be through a pipe, to and from a container to the environment, from one side of a barrier to the other, and other places where controlled transfer of fluids or material is desired. A butterfly valve can generally be operated from a closed, no transfer position, to an open, full transfer position. When a butterfly valve is adjusted into a closed position, it inhibits transfer of fluids therethrough and is considered to be sealed. Some butterfly valves can provide bi-directional sealing and can allow bi-directional flow. Due to differing styles of design, some butterfly valves can have a preferred direction of flow and/or sealing. Some butterfly valves may be adjusted to be partially open, e.g., positioned between a closed position and an open position, to limit the rate of transfer of fluids or material through the valve. When positioned between a closed position and an open position, the flow rate through the valve can be reduced as compared to a fully open position.

However, some butterfly valve configurations may include drawbacks, such as potential leak paths and/or potential risks of losing the integrity of the sealing element, and may require an overly complicated manufacturing process.

Thus, despite efforts to date, a need remains for improved butterfly valves with a reduced risk of leak paths and/or part failure. These and other needs are addressed by the butterfly valves and associated methods of the present disclosure.

SUMMARY

In accordance with embodiments of the present disclosure, exemplary butterfly valves are provided that generally include a body assembly and a handle assembly. The body assembly includes a body, a disc rotationally disposed inside an opening of the body, a cog, and a stem passing through the disc and the body. In some embodiments, the body assembly includes a liner, bearing and a seal retainer. The handle assembly includes a handle body and force ring. The stem rotationally interlocks relative to the disc and the handle assembly. The cog and the force ring can engage to rotationally secure the disc relative to the body and the handle assembly.

The cog can include at least one male member and the force ring can include at least one female member engaging the at least one male member. In some embodiments, the cog includes at least one female member and the force ring includes at least one male member engaging the at least one female member. In some embodiments, the cog and the force ring can include male and female members configured as complementary splines which engage relative to each other. In some embodiments, the complementary splines of the cog and the force ring can mate by a total of 50 degrees or more. In some embodiments, at least one of the cog and the force ring includes a friction imparting surface. The at least one male member of the cog and the at least one female member of the force ring can radially extend approximately 360 degrees around a vertical axis of the cog and the force ring. In some embodiments, the at least one female member of the cog and the at least one male member of the force ring can radially extend approximately 360 degrees around a vertical axis of the cog and the force ring. The handle assembly can generally be rotatable within an approximately 90 degree arc relative to the body assembly. In some embodiments, the handle assembly can be rotatable within less than an approximately 90 degree arc relative to the body assembly. In some embodiments, the handle assembly can be rotatable within more than an approximately 90 degree arc relative to the body. The cog generally includes an integral stop, e.g., a protrusion, configured to regulate a rotational path of the handle assembly relative to the body assembly.

The at least one male member of the cog and the at least one female member of the force ring can be positioned at an approximately 45 degree angle relative to a stem axis. In some embodiments, the at least one female member of the cog and the at least one male member of the force ring can be positioned at an approximately 45 degree angle relative to a stem axis. In some embodiments, the complementary splines of the cog and the force ring can be positioned at an approximately 45 degree angle relative to a stem axis. In some embodiments, the force ring defines a male truncated conical shape and the cog defines a complementary female conical shape counter bore. In some embodiments, the cog defines a male truncated conical shape and the force ring defines a complementary female conical shape counter bore. In some embodiments, the force ring can define a flat cylindrical surface and the cog can define a complementary flat cylindrical surface.

The handle assembly can be removably attached relative to the body assembly. The butterfly valve can include a locking cap including at least one male member or female member to engage the cog to maintain a rotational position of the disc relative to the body when the handle assembly has been removed from the body assembly. In some embodiments, the handle assembly and/or the disc can be actuated relative to the body assembly via manual actuation, e.g., by hand. In some embodiments, the handle assembly can be detached from the body assembly and a power or automatic actuation mechanism, e.g., an electric actuator, a pneumatic actuator, a hydraulic actuator, and the like, can be mechanically connected to the stem of the body assembly to rotate the disc relative to the body. The body generally includes visual indicators detachably secured thereon corresponding to rotational positions of the disc relative to the body. The handle body generally includes at least one protrusion configured to at least partially surround one of the visual indicators of the body to indicate a rotational position of the disc relative to the body. In some embodiments, the handle body can include a bore configured and dimensioned to receive an insert and at least one key. The at least one key can be configured to fracture at a predetermined force level to prevent damage to components of the butterfly valve. In some embodiments, the butterfly valve can include a locking cap including at least one male member or female member to engage the cog to maintain a rotational position of the disc relative to the body. In some embodiments, the butterfly valve can include a locking cap including splines to engage the cog to maintain a rotational position of the disc relative to the body. In some embodiments, the cog can include a segment complementary to a protruding step of the handle body to regulate an orientation of the handle body relative to the body. In some embodiment, the cog can be rotated 180 degrees relative to the body to change the orientation of the handle body relative to the body.

In accordance with embodiments of the present disclosure, exemplary methods of positioning a butterfly valve are provided that generally include providing a body assembly and providing a handle assembly. The body assembly generally includes a body, a disc rotationally disposed inside an opening of the body, a cog, and a stem passing through the disc and the body. In some embodiments, the body assembly includes a liner, a bearing and a seal retainer. The handle assembly generally includes a handle body and a force ring. The methods include rotationally interlocking the stem relative to the disc and the handle assembly. The methods further include engaging the cog and the force ring to rotationally secure the disc relative to the body. In general, the methods include disengaging the cog and the force ring to rotate the handle assembly and the disc relative to the body. In some embodiments, the cog can include a segment complementary to the protruding step of the handle body to regulate an orientation of the handle body relative to the body. In some embodiments, the methods include rotating the cog 180 degrees relative to the body to change the orientation of the handle body relative to the body by 180 degrees.

In accordance with embodiments of the present disclosure, exemplary butterfly valves are provided that generally include a body assembly and a handle assembly. The body assembly generally includes a body and a disc rotationally disposed inside an opening of the body. The handle assembly generally includes a handle body, a force ring, a lever and a grip. The force ring, the lever and the grip can be disposed within the handle body. In some embodiments, the force ring, the lever and the grip can be pivotally secured relative to each other at least at two pivot points.

In general, the body assembly includes a cog. The cog and the force ring can engage to rotationally secure the cog and the force ring relative to each other. Actuating the grip of the handle assembly can simultaneously pivot the lever and the force ring to disengage the cog and the force ring. In some embodiments, actuating the grip of the handle assembly can simultaneously pivot the lever and the force ring to lift the force ring from the cog in a substantially parallel or horizontal orientation relative to the cog. The lever generally includes a pin and the grip generally includes a complementary slot for pivotally securing the lever relative to the grip. In general, the lever includes two protrusions and the force ring includes complementary slots for pivotally securing the force ring relative to the lever. In some embodiments, the force ring includes two protrusions and the lever includes complementary slots for pivotally securing the force ring relative to the lever.

In accordance with embodiments of the present disclosure, exemplary methods of actuating a butterfly valve are provided that generally include providing a body assembly and providing a handle assembly. The body assembly generally includes a body and a disc rotationally disposed inside an opening of the body. The handle assembly generally includes a handle body, a force ring, a lever and a grip. The methods generally include positioning the force ring, the lever and the grip within the handle body. In general, the methods include actuating the grip to regulate a position of the force ring relative to the cog. In some embodiments, the methods include pivotally securing the force ring, the lever and the grip relative to each other at least at two pivot points.

The body assembly generally includes a cog. The cog and the force ring can engage to rotationally secure the cog and the force ring relative to each other. In some embodiments, actuating the grip to regulate a position of the force ring can include simultaneously pivoting the lever and the force ring to disengage the cog and the force ring. In some embodiments, actuating the grip to regulate a position of the force ring can include simultaneously pivoting the lever and the force ring to lift the force ring from the cog in a substantially parallel or horizontal orientation relative to the cog.

In accordance with embodiments of the present disclosure, exemplary butterfly valves are provided that generally include a body assembly and a handle assembly. The body assembly generally includes a body, a liner disposed inside an opening of the body and a disc rotationally disposed inside the opening of the body. The body includes a male radial protrusion within an inner surface of the opening. The liner generally includes a female radial groove along an outer surface to interlock the liner with the male radial protrusion of the body. A section of the male radial protrusion can be configured as at least one of, e.g., a rectangle, a square, semi-toric, semi-elliptical toric, dovetail, a keyhole, a trapezoid, a triangle, and the like.

The male radial protrusion of the body can be centrally positioned within the inner surface of the opening. The female radial groove of the liner can be centrally positioned along the outer surface of the liner. When assembled, the centrally positioned male radial protrusion and the centrally positioned female radial groove can prevent movement of a center of the liner relative to the body during rotation of the disc within the liner. In some embodiments, the centrally positioned male radial protrusion and the centrally positioned female radial groove can prevent movement of a center of the liner relative to the body during rotation of the disc into a seated position.

In accordance with embodiments of the present disclosure, exemplary methods of assembling a butterfly valve are provided that generally include providing a body assembly and providing a handle assembly. The body assembly generally includes a body defining an opening, a liner, and a disc. The body generally includes a male radial protrusion within an inner surface of the opening that extends at least partially around. The liner generally includes a female radial groove along an outer surface to interlock the liner with the male radial protrusion of the body. The methods include interlocking the female radial groove of the liner with the male radial protrusion of the body to detachably position the liner within the opening of the body. The methods further include preventing movement of a center of the liner relative to the body during rotation of the disc within the liner with the centrally positioned male radial protrusion and the female radial groove.

In accordance with embodiments of the present disclosure, exemplary butterfly valves are provided that generally include a body assembly and a handle assembly. The body assembly generally includes a body, a disc rotationally disposed inside an opening of the body, a bearing disposed inside the disc and the body, and a stem passing through the disc, the bearing and the body. The bearing includes an internal bearing edge. The stem includes an external stem edge to engage the internal bearing edge to prevent stem blowout from the body. In some embodiments, the butterfly valves include a gland threaded into the body to secure the bearing within the body.

The butterfly valves generally include a seal retainer positioned within a corresponding disc bore in the disc and a corresponding liner bore in the liner. In some embodiments, the body can include a blind hole, e.g., a partial hole, aligned with the corresponding disc bore and the corresponding liner bore. In some embodiments, the seal retainer can be partially passed through the corresponding liner bore and positioned against the body. In some embodiments, the seal retainer can be partially passed through the blind hole. In some embodiments, the body can include a through hole aligned with the corresponding disc bore and the corresponding liner bore for passage of the seal retainer therethrough. The stem includes a second external stem edge to engage the seal retainer to position the seal retainer within the corresponding liner bore in the liner during assembly. The stem generally defines a first section and a second section connected at the external stem edge. In some embodiments, the first section, the second section and the third section of the stem can define different external configurations. The stem further defines a third section connected to the second section at the second external stem edge. In some embodiments, the first section, the second section and the third section define different external configurations. For example, the first section can define a round external configuration, the second section can define a hexagonal external configuration, and the third section can define a square external configuration. In some embodiments, the first and third section define similar configurations which are different from the second section configuration. For example, the first and third section can define a square or circular external configuration and the second section can define a hexagonal external configuration. In general, a central portion of the corresponding disc bore defines an internal configuration complementary to the second section of the stem. The bearing generally defines a first internal configuration complementary to the second section of the stem. The bearing further defines a second internal configuration complementary to the third section of the stem. In some embodiments, the stem includes no seals positioned around a stem shaft.

In accordance with embodiments of the present disclosure, exemplary methods of assembling a butterfly valve are provided that generally include providing a body assembly and providing a handle assembly. The body assembly generally includes a body defining an opening, a disc, a bearing and a stem. The bearing generally includes an internal bearing edge. The stem generally includes an external stem edge to engage the internal bearing edge. The methods include positioning the disc within the opening of the body. In general, the methods include passing the stem through a body opening and a disc bore. The methods further include positioning the bearing through the body opening and around the stem to engage the internal bearing edge of the bearing within the external stem edge to prevent stem blowout from the body. In some embodiments, the methods include positioning a seal retainer within the disc bore in the disc. The methods include positioning the seal retainer within a liner bore in a liner of the body assembly by passing the stem through a body opening and the disc bore. In some embodiments, the methods include aligning a blind hole in the body with a corresponding liner bore in a liner and the disc bore in the disc. In some embodiments, the methods include passing the seal retainer partially through the corresponding liner bore and positioning the seal retainer against the body. In some embodiments, the methods include passing the seal retainer partially through the corresponding liner bore and partially passing the seal retainer through the blind hole. In some embodiments, the methods include positioning a seal retainer within the disc bore in the disc by passing the seal retainer through a through hole in the body aligned with a liner bore in a liner and the disc bore in the disc.

In accordance with embodiments of the present disclosure, exemplary butterfly valves are provided that generally include a body assembly. The body assembly includes a body, a disc rotationally disposed inside an opening of the body and a bearing disposed inside the disc and the body. The body assembly further includes a gland and a stem passing through the disc, the bearing and the body. The gland can be positioned against an internal surface of the body to prevent stem blowout from the body. For example, the internal surface of the body can shoulder the gland and restrict the space in which the stem can move. The gland positioned against the internal surface of the body can limit movement of the stem within the body in a direction parallel to a vertical axis of the stem. The body assembly can include a seal retainer positioned within a corresponding disc bore in the disc and a corresponding liner bore in the liner. The gland positioned against the internal surface of the body can limit movement of the seal retainer in the direction parallel to the vertical axis of the stem.

In accordance with embodiments of the present disclosure, exemplary methods of assembling a butterfly valve are provided that generally include providing a body assembly. The body assembly includes a body defining an opening, a disc, a bearing, a gland and a stem. In some embodiments, the body includes liner. The methods include positioning the disc within the opening of the body and passing the stem through a body opening and a disc bore. The methods include positioning the bearing through the body opening and around the stem. The methods further include positioning the gland against an internal surface of the body to prevent stem blowout from the body.

The methods include limiting movement of the stem within the body in a direction parallel to a vertical axis of the stem by positioning the gland against the internal surface of the body. The methods include positioning a seal retainer within the disc bore in the disc. The methods can include positioning the seal retainer within a liner bore in a liner of the body assembly by passing the stem through a body opening and the disc bore. The methods further include limiting movement of the seal retainer within the body in a direction parallel to a vertical axis of the stem by positioning the gland against the internal surface of the body.

In accordance with embodiments of the present disclosure, exemplary butterfly valves are provided that generally include a body assembly and a handle assembly. The body assembly includes a body, a disc rotationally disposed inside an opening of the body, a cog and a stem passing through the disc and the body. The handle assembly includes a lever and a force ring. The force ring can include two force ring openings passing at least partially therethrough. The lever can include two lever openings passing therethrough. The force ring can be engaged relative to the lever with at least one pin. In some embodiments, the two force ring openings oppose each other and the two lever openings oppose each other. The at least one pin can be detachable, i.e., non-integral, from the force ring and the lever.

In accordance with embodiments of the present disclosure, exemplary methods of assembling a butterfly valve are provided that generally include providing a body assembly and providing a handle assembly. The body assembly includes a body, a disc rotationally disposed inside an opening of the body, a cog and a stem passing through the disc and the body. The handle assembly includes a lever and a force ring. The force ring includes two force ring openings passing at least partially therethrough. The lever includes two lever openings passing therethrough. The methods include engaging the force ring relative to the lever with at least one pin. Engaging the force ring relative to the lever with at least one pin can include aligning the two force ring openings with the two lever openings and passing the at least one pin through each of the two force ring openings and the two lever openings.

In accordance with embodiments of the present disclosure, exemplary methods of assembling a butterfly valve are provided that generally include providing a body assembly. The body assembly includes a body defining an opening, a liner, a disc, a seal retainer and a stem. The methods include positioning the seal retainer within a bore of the disc and positioning the liner within the opening of the body. The methods include positioning the disc within the liner and passing the stem through the disc and the liner to position the seal retainer at least partially within a liner bore.

In accordance with embodiments of the present disclosure, exemplary butterfly valves are provided that generally include a body assembly. The body assembly includes a body, a disc rotationally disposed inside an opening of the body, a cog and a stem passing through the disc and the body. The butterfly valve can include a locking cap. The locking cap can engage the cog to prevent rotation of the disc and the stem relative to the body.

In some embodiments, the cog can include at least one male member and the locking cap can include at least one female member engaging the at least one male member. In some embodiments, the cog can include at least one female member and the locking cap can include at least one male member engaging the at least one female member. In some embodiments, the cog and the locking cap can include complementary splines engageable relative to each other. In some embodiments, the complementary splines of the cog and the force ring can mate by a total of 360 degrees or less. In some embodiments, at least one of the cog and the locking cap can include a friction imparting surface.

In accordance with embodiments of the present disclosure, exemplary methods of assembling a butterfly valve are provided that generally include providing a body assembly. The body assembly includes a body, a disc rotationally disposed inside an opening of the body, a cog and a stem passing through the disc and the body. The methods further include providing a locking cap and engaging the locking cap with the cog to prevent rotation of the disc and the stem relative to the body.

In some embodiments, the methods include engaging at least one female member of the locking cap with at least one male member of the cog to prevent rotation of the disc and the stem relative to the body. In some embodiments, the methods include engaging at least one male member of the locking cap with at least one female member of the cog to prevent rotation of the disc and the stem relative to the body. In some embodiments, the methods include engaging complementary splines of the cog and the locking cap to prevent rotation of the disc and the stem relative to the body. In some embodiments, the methods include engaging the locking cap with the cog via a friction force from a friction imparting surface on at least one of the cog and the locking cap to prevent rotation of the disc and the stem relative to each other.

Other objects and features will become apparent from the following detailed description considered in conjunction with the accompanying drawings. It is to be understood, however, that the drawings are designed as an illustration only and not as a definition of the limits of the invention.

BRIEF DESCRIPTION OF THE DRAWINGS

To assist those of skill in the art in making and using the disclosed butterfly valves and associated methods, reference is made to the accompanying figures, wherein:

FIG. 15 shows a perspective view of a bearing of an exemplary butterfly valve according to the present disclosure;

FIG. 16 shows a cross-sectional, perspective view of a bearing of an exemplary butterfly valve according to the present disclosure;

FIG. 17 shows a perspective view of a gland of an exemplary butterfly valve according to the present disclosure;

FIG. 18 shows a perspective view of a junk seal of an exemplary butterfly valve according to the present disclosure;

DESCRIPTION OF EXEMPLARY EMBODIMENTS

It should be understood that the relative terminology used herein, such as "front", "rear", "left", "top", "bottom", "vertical", and "horizontal" is solely for the purposes of clarity and designation and is not intended to limit the invention to embodiments having a particular position and/or orientation. Accordingly, such relative terminology should not be construed to limit the scope of the present invention. In addition, it should be understood that the invention is not limited to embodiments having specific dimensions. Thus, any dimensions provided herein are merely for an exemplary purpose and are not intended to limit the invention to embodiments having particular dimensions.

Figure 1:
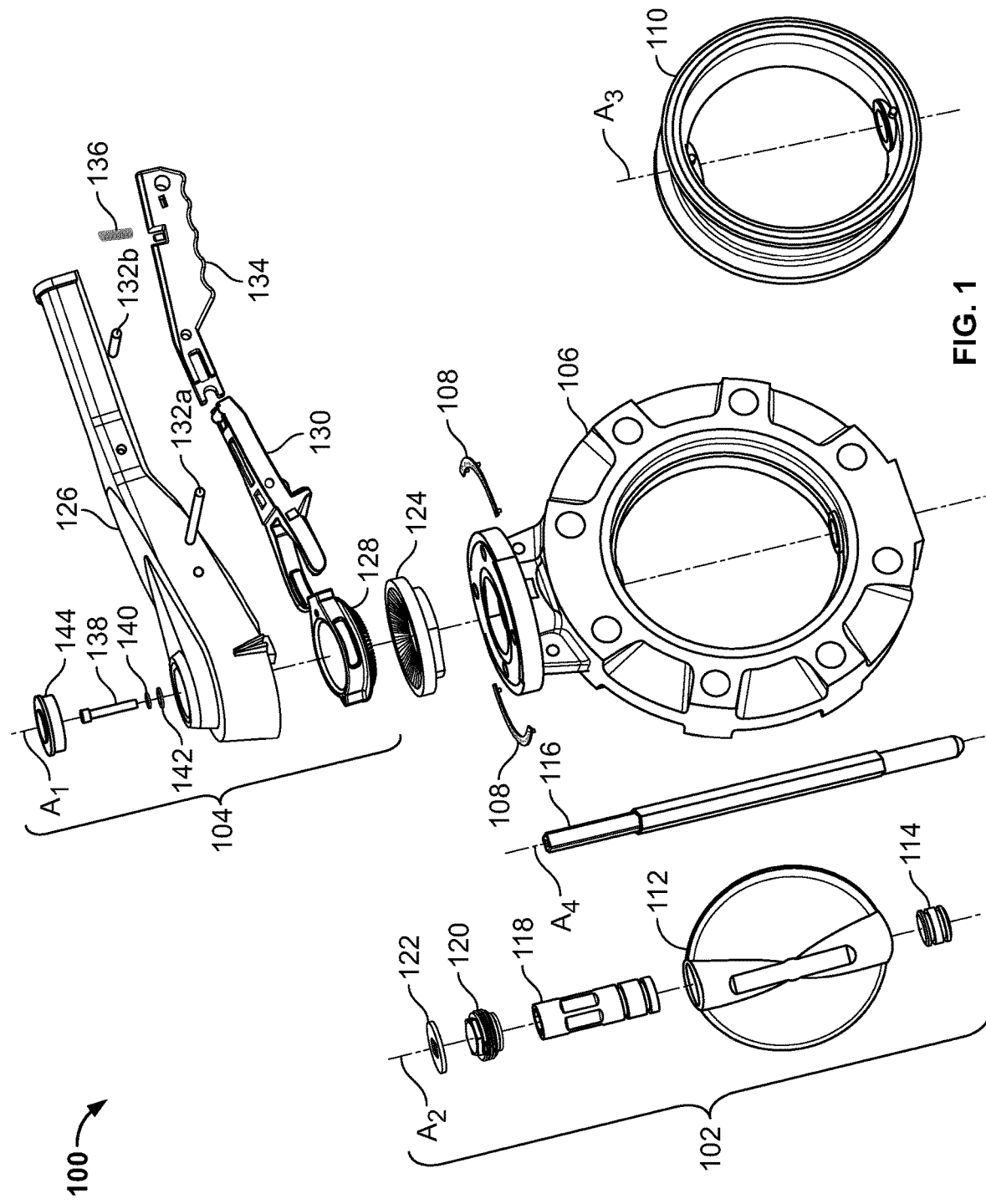
FIG. 1 shows an exploded, perspective view of an exemplary butterfly valve according to the present disclosure.
Figure 2:
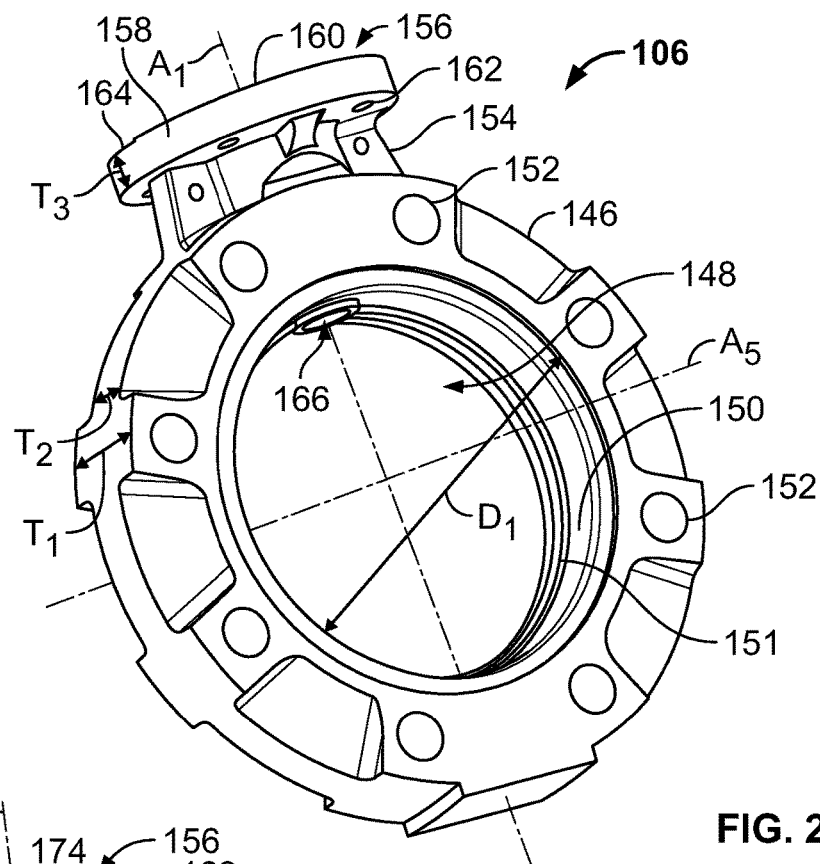
FIG. 2 shows a bottom, perspective view of a body of an exemplary butterfly valve according to the present disclosure.
Figure 3:
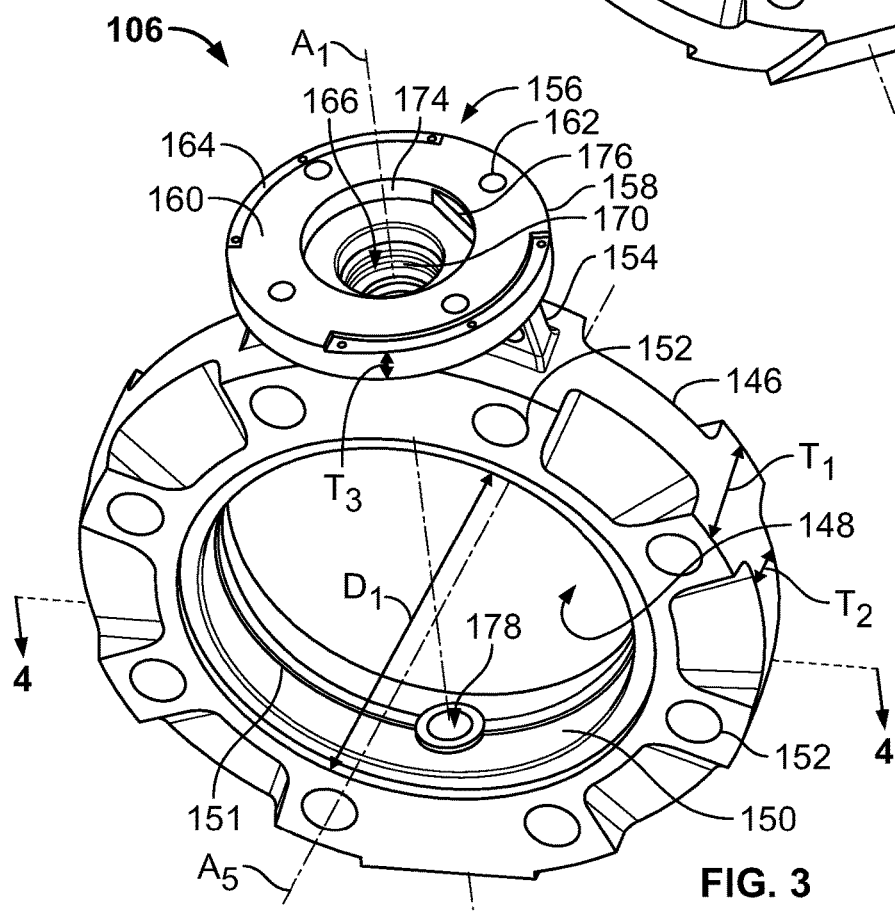
FIG. 3 shows a top, perspective view of a body of an exemplary butterfly valve according to the present disclosure.
Figure 4:
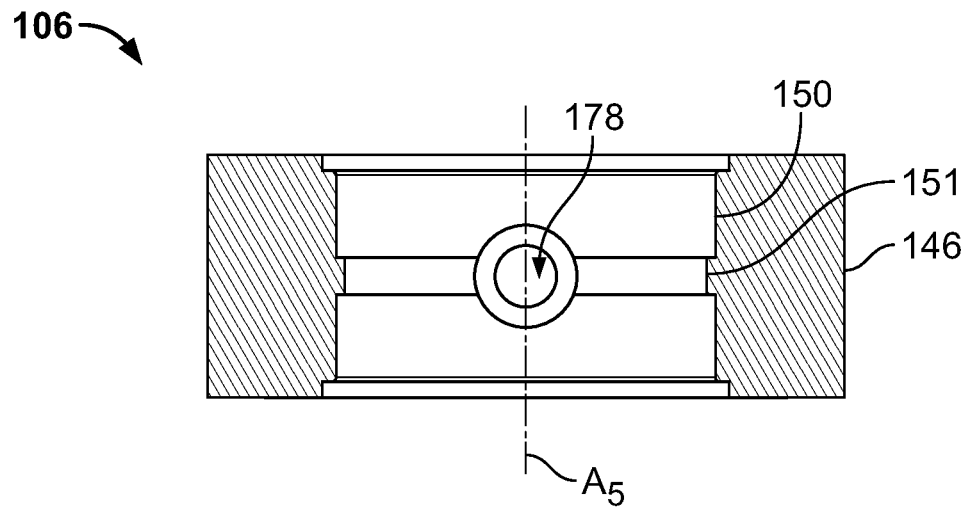
FIG. 4 shows a cross-sectional, side view of a body of an exemplary butterfly valve according to the present disclosure.
Figure 5:
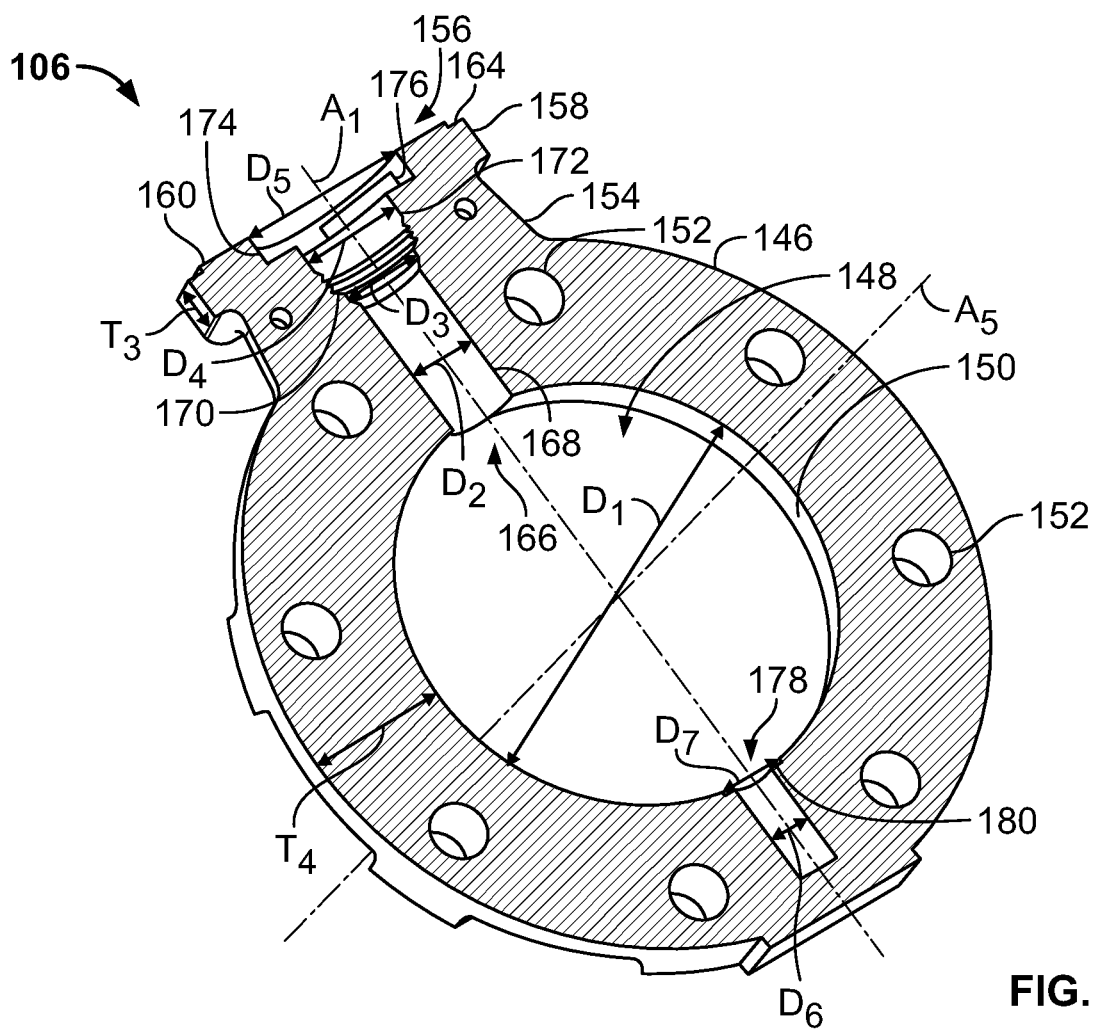
FIG. 5 shows a cross-sectional, perspective view of a body of an exemplary butterfly valve according to the present disclosure.

With reference to FIG. 1, an exploded, perspective view of an exemplary embodiment of a butterfly valve and actuating handle assembly 100 (hereinafter "butterfly valve 100") is provided. The butterfly valve 100 includes a body assembly 102 and a handle assembly 104 mechanically connected relative to each other. The body assembly 102 includes a body 106, a body indicator bezel 108, a liner 110, a disc 112, a seal retainer 114, a stem 116, a bearing 118, a gland 120, a junk seal 122, and a cog 124, each of which will be discussed in greater detail below. The handle assembly 104 includes a handle body 126, a force ring 128, a lever 130, pivot pins 132a and 132b, a grip 134, a spring 136, a fastener 138 (e.g., a screw), first and second washers 140, 142, and a handle bezel 144, each of which will be discussed in greater detail below. Although discussed herein as implemented with a butterfly valve 100, it should be understood that the handle assembly 104 can be implemented with a variety of valves, e.g., butterfly valves, ball valves, and the like.

Still with reference to FIG. 1, when assembled, the body 106, the body indicator bezel 108, the cog 124, the handle body 126, the force ring 128, the fastener 138, the first and second washers 140, 142, and the handle bezel 144 can be aligned along vertical axis $A_1$. Similarly, when assembled, the disc 112, the seal retainer 114, the bearing 118, the gland 120 and the junk seal 122 can be aligned along vertical axis $A_2$, and vertical axis $A_2$ can be aligned relative to the vertical axis $A_1$. Further, when assembled, the vertical axis $A_3$ of the liner 110 and the vertical axis $A_4$ of the stem 116 can be aligned relative to the vertical axis $A_1$.

In some embodiments, all or some of the components of the butterfly valve 100 can be fabricated from, e.g., polyvinyl chloride (PVC), chlorinated polyvinyl chloride (CPVC), glass-filled polypropylene, and the like. In some embodiments, additional materials selected for their strength and/or dimensional stability, e.g., glass-filled polyethermide (PEI), can be used in the cog 124 and the force ring 128. The design of the butterfly valve 100 discussed herein should not be limited to the field of thermoplastics and can be adapted to products constructed from metal or other materials. In some embodiments, the liner 110 can be fabricated from an elastomeric material, e.g., an ethylene propylene diene monomer (EPDM), a fluoropolymer elastomer (FPM), a nitrile rubber (NBR), materials with resiliency of elastomers, materials with more or less resiliency than elastomers, and the like.

With reference to FIGS. 2-5, bottom, top, cross-sectional side and cross-sectional perspective views of an exemplary embodiment of the body 106 are provided. As noted above, the body 106 can be part of the body assembly 102 of the butterfly valve 100. The body 106 of FIGS. 2-5 is illustrated as a one-piece body 106. In some embodiments, the body 106 can be fabricated as a two or more piece body (not shown). The outer perimeter 146 of the body 106 can be substantially cylindrical in shape and includes an opening 148 defining a diameter $D_1$ centered within the outer perimeter 146 of the body 106. The opening 148 includes a central longitudinal axis $A_5$ which is perpendicular to the vertical axis $A_1$. A flow path of fluid passing through the opening 148 of the body 106 and/or the liner 110 can be substantially parallel to the central longitudinal axis $A_5$. The opening 148 and an inner surface 150 of the opening 148 can be configured and dimensioned to receive therein the liner 110, disc 112 and additional internal components which will be discussed below. In some embodiments, the opening 148 can include one or more radial protrusions 151, e.g., ledges, ribs, and the like, along the inner surface 150 which interact with ledges of the liner 110 and detachably secure the liner 110 within the opening 148. The body 106 further includes a plurality of holes 152 radially spaced relative to the central longitudinal axis $A_5$ and passing through the body 106 in a direction parallel to the central longitudinal axis $A_5$. The plurality of holes 152 can be used to bolt or secure the body 106 to flanges used to install the butterfly valve 100 in a piping system (not shown). In some embodiments, the body 106 can include a plurality of slots to bolt or secure the body 106 to flanges used to install the butterfly valve 100 in a piping system (not shown). In some embodiments, the body 106 can define an outside diameter to allow bolts to be positioned around the body 106. In the exemplary embodiment illustrated in FIGS. 2-5, the body 106 defines a pattern of varying thicknesses $T_1$ and $T_2$ radially spaced relative to the central longitudinal axis $A_5$. In some embodiments, the body 106 can define a uniform thickness (not shown).

The body 106 includes a flange 154, e.g., a gusset, a rib, a cylinder, and the like, extending from an upper portion 156 of the outer perimeter 146 and aligned with the vertical axis $A_1$. The flange 154 includes a mounting plate 158, e.g., a circular lip or plate, integrally mounted to the upper portion 156 and the flange 154 which defines a substantially flat upper surface 160 for mating with additional components of the body assembly 102 and the handle assembly 104. In some embodiments, the mounting plate 158 can be configured as, e.g., square, rectangular, oval, and the like (not shown). The mounting plate 158 includes a pattern of holes 162 radially spaced relative to the vertical axis $A_1$ and passing through the mounting plate 158 in a direction parallel to the vertical axis $A_1$. The plurality of holes 162 can be used to install devices that can provide a moment for rotation of the stem 116, e.g., the handle assembly 104, a gear box, an actuator, and the like, the moment being resisted by the body 106, as will be discussed below. In some embodiments, the upper surface 160 of the mounting plate 158 can contain integral marks (not shown) which, when aligned with position indicators on the handle assembly 104, indicate the position of the butterfly valve 100, e.g., closed, partially open or open. In the embodiment illustrated in FIGS. 2-5, the upper surface 160 of the mounting plate 158 includes two grooves 164 configured and dimensioned to receive a bezel for indicating the position of the butterfly valve 100. The bezel (not shown), which will be discussed below, can relay varying types of information, such as the angle of the disc 112 relative to the body 106, and attached to the mounting plate via, e.g., a snap fit, such that the bezel aligns correspondingly with the position indicator on the handle assembly 104. A thickness $T_3$ of the mounting plate 158 can be substantially parallel to the central longitudinal axis $A_5$, e.g., the flow axis. In addition, as seen from FIGS. 2-5, the position of the mounting plate 158 can be outside of the outer perimeter 146, e.g., the primary external diameter, of the body 106.

The body 106 includes a first bore 166, e.g., a stem bore, which can be configured and dimensioned to receive and surround the stem 116. In particular, the first bore 166 provides an opening for the stem 116 to pass into the body 106. The first section 168 of the first bore 166 defines a diameter $D_2$ and can be the smallest portion of the first bore 166 prior to entering the inside diameter of the body 106, e.g., the inner surface 150. The diameter $D_2$ of the first section 168 can be dimensioned such that the bearing 118 and secondary O-ring seals associated with the bearing 118 of FIG. 1 can be positioned therein. The first section 168 can extend from the inner surface 150 of the body 106 to a partial distance within the flange 154.

The first bore 166 includes a second section 170 positioned immediately adjacent to the first section 168. The second section 170 can be positioned wholly within the flange 154 at an area where the stem 116 extends beyond the outer perimeter 146 of the body 106 and can be configured as a threaded counter bore. In particular, the threaded counter bore of the second section 170 can be configured and dimensioned to receive therein the gland 120 of FIG. 1, which includes complementary threads thereon, to retain the stem 116 within the body 106. The diameter $D_3$ of the second section 170 can be dimensioned greater than the diameter $D_2$ of the first section 168.

The first bore 166 further includes a third section 172 configured as a counter bore positioned immediately adjacent to the second section 170 and positioned within the flange 154. The third section 172 can be configured and dimensioned to receive therein the junk seal 122 of FIG. 1 or an alternative component which limits ingress of material or debris from outside of the external envelope of the butterfly valve 100. The diameter $D_4$ of the third section 172 can be dimensioned greater than the diameters $D_2$ and $D_3$ of the first and second sections 168 and 170, respectively.

Further still, the first bore 166 includes a fourth section 174 configured as a counter bore positioned immediately adjacent to the third section 172 and positioned within the mounting plate 158. The fourth section 174 can be configured and dimensioned to receive therein and detachably interlock with the cog 124. In particular, the fourth section 174 provides an interface between the body 106 and the cog 124. The fourth section 174 includes a step 176 for detachably interlocking the cog 124 with the body 106 such that the cog 124 does not rotate within the fourth section 174. The diameter $D_5$ of the fourth section 174 can be dimensioned greater than the diameters $D_2$, $D_3$ and $D_4$ of the first, second and third sections 168, 170 and 172, respectively.

Opposite from the first bore 166 and extending along the vertical axis $A_1$, the body 106 includes a second bore 178. The second bore 178 defines a diameter $D_6$ which can be dimensioned equal to or smaller than the diameter $D_2$ of the first section 168. The second bore 178 can partially extend from the inner surface 150 of the opening 148 into the body 106 along the vertical axis $A_1$ and does not completely pass through the radial thickness $T_4$ of the body 106. The partial passage of the second bore 178 into the body 106 prevents the creation of a leakage path for a flow material through the second bore 178 by avoiding the creation of a passage through the entire thickness $T_4$ of the body 106. The second bore 178 can be configured and dimensioned to receive therein the stem 116 of FIG. 1 as it passed through the body 106 and the disc 112. Thus, the stem 116 can be positioned perpendicular to the flow path and the central longitudinal axis $A_5$. As will be discussed in greater detail below, the round configuration of the second bore 178 creates a position for the lower end of the stem 116 within the body 106 and allows the stem 116 to rotate within the cylindrical surface of the second bore 178, thereby forming a bearing surface. In some embodiments, the second bore 178 includes a groove 180 aligned with the vertical axis $A_1$ and located at the inner surface 150 of the opening 148. The radial groove 180 defines a diameter $D_6$ and can be configured and dimensioned to partially receive therein the seal retainer 114 of FIG. 1 such that the seal retainer 114 can be aligned along the vertical axis $A_1$.

Figure 6:
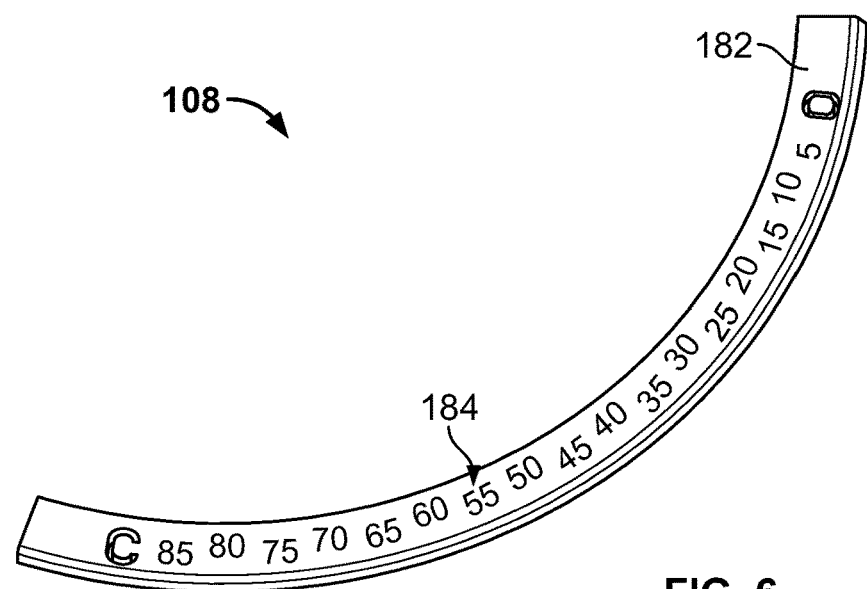
FIG. 6 shows a top view of a body indicator bezel of an exemplary butterfly valve according to the present disclosure.

FIG. 6 illustrates an exemplary body indicator bezel 108 of the butterfly valve 100. As noted above, the body indicator bezel 108 can be part of the body assembly 102 of the butterfly valve 100. The body indicator bezel 108 generally defines a substantially flat and arced radial component such that the body indicator bezel 108 can be integrally mounted into the recessed grooves 164 or arc of the mounting plate 158 to provide a visual indication of the position of the disc 112 relative to the fixed scale on the mounting plate 158 on the body 106. The body indicator bezel 108 thereby provides a visual indication of the position of the disc 112 relative to the body 106 itself. In particular, the body indicator bezel 108 defines an outer diameter which substantially matches the outer diameter of the mounting plate 158 and further defines an inner diameter which substantially matches the inner diameter of the grooves 164 on the mounting plate 158. In some embodiments, the body indicator bezel 108 includes an arc length of more than approximately 90 degrees.

A flat, upper surface 182 of the body indicator bezel 108 includes visual indicators 184, e.g., a scale of degrees, a percent of flow given certain flow conditions, process point locations decided for a particular process system, or any variety of markings, which indicate the position of the disc 112 relative to the body 106, e.g., open, partially open, or closed. For example, in embodiments where the visual indicators 184 are represented by a scale of degrees, the range of degrees can be from 5 degrees to 85 degrees in 5 degree intervals. However, it should be understood that in some embodiments, the intervals for the range of degrees can vary depending on the precision desired, e.g., the intervals can be any even or uneven degree increments within an approximately 90 degree arc of the handle assembly 104 travel range. For example, if greater precision is desired, the range of degrees can be in 1 degree, 2 degree, 3 degree or 4 degree intervals. As a further example, if less precision is desired, the range of degrees can be in 10 degree, 20 degree or 30 degree intervals. In addition, adjacent to the 5 degree visual indicator 184, the body indicator bezel 108 can include an "0" and adjacent to the 85 degree visual indicator 184, the body indicator bezel 108 can include a "C". The "0" can represent the disc 112 in a fully open position relative to the body 106, i.e., at 0 degrees, the "C" can represent the disc 112 in a closed position relative to the body 106, i.e., at 90 degrees, and the visual indicators 184 ranging from 5 degrees to 85 degrees can represent the disc 112 in a partially open position relative to the body 106. In the embodiment illustrated in FIG. 6, the body indicator bezel 108 includes nineteen evenly spaced "stop" positions at each visual indicator 184 within an approximately 90 degree arc. In some embodiments, the disc 112 can be in a fully open position relative to the body 106 at 90 degrees and can be in a fully closed position relative to the body 106 at 0 degrees.

In some embodiments, rather than visual indicators 184 ranging from 5 degrees to 85 degrees and including an "0" and "C", the body indicator bezel 108 can include visual indicators 184 ranging from 0 degrees to 90 degrees (not shown). In the embodiment including visual indicators 184 ranging from 0 degrees to 90 degrees, 0 degrees can represent the disc 112 in a fully open position relative to the body 106, 90 degrees can represent the disc 112 in a closed position relative to the body 106, and the visual indicators 184 ranging from 5 degrees to 85 degrees can represent the disc 112 in a partially open position relative to the body 106. The visual indicators 184 can be, e.g., raised on the upper surface 182 of the body indicator bezel 108, recessed in the upper surface 182 of the body indicator bezel 108, or cut through the thickness of the body indicator bezel 108. In some embodiments, rather than a body indicator bezel 108, the upper surface 160 of the mounting plate 158 can integrally include visual indicators 184 directly thereon (not shown) substantially similar to those of the body indicator bezel 108 to indicate a position of the disc 112 relative to the fixed scale on the mounting plate 158. Visual indicators 184 or marks for position on the body 106 can provide a limited visual contrast to the surrounding material. Thus, in some embodiments, the body indicator bezel 108 can be fabricated from a material different than the body 106 to provide a distinct contrast between the visual indicators 184 and the body 106. In some embodiments, the body indicator bezel 108 can be of a different color than the body 106 to provide a distinct contrast between the visual indicators 184 and the body 106.

In some embodiments, rather than visual indicators 184 printed or engraved into the upper surface 182 of the body indicator bezel 108, the visual indicators 184 can be cut into and through the body indicator bezel 108 (not shown). For example, the body indicator bezel 108 can be fabricated from a material having a different color than the body 106 such that when the body indicator bezel 108 is positioned onto the body 106, the body 106 can be seen through the cut out visual indicators 184. By looking through the cut out visual indicators 184, the contrast in colors between the body indicator bezel 108 and the body 106 can allow a user to visualize the position of the disc 112 relative to the body 106.

In some embodiments, alternatively to or in combination with the visual indicators 184, the body indicator bezel 108 can include sensors (not shown) that can be used in conjunction with a target (not shown) located in the handle assembly 104 which provide a response to a position of the disc 112 relative to the body 106. The sensors and the target can further be incorporated into a suitable electric circuit (not shown) for processing the position of the disc 112 relative to the body 106 and outputting an appropriate signal response. In some embodiments, alternatively to or in combination with the sensors and target, a varying signal can be produced at the final positions of the handle assembly 104 as it rotates relative to the body 106, e.g., positions for fully opening or closing the disc 112 relative to the body 106.

Figure 7:
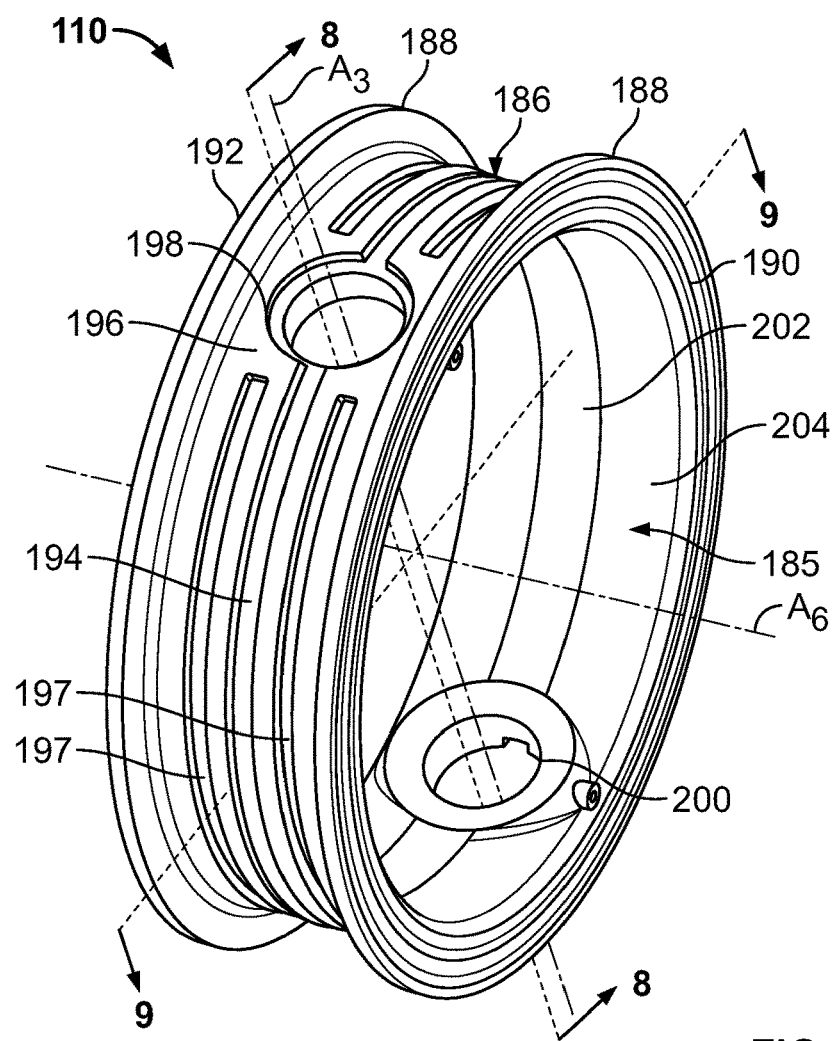
FIG. 7 shows a perspective view of a liner of an exemplary butterfly valve according to the present disclosure.
Figure 8:
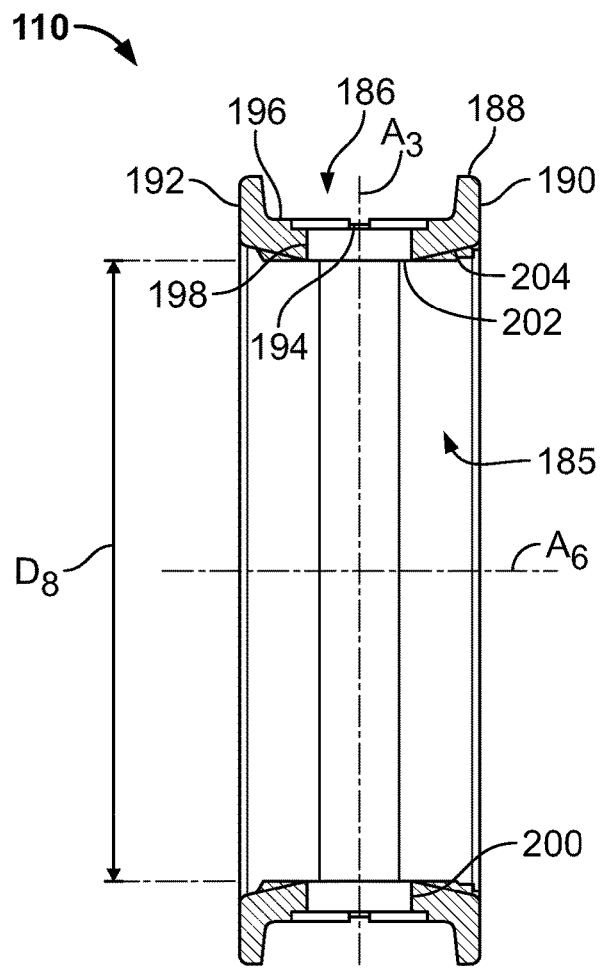
FIG. 8 shows a cross-sectional, side view of a liner of an exemplary butterfly valve according to the present disclosure.
Figure 9:
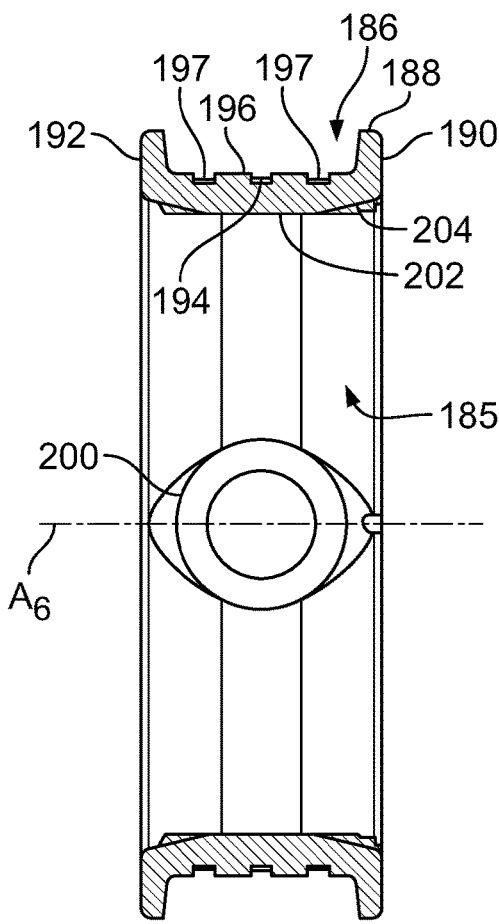
FIG. 9 shows a cross-sectional, side view of a liner of an exemplary butterfly valve according to the present disclosure.

With reference to FIGS. 7-9, perspective and cross-sectional views of an exemplary liner 110 of a butterfly valve 100 are provided. In particular, FIG. 8 shows a cross-sectional view of the liner 110 along plane 8-8 of FIG. 7 and FIG. 9 shows a cross-sectional view of the liner 110 along plane 9-9 of FIG. 7. As noted above, the liner 110 can be part of the body assembly 102 of the butterfly valve 100. The liner 110 includes a vertical axis $A_3$ and a central longitudinal axis $A_6$ perpendicular to the vertical axis $A_3$. The liner 110 can be configured and dimensioned to be inserted and detachably interlocked in the opening 148 of the body 106. When inserted into the opening 148, the vertical axis $A_3$ of the liner 110 can be substantially aligned with the vertical axis $A_1$ of the body 106 and the central longitudinal axis $A_6$ of the liner 110 can be substantially aligned with the central longitudinal axis $A_5$ of the body. The liner 110 further includes an opening 185 radially aligned with the central longitudinal axis $A_6$. The opening 185 defines a diameter $D_8$ dimensioned to be slightly smaller than a diameter of the disc 112 to create a seal between the liner 110 and the disc 112 and, in turn, creating a seal between the disc 112 and the body 106. In addition, the liner 110 forms a seal between the body 106 and the first and second bores 166 and 178 extending into the flange 154 and the body 106, respectively.

The liner 110 includes a radial passage 186 along the circumference of the outside diameter through a plane congruent to the closed position of the disc 112 and perpendicular to the intended direction of flow, e.g., the central longitudinal axis $A_6$. The radial passage 186 includes two side edges 188 protruding radially along the front and rear surfaces 190 and 192, respectively, of the liner 110. The radial passage 186 includes a central groove 194 along a bottom surface 196 configured to receive therein the protrusion 151 along the inner surface 150 of the body 106 such that when the liner 110 is detachably secured within the opening 148, the central groove 194 mates with the protrusion 151. In some embodiments, the radial passage 186 can include one or more side grooves 197 along a bottom surface 196 which act as air gaps to improve interaction between the liner 110 and the body 106. The "tongue and groove" arrangement including the protrusion 151, e.g., a male tongue extending inwardly from the inner surface 150 of the body 106, and the female central groove 194 of the outer diameter of the liner 110 assists in retaining the liner 110 within the body 106.

The male portion, e.g., protrusion 151, on the body 106 and the female portion, e.g., central groove 194, on the liner 110 create a liner 110 compression as the disc 112 moves into a closed position. In addition, the male portion or rib of the body 106 prevents lateral movement of the liner 110 under differential pressure and during operation of the disc 112 into a closed position. In particular, the central groove 194 ensures that displacement of the liner 110 within the body 106 does not occur when the disc 112 is rotated into a closed position by maintaining the central groove 194 of the liner 110 aligned with the protrusion 151 of the body 106. The male portion on the body 106 and the female portion on the liner 110 also allow manufacturing and/or molding of parts that can be used in assemblies without the need of secondary operations. In particular, the body 106 and the liner 110 can be molded with multitudes of different "tongue and groove" section geometries. Although illustrated as substantially rectangular in shape, the cross-section of the "tongue and groove" arrangement can be configured as, e.g., rectangular, square, semi-toric, semi-elliptical toric, dovetail, as a keyhole, trapezoidal, triangular, random, and the like. In some embodiments, the keyhole configuration can be defined by a circular section positioned on top of a rectangular section.

Similarly, the bottom surface 196 of the radial passage 186 and the inner surface 150 of the body 106 can mate relative to each other when the liner 110 is inserted into the opening 148 of the body 106. The edges 188 protruding around the radial passage 186 can also mate along the front and rear surfaces of the body 106. Although illustrated as substantially flat, in some embodiments the radial passage 186 can be configured as, e.g., round, rectangular, square, dovetail, or any geometry that accommodates the protrusion 151 and inner surface 150 of the body 106. It should be understood that the radial passage 186 surfaces and the protrusion 151 and inner surface 150 define corresponding geometries such that said components can mate relative to each other.

The liner 110 includes a first bore 198 and a second bore 200 configured and dimensioned to correspond to the first and second bores 166 and 178, respectively, of the body 106 such that a stem 116 can be passed therethrough. In addition, an inner surface of the opening 185 defines a central inner surface 202 and side inner surfaces 204. As illustrated in FIGS. 7-9, the central inner surface 202 can be flat and substantially parallel to the central longitudinal axis $A_6$, while the side inner surfaces 204 can be connected to the central inner surface 202 and angled away from the central longitudinal axis $A_6$. In some embodiments, the central inner surface 202 can be spherical or substantially parallel. For example, the central inner surface 202 and the side inner surfaces 204 can form a spherical inner surface. The angled side inner surfaces 204 create a larger initial diameter of the opening 185, which reduces to the diameter $D_8$ at the central inner surface 202. As would be understood by those of ordinary skill in the art, the angled side inner surfaces 204 create a larger initial passage for the disc 112 as the disc 112 rotates between the open and closed positions relative to the liner 110 and body 106. As will be described below, when the disc 112 is positioned in a closed position, the disc 112 can be substantially aligned with the central inner surface 202 of the opening 185 and the larger diameter of the disc 112 compresses the liner 110 to create a seal between the liner 110 and the disc 112.

Figure 10:
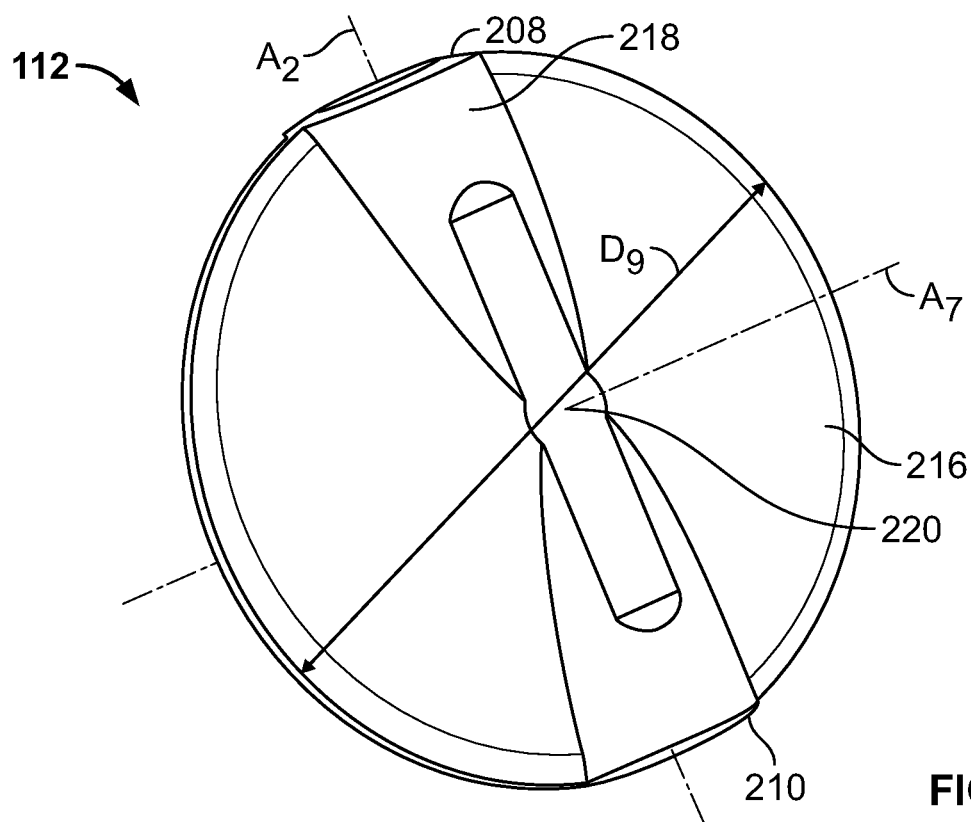
FIG. 10 shows a perspective view of a disc of an exemplary butterfly valve according to the present disclosure.
Figure 11:
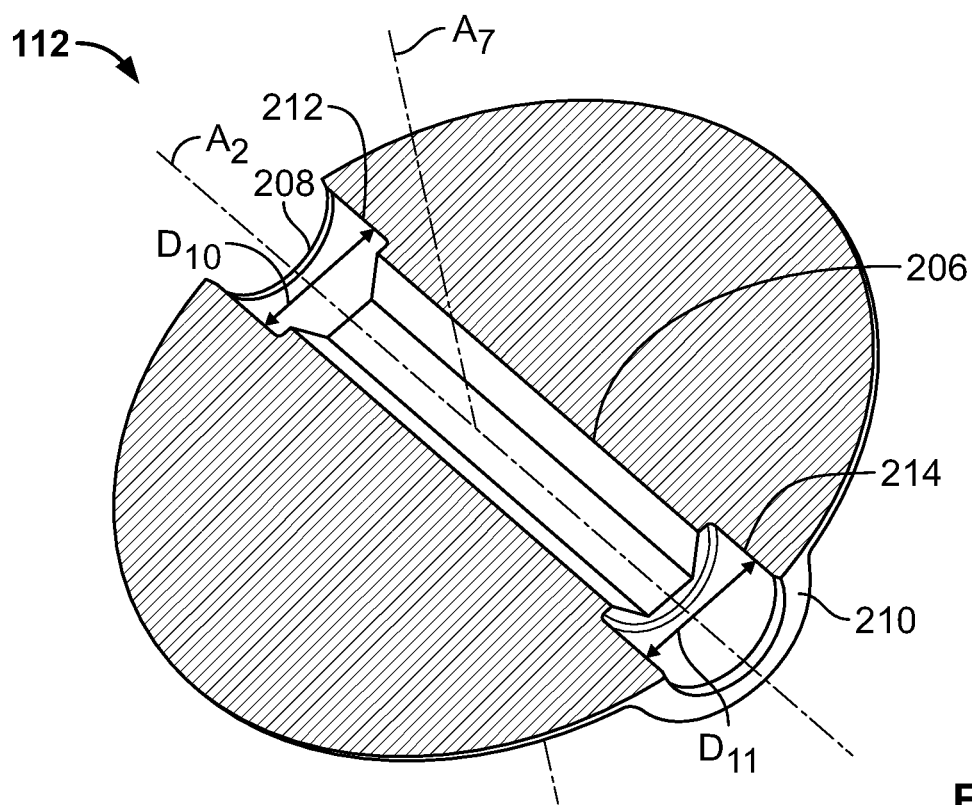
FIG. 11 shows a cross-sectional, perspective view of a disc of an exemplary butterfly valve according to the present disclosure.

With reference to FIGS. 10 and 11, perspective and perspective cross-sectional views, respectively, of an exemplary disc 112 of a butterfly valve 100 are provided. As noted above, the disc 112 can be part of the body assembly 102 of the butterfly valve 100. The disc 112 can be configured as substantially circular in shape and, as mentioned above, defines an outside diameter $D_9$ dimensioned larger than the inside diameter $D_8$ of the liner 110. Control of the size of the diameter $D_9$ and the thickness $T_4$ or inside diameter $D_1$ of the body 106 can be used to vary the amount of compression exerted on the liner 110 by the disc 112. The amount of compression exerted on the liner 110 by the disc 112 affects the seal created between the liner 110 and the disc 112. The disc 112 includes a central longitudinal axis $A_7$ which is perpendicular to the vertical axis $A_2$. When assembled with the body 106 and liner 110, the vertical axis $A_2$ of the disc can be substantially aligned with the vertical axes $A_1$ and $A_3$ of the body 106 and the liner 110. When the disc 112 is positioned in a closed position relative to the body 106 and the liner 110, the central longitudinal axis $A_7$ of the disc 112 can be aligned with the central longitudinal axes $A_5$ and $A_6$ of the body 106 and the liner 110. When the disc 112 is positioned in a partially open or fully open position relative to the liner 110 and the body 106, the disc 112 can be rotated relative to the liner 110 and the body 106 such that the central longitudinal axis $A_7$ of the disc 112 is not aligned with the central longitudinal axes $A_5$ and $A_6$ of the body 106 and the liner 110.

The disc 112 includes a hexagonal shaped bore 206 extending through the disc 112 along the vertical axis $A_2$ between first and second regions 208 and 210 which oppose each other. In particular, the hexagonal shaped bore 206 can be parallel and centered to the region between the opposing first and second regions 208 and 210 of the disc 112 and centered along the outside diameter $D_9$ and the central longitudinal axis $A_7$ of the disc 112. The disc 112 includes first and second bores 212 and 214 at each end of the hexagonal shaped bore 206 extending from the hexagonal shaped bore 206 to the first and second regions 208 and 210, respectively. The first bore 212 defines a diameter $D_{10}$ that inscribes a region larger than the corners of the hexagonal shaped bore 206 and can be configured and dimensioned to receive therein the bearing 118 of FIG. 1. Similarly, the second bore 214 defines a diameter $D_{11}$ that inscribes a region larger than the corners of the hexagonal shaped bore 206 and can be configured and dimensioned to receive therein the seal retainer 114 of FIG. 1.

The disc 112 defines a substantially flat area at both opposing surfaces 216 of the disc 112. The center of the disc 112 includes protrusions 218 extending along the vertical axis $A_2$ at varying diameters dimensioned greater than the thickness of the disc 112. As illustrated in FIGS. 10 and 11, in some embodiments, the protrusions 218 can be configured as cylindrical in shape. The protrusions 218 can be dimensioned such that the largest diameters of the protrusions 218 can be located at the first and second regions 208 and 210, and can be reduced in diameter at the center 220 of the disc 112. In particular, the largest diameters of the protrusions 218 can be dimensioned to receive the bearing 118 and the seal retainer 114 within the first and second bores 212 and 214, respectively, and the smaller diameter at the center 220 of the disc can be dimensioned to receive the stem 116 within the hexagonal shaped bore 206. The flat area of the opposing surfaces 216 facilitates controlling the larger thickness of the protrusions 218 of the disc 112 near the center of flow. When the disc 112 is positioned in a partially open or open position relative to the liner 110 and the body 106, e.g., the disc 112 is rotated relative to the liner 110 and the body 106 such that the central longitudinal axis $A_7$ of the disc 112 is not aligned with the central longitudinal axes $A_5$ and $A_6$ of the body 106 and the liner 110, fluid can pass along the open areas created between the liner 110 and the disc 112.

Figure 12:
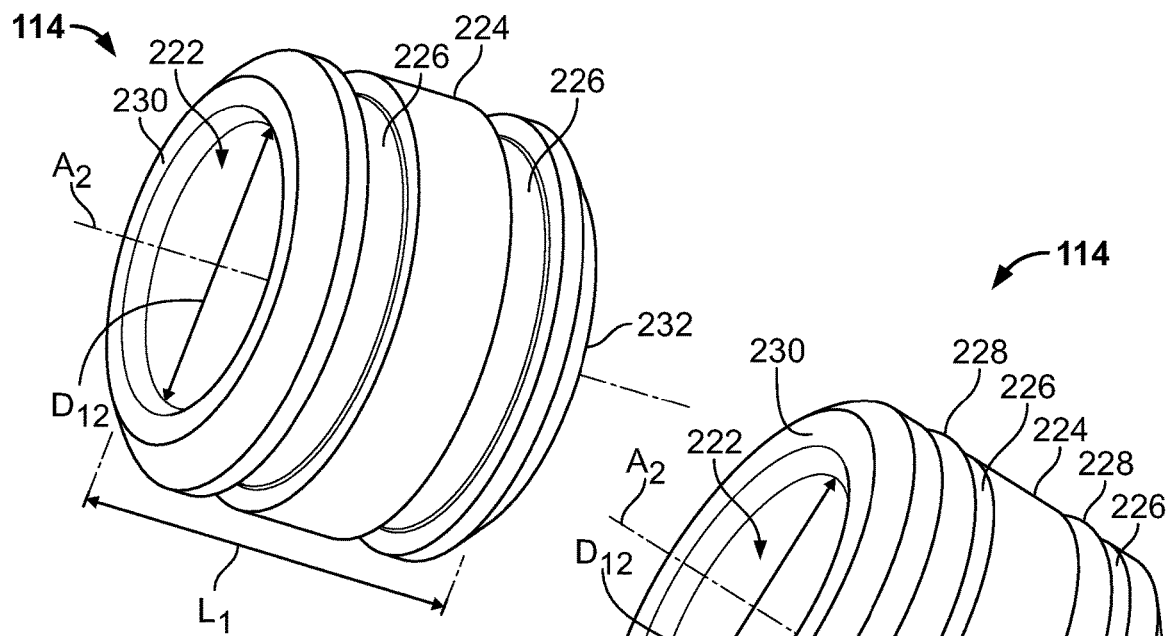
FIG. 12 shows a perspective view of a seal retainer of an exemplary butterfly valve according to the present disclosure.
Figure 13:
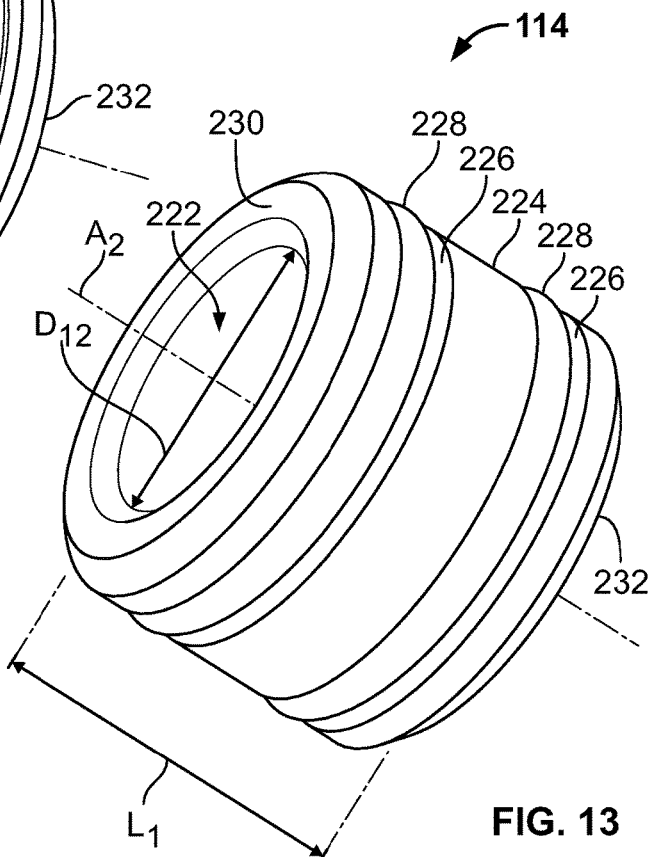
FIG. 13 shows a perspective view of a seal retainer with O-rings of an exemplary butterfly valve according to the present disclosure.

With reference to FIGS. 12 and 13, perspective views of an exemplary seal retainer 114 of a butterfly valve 100 are provided. As noted above, the seal retainer 114 can be part of the body assembly 102 of the butterfly valve 100. The seal retainer 114 can be configured as cylindrical in shape and includes an opening 222 passing therethrough along the vertical axis $A_2$. A diameter $D_{12}$ of the opening 222 can be dimensioned to receive therein and surround one end of the stem 116. The seal retainer 114 includes an outer surface 224 concentric and parallel to the opening 222, e.g., the through passage. The outer surface 224 includes two radial grooves 226 for retention of seals 228, e.g., O-rings. Although illustrated as including two grooves 226 for receiving two seals 228, in some embodiments, the outer surface 224 can include, e.g., one, two, three, four, and the like, grooves 226 for receiving, e.g., one, two, three, four, and the like, seals 228 therein. The seals 228 generally provide a seal between the central inner surface 202 and the second bore 200 of the liner 110 where the stem 116 passes through the second bore 200 and the inside of the second bore 178 of the body 106 which retains a portion of the stem 116. In particular, the seals 228 create an additional barrier to fluid leakage contacting the stem 116 if the seal between the disc 112 and the liner 110 is compromised when the butterfly valve 100 is positioned in any of the functional positions, e.g., open, partially open, and closed.

The first and second ends 230 and 232 of the seal retainer 114 can be perpendicular to the through passage of opening 222 and the external diameter of the outer surface 224. The first and second ends 230 and 232 can also be perpendicular to the vertical axis $A_2$ and can be positioned parallel relative to each other, thereby creating a cylindrical form of the seal retainer 114. The length $L_1$ of the seal retainer 114 can be dimensioned such that the seal retainer 114 can be positioned and retained within the second bore 214, e.g., the second counter bore, of the disc 112. The seal retainer 114 can be positioned fully within the second bore 214 of the disc 112 such that the disc 112 fully encloses the seal retainer 114 within the second bore 214. In some embodiments, the seal retainer 114 can be positioned within the second bore 214 of the disc 112 such that a portion of the seal retainer 114 remains protruding from the second bore 214.

Figure 14:
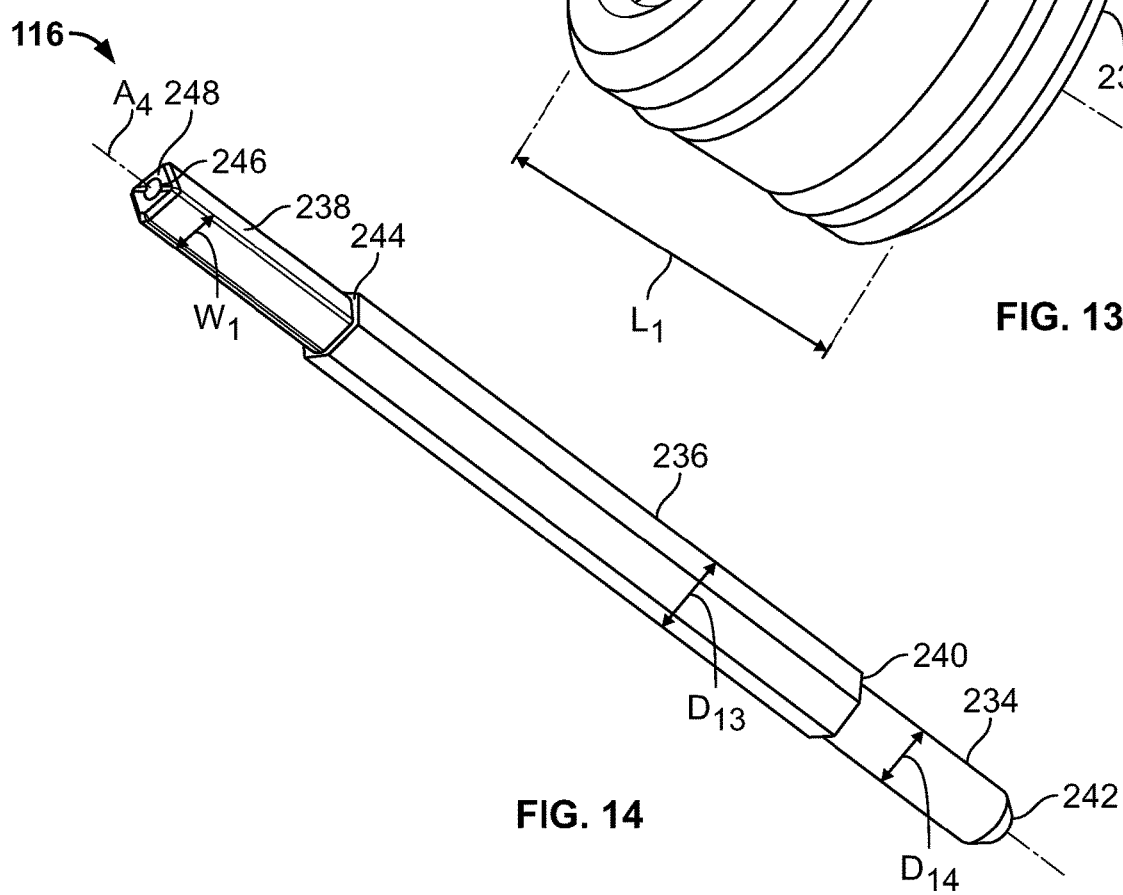
FIG. 14 shows a perspective view of a stem of an exemplary butterfly valve according to the present disclosure.

With reference to FIG. 14, a perspective view of an exemplary stem 116 of a butterfly valve 100 is provided. As noted above, the stem 116 can be part of the body assembly 102 of the butterfly valve 100. The stem 116 includes three sections, e.g., a first section 234, a second section 236 and a third section 238, each defining different cross-sections along the vertical axis $A_4$. The second section 236 defines a central section which connects to the first section 234 and the third section 238 at opposite ends of the second section 236. The second section 236 also defines a hexagonal cross-section with a diameter $D_{13}$. The diameter $D_{13}$ can be defined by the hexagon size or the linear distance between the points of the hexagonal cross-section.

The first section 234 defines a lower section of the stem 116 and further defines a round cross-section with a diameter $D_{14}$. The diameter $D_{14}$ of the first section 234 can be dimensioned smaller than the diameter $D_{13}$ of the second section 236 such that the diameter $D_{14}$ of the first section 234 is enclosed by the area of the diameter $D_{13}$ cross-section of the second section 236. The difference in dimensions between the diameter $D_{14}$ of the first section 234 and the diameter $D_{13}$ of the second section 236 also forms a first edge 240. The diameter $D_{14}$ of the first section 234 can also be dimensioned to allow the seal retainer 114 to receive the first section 234 of the stem 116 within the opening 222 of the seal retainer 114 and pass into the second bore 178 of the body 106. The first section 234 of the stem 116 can thereby be inserted into the opening 222 of the seal retainer 114 and the seal retainer 114 can be translated along the first section 234 of the stem 116 until the first end 230 or second end 232 of the seal retainer 114 abuts against the first edge 240, which prevents the seal retainer 114 from translating over the second section 236. A first section end 242 of the first section 234 opposing the first edge 240 can be tapered to reduce interference between the inner walls of the second bore 178 of the body 106 and the first section 234 as the stem 116 rotates within the body 106.

The third section 238 defines an upper end or a drive end of the stem 116 and opposes the first section 234. In the embodiment illustrated in FIG. 14, the third section 238 defines a square cross-section. In some embodiments (not shown), the third section 238 can define, e.g., a round cross-section with a keyway, a double D cross-section, or any shape suitable for being driven by components of the handle assembly 104, as will be discussed below. In some embodiments (not shown), the cross-section of the third section 238 can be selected based, e.g., to meet standardized industry codes, based on existing stem drives, based on specified stem drives, and the like. As will be discussed in greater detail below, the third section 238 can be employed to transfer a moment required to rotate the stem 116 of the butterfly valve 100, thereby facilitating movement of the disc 112 against the forces necessary to seal the disc 112 within the liner 110 and/or the forces created by the flow of fluid through the butterfly valve 100. In the embodiment illustrated in FIG. 14, the square cross-section of the third section 238 defines a width $W_1$ dimensioned smaller than the diameter $D_{13}$ of the second section 236 such that the width $W_1$ of the third section 238 is enclosed by the area of the diameter $D_{13}$ cross-section of the second section 236. The difference in dimensions between the width $W_1$ of the third section 238 and the diameter $D_{13}$ of the second section 236 also forms a second edge 244.

When assembled, the stem 116 does not include seals, such as O-rings, between the stem 116 and the body 106 or disc 112 along the length of the stem 116 extending between the first section 234 and the third section 238. For example, as described above, the body 106 includes a second bore 178 creating a partial passage or a blind hole into the thickness $T_4$ of the body 106 to prevent potential leaks from occurring via the second bore 178. The lack of seals along the length of the stem 116 prevents any potential fluid leakage, e.g., fluid leakage resulting from seal failure of the liner 110, from building pressure below the stem 116 or at any position along the stem 116. Rather, if a potential fluid leak occurs, the fluid leak can be released from the upper portion 156 of the butterfly valve 100 through the first bore 166 of the body 106. This relief of potential pressure prevents the creation of forces which could otherwise push or force the stem 116 out of the upper portion 156 of the butterfly valve 100 through the first bore 166 of the body 106.

As will be discussed below, the diameter $D_{14}$ of the first section 234, the diameter $D_{13}$ of the second section 236, and the width $W_1$ of the third section 238 can be dimensioned such that the stem 116 can be inserted into and passed through the diameter $D_2$ of the first section 168 of the first bore 166 of the body 106. The stem 116 also includes a threaded hole 246 at an upper end 248 which includes threading complementary to threading on a fastener 138 (e.g., a screw) of FIG. 1. As will be discussed below, the fastener 138 can be used to secure the handle assembly 104 to the body assembly 102. The gland 120 can be used to secure the stem 116 within the butterfly valve 100.

With reference to FIGS. 15 and 16, perspective and perspective cross-sectional views, respectively, of an exemplary bearing 118 of a butterfly valve 100 are provided. As noted above, the bearing 118 can be part of the body assembly 102 of the butterfly valve 100. The bearing 118 primarily defines a cylindrical shape along an external surface 250 extending along vertical axis $A_2$ and includes an opening 252 passing therethrough. The bearing 118 defines an overall length $L_2$, a length $L_3$ of a first opening section 254 and a length $L_4$ of a second opening section 256. The first opening section 254 can be configured and dimensioned to correspond to the cross-sectional shape of the second section 236 of the stem 116. Similarly, the second opening section 254 can be configured and dimensioned to correspond to the cross-sectional shape of the third section 238 of the stem 116. In the embodiment of FIGS. 15 and 16, the first opening section 254 cross-section can be configured as hexagonal to receive the hexagonally-shaped second section 236 of the stem 116 of FIG. 14 and the second opening section 254 cross-section can be configured as square to receive the square-shaped third section 238 of the stem 116 of FIG. 14. However, it should be understood that in some embodiments, the configurations of the first opening section 254 and the second section 236, and the second opening section 256 and the third section 238, can vary as long as the respective configurations are complementary relative to each other.

The difference in configurations between the first and second opening sections 254 and 256 forms an edge 258, step or a change of cross-section between the respective sections. The bearing 118 can be positioned on the upper end 248 of the stem 116 and the stem 116 can be passed through the bearing 118 until the edge 258 of the bearing 118 abuts or engages the second edge 244 of the stem 116. The edge 258 can control the position of the bearing 118 relative to the stem 116. The edge 258 can also facilitate an application of a load along the vertical axis $A_4$ of the stem 116 against the edge 244 of the stem 116 from the bearing 118 and through the edge 258. The load exerted on the edge 244 of the stem 116 can be paired to a load exerted by the second bore 178 of the body 106 on the stem 116 to retain the stem 116 within the body 106. In some embodiments, the edge 258 can facilitate the removal of the bearing 118 while the stem 116 is removed from a body assembly 102. In some embodiments, rather than an edge 258, the bearing 118 can include a shoulder created by adding a groove and a ring placed in the groove to emulate a shoulder. In some embodiments, the shoulder can engage an interior or one end of the bearing 118.

The inner surface of the second bore 178 of the body 106 can act as a bearing surface in and of itself. In some embodiments, a bearing can be contained in the second bore 178. The bearing 118 can include an upper surface 260 and a bottom surface 262 on opposing sides of the external surface 250. The lengths $L_3$ and $L_4$ can be dimensioned such that the bottom surface 264 abuts the edge formed by the connection of the first bore 212 and the hexagonal shaped bore 206 of the disc 112 and the upper surface 260 aligns with the connection between the first section 168 and the second section 170 of the first bore 166 of the body 106.

The first opening section 254 of the bearing 118 can thereby be positioned against a portion of the second section 236 of the stem 116 and the second opening section 256 can be positioned against a portion of the third section 238 of the stem 116. One purpose of the bearing 118 can be to position the upper end 248 of the stem 116 along the same centerline as formed by the second bore 178 of the body 106. Thus, the bearing 118 assists in aligning the vertical axis $A_1$ of the body 106 with the vertical axis $A_2$ of the bearing 116. The overall length $L_2$ of the bearing 118 can be dimensioned such that the bearing 118 traverses the first section 168 of the body 106, a portion of the liner 110, and a portion of the disc 112 when assembled within the butterfly valve 100.

In some embodiments, the bearing 118 can include one or more grooves 264 radially located relative to the vertical axis $A_2$ along the external surface 250. The grooves 264 can be located on the external surface 250 of the bearing 118 which rests adjacent to first bore 198 of the liner 110 and/or the first bore 212 of the disc 112. The grooves 264 can be configured and dimensioned to receive seals, e.g., O-rings (not shown), therein to provide a seal between the bearing 118, the liner 110 and/or the disc 112. The seal (not shown) can provide an additional barrier to fluids retained within the butterfly valve 100 from coming in contact with the stem 116 and/or leaking external to the butterfly valve 100 if the seal between the liner 110 and the disc 112 is compromised.

With reference to FIG. 17, a perspective view of an exemplary gland 120 of a butterfly valve 100 is provided. As noted above, the gland 120 can be part of the body assembly 102 of the butterfly valve 100. The gland 120 includes a central bore 266 extending through the gland 120 and aligned with the vertical axis $A_2$. The central bore 266 can be configured and dimensioned to allow the stem 116 to pass therethrough without contact. An external surface 268 or diameter of the gland 120 can include threads 270 thereon which can be complementary to the threads within the second section 170 of the body 106, e.g., the threaded counter bore. Thus, the gland 120 can be positioned between the body 106 and the stem 116 and can be secured into the body 106 via the threads 270 on the external surface 268 of the gland 120.

The gland 120 thereby retains the stem 116 within the body 106 along the vertical axis $A_1$ of the first and second bores 166 and 178 of the body 106. In particular, an upper surface 272 of the gland 120 can include a protrusion 274 or provision extending therefrom along the vertical axis $A_2$ which can be configured such that, e.g., a hex ratchet tool can be used to apply a torque to the gland 120 during assembly to thread the gland 120 into the body 106. An opposing bottom surface 276 of the gland 120 can be substantially perpendicular to the cylindrical length of the gland 120 and can be used to shoulder the gland 120 against one end of the bearing 118. In particular, as the gland 120 is threaded into the second section 170 of the body 106, the bottom section 278 of the gland 120 can pass into the first section 168 of the first bore 166 of the body 106 and the bottom surface 276 can provide a load or force against the upper surface 260 of the bearing 118. The load or force against the upper surface 260 of the bearing 118, in turn, transfers the load or force against the second edge 244 of the stem 116 to maintain the stem 116 within the body 106. In some embodiments, rather than providing a load or force against the upper surface 260 of the bearing 118, at least a portion of the bottom section 278 of the gland 120 can shoulder on the inside of the body 106, thereby limiting the space allowed for the stem 116 to move in the direction of the first bore 166 of the body 106. The stem 116 can thereby be fully contained within the body assembly 102 and stem 116 blowout can be prevented. In addition, the lack of seals directly in contact with the outer surface of the stem 116 minimizes the risk of a stem 116 blowout, e.g., pressure pushing the stem 116 from within the butterfly valve 100. In particular, since the second bore 178 of the body 106 is configured as a blind counter bore from within the body 106, no leak path through the lower section of the body 106 is created. Thus, the lack of seals between the stem 116 and the blind lower counter bore, e.g., the second bore 178 of the body 106, reduces the potential for pressure build-up which may cause stem 116 blowout. Potential pressure build-up can therefore be relieved to the atmosphere.

With reference to FIG. 18, a perspective view of an exemplary junk seal 122 of a butterfly valve 100 is provided. As noted above, the junk seal 122 can be part of the body assembly 102 of the butterfly valve 100. The junk seal 122 can be disc-shaped and substantially flat in configuration and defines a thickness $T_5$. An external diameter $D_{15}$ of the junk seal 122 can be dimensioned to correspond to the diameter $D_4$ of the third section 172 of the first bore 166 of the body 106 and can be dimensioned less than the lead-in chamfer or diameter $D_5$ of the fourth section 174 of the first bore 166. The junk seal 122 can include an opening 280 centered along the vertical axis $A_2$. The opening 280 can be configured and dimensioned to correspond to the cross-section of the third section 238 of the stem 116, e.g., a square cross-section.

After the gland 120 has been secured within the body 106, the third section 238 of the stem 116 can be passed through the opening 280 of the junk seal 122 and the junk seal 122 can be placed within the third section 172 of the first bore 166 of the body 106. The junk seal 122 can inhibit the ingress of, e.g., environmental debris, dirt, liquids, and the like, through first bore 166 of the body 106 into the space between the bearing 118 and the stem 116, the bearing 118 and the body 106 and/or additional places inside the butterfly valve 100 located below the junk seal 122.

Figure 19:
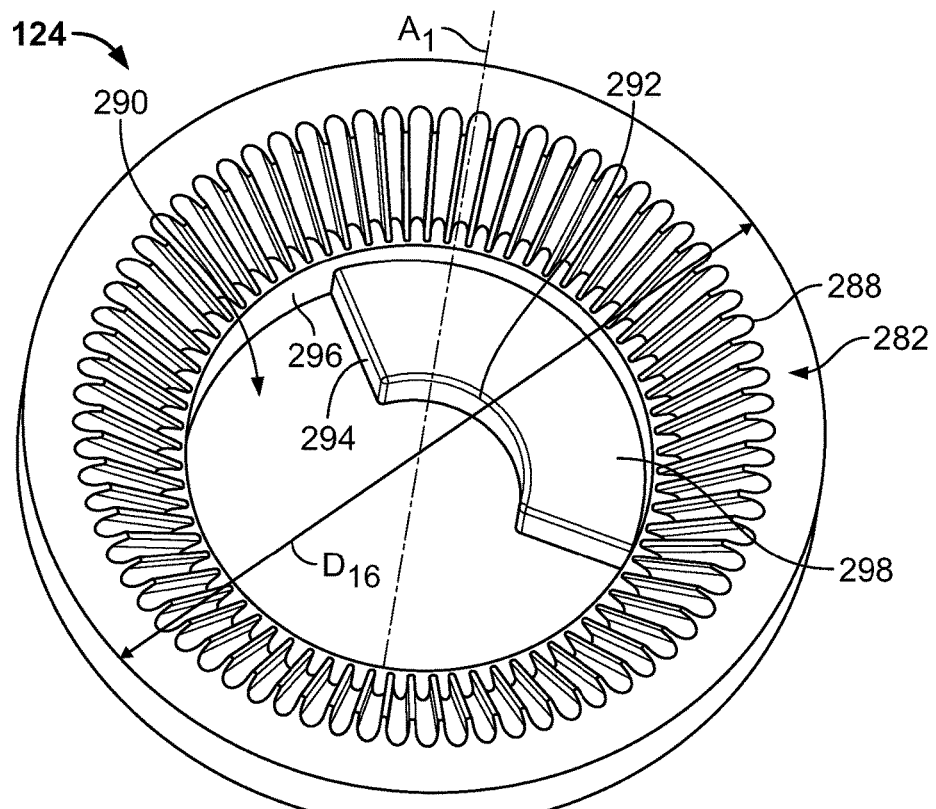
FIG. 19 shows a top, perspective view of a first embodiment of a cog of an exemplary butterfly valve according to the present disclosure.
Figure 20:
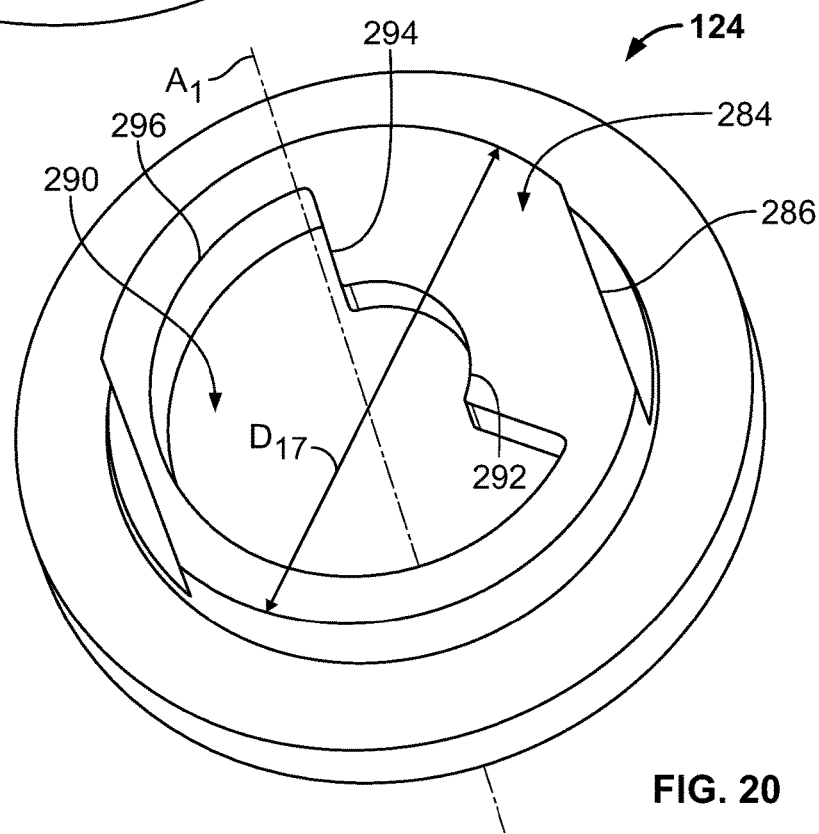
FIG. 20 shows a bottom, perspective view of a first embodiment of a cog of an exemplary butterfly valve according to the present disclosure.

With reference to FIGS. 19 and 20, top and bottom perspective views, respectively, of a first embodiment of an exemplary cog 124 of a butterfly valve 100 are provided. As noted above, the cog 124 can be part of the body assembly 102 of the butterfly valve 100. As will be discussed below, the cog 124 forms a load-bearing interface between the body assembly 102 and the handle assembly 104. In particular, the load-bearing interface between the body assembly 102 and the handle assembly 104 can be created by the cog 124 and the force ring 128. The cog 124 includes a centrally positioned vertical axis $A_1$ passing therethrough and includes an upper surface 282 and a bottom surface 284. The upper surface 282 can define a diameter $D_{16}$ which is dimensioned greater than the diameter $D_5$ of the fourth section 174 of the first bore 166 of the body 106. The bottom surface 284 can define a diameter $D_{17}$ which corresponds to the cross-section and diameter $D_5$ of the fourth section 174 of the first bore 166 of the body 106. The upper surface 282 of the cog 124 can therefore be positioned against the flat upper surface 160 of the body 106, while the bottom surface 284 of the cog 124 can be fitted within the fourth section 174 of the first bore 166. A connection between the upper surface 282 and the bottom surface 284 of the cog 124 can be, e.g., angled, stepped, and the like. The bottom surface 284 can include at least one step 286 for detachably mating with the step 176 of the fourth section 174 of the body 106 such that the cog 124 does not rotate within the fourth section 174. In particular, the shape and fit of the bottom surface 284 of the cog 124 can be configured such that torsion is resisted when the handle assembly 104 is moved or rotated relative to the body assembly 102 while in an engaged position.

The upper surface 282 of the cog 124 includes a radial pattern of splines 288, e.g., grooves, radially positioned around the vertical axis $A_1$. In some embodiments, the radial pattern of splines 288 can radially extend 360 degrees around the vertical axis $A_1$ to create spline 288 engagement around a full circumference of the cog 124. In some embodiments, the radial pattern of splines 288 can radially extend less than 360 degrees. In some embodiments, the splines 288 of the cog 124 and the splines of the force ring 128 can overlap or mate by a total of 50 degrees or more during operation. In particular, as will be discussed below, the splines 288 of the cog 124 can be configured and dimensioned to correspond to radial protrusions or splines located on the force ring 128 to permit detachable interlocking between the force ring 128 and the cog 124. In some embodiments, the splines 288 of the cog 124 and the corresponding splines of the force ring 128 can be set at an approximately 45 degree angle to allow extension of the splines, e.g., a length of teeth, which can result in a maximized shear area for the cog 124 and the force ring 128 of the established inside and outside diameters. In some embodiments, the splines 288 of the cog 124 and the splines of the force ring 128 can be set at any angle, including 0 degrees or 90 degrees, e.g., flat or vertical, as long as sufficient clearance is available to fully disengage the force ring 128 from the cog 124 to rotate the force ring 128 relative to the cog 124. In some embodiments, the configuration of the splines 288 on the cog 124 and the complementary splines on the force ring 128 can be configured as, e.g., ball and socket, spherical cup and cone, and the like. Although illustrated as splines 288, it should be understood that in some embodiments, the splines 288 can take the form of any pattern that would permit meshing between the cog 124 and the force ring 128. In addition, although illustrated as a separate component relative to the body 106, in some embodiments (not shown), the splines 288 and/or the cog 124 can be fabricated as an integral feature of the body 106, e.g., molded as part of the body 106, to prevent interference with mounting actuation on the butterfly valve 100.

The vertical axis $A_1$ passing through the cog 124 perpendicular to the upper surface 282 and the interfacing geometry can correspond to the vertical axis $A_4$ of the stem 116 when assembled within the butterfly valve 100. The cog 124 includes a partial bore 290 passing therethrough to allow the stem 116 to pass through the cog 124 and rotate within the cog 124 without interference. In particular, the partial bore 290 includes a central bore 292 passing fully through the cog 124 to allow the stem 116 to pass through the cog 124. The partial bore 290 further includes a partial outer bore 294 including a volume removed over an arc of, e.g., approximately 225 degrees, surrounded by an inner edge 296 of the radial splines 288 or grooves, and encompassing the volume removed for the stem clearance, e.g., the central bore 292. The resulting or remaining material creates a segment 298 of, e.g., approximately 135 degrees, through an arc of a particular width and thickness.

As will be discussed in greater detail below, the segment 298 can be implemented with a similar 135 degree segment (not shown) located on the handle body 126 which prohibits the handle body 126 from being rotated beyond an approximately quarter turn operation of the butterfly valve 100. In particular, the segment 298 regulates the amount of rotation permitted by the handle assembly 104 relative to the body assembly 102. The segment 298 and a similar segment on the handle body 126 can act as a robust stop which allows approximately 90 degrees of rotational space between the cog 124 and the handle body 126. In some embodiments, rotation past 90 degrees can be provided for rotational displacement of the disc 112, the stem 116 and the handle assembly 104 due to a fit or a torsion stress, such that the disc 112, the liner 110 and the body 106 can be aligned for suitable sealing to maintain a differential line pressure or a barrier to flow. It should be understood that the furthest opposing positions of rotation of the handle assembly 104 relative to the body assembly 102 designate the fully open and fully closed positions of the butterfly valve 100. Although discussed herein as approximately 225 degrees of the partial outer bore 294 and approximately 135 degrees of the segment 298, in some embodiments, a variety of angles can be used to create a variety of rotational limitations of the handle assembly 104 relative to the body assembly 102.

Figure 21:
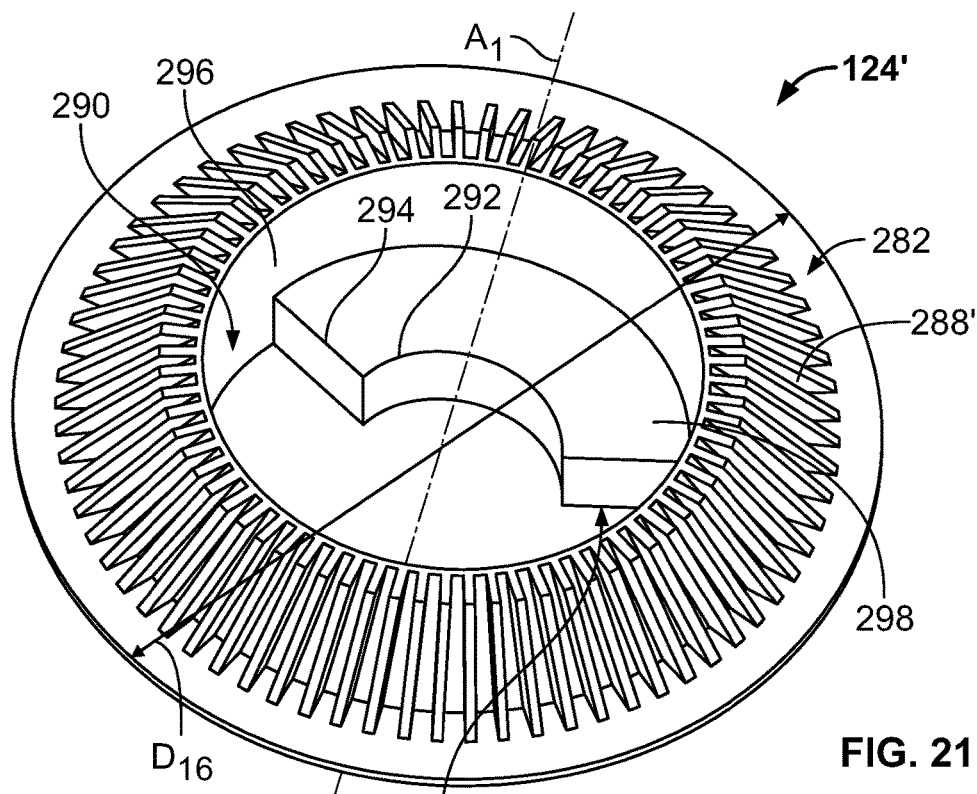
FIG. 21 shows a top, perspective view of a second embodiment of a cog of an exemplary butterfly valve according to the present disclosure.

With reference to FIG. 21, a top perspective view of a second embodiment of an exemplary cog 124' is provided. The cog 124' can be substantially similar to the cog 124 of FIGS. 19 and 20 in structure and function, except for the distinctions discussed herein. It should be noted that the structures of the cog 124' which are similar to the structures of the cog 124 of FIGS. 19 and 20 are depicted in FIG. 21 with like reference characters as those utilized in FIGS. 19 and 20. In particular, rather than including splines 288 configured as a plurality of radial grooves, in some embodiments, the cog 124' of FIG. 21 includes a plurality of radially positioned splines 288' configured as raised extensions or protrusions. In embodiments implementing a cog 124' including a plurality of extending splines 288', a force ring 128 can be utilized which includes complementary grooves configured and dimensioned to receive and interlock with the splines 288' of the cog 124'. In particular, it should be understood that in various embodiments, the splines 288' of the cog 124' and the splines or grooves of the force ring 128 can include complementary geometries for mating relative to each other such that the handle assembly 104 can be detachably interlocked relative to the body assembly 102 to maintain a desired position of the butterfly valve, e.g., open, partially opened at a specific angle, or closed.

Figure 22:
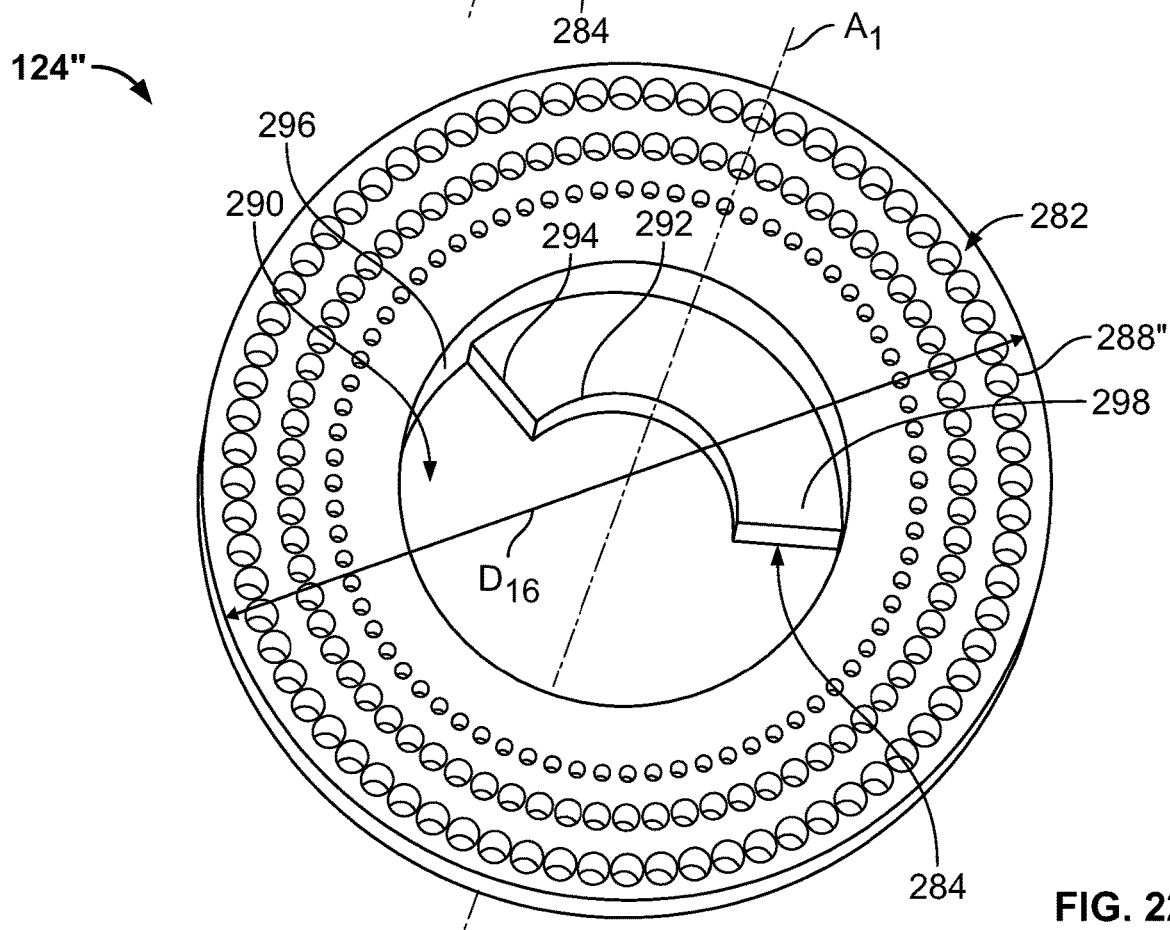
FIG. 22 shows a top, perspective view of a third embodiment of a cog of an exemplary butterfly valve according to the present disclosure.

With reference to FIG. 22, a top perspective view of a third embodiment of an exemplary cog 124" is provided. The cog 124" can be substantially similar to the cog 124 of FIGS. 19 and 20 in structure and function, except for the distinctions discussed herein. It should be noted that the structures of the cog 124" which are similar to the structures of the cog 124 of FIGS. 19 and 20 are depicted in FIG. 22 with like reference characters as those utilized in FIGS. 19 and 20. In particular, rather than including splines 288 configured as a plurality of radial grooves, in some embodiments, the cog 124" of FIG. 22 includes a plurality of radially positioned openings 288" configured as differently sized indentations. For example, as illustrated in FIG. 22, the cog 124" can include three rows of radially positioned openings 288" relative to the vertical axis $A_1$ and the diameter of the openings 288" can be greater when positioned farther from the vertical axis $A_1$ and smaller when positioned closer to the vertical axis $A_1$.

In embodiments implementing a cog 124" including a plurality of openings 288", a force ring 128 can be utilized which includes complementary radially positioned protrusions of varying diameters configured and dimensioned to interlock with the openings 288" of the cog 124". In particular, it should be understood that in various embodiments, the openings 288" of the cog 124" and the protrusions of the force ring 128 can include complementary geometries for mating relative to each other such that the handle assembly 104 can be detachably interlocked relative to the body assembly 102 to maintain a desired position of the butterfly valve, e.g., open, partially opened at a specific angle, or closed.

Figure 23:
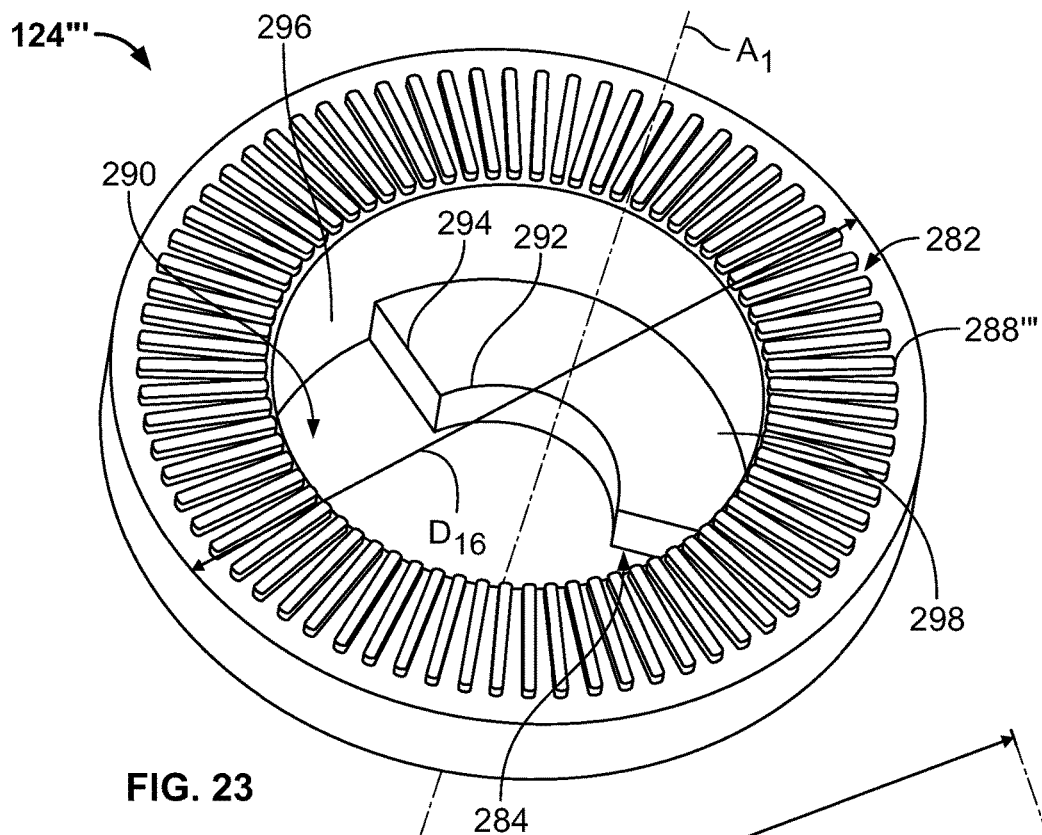
FIG. 23 shows a top, perspective view of a fourth embodiment of a cog of an exemplary butterfly valve according to the present disclosure.

With reference to FIG. 23, a top perspective view of a fourth embodiment of an exemplary cog 124''' is provided. The cog 124''' can be substantially similar to the cog 124 of FIGS. 19 and 20 in structure and function, except for the distinctions discussed herein. It should be noted that the structures of the cog 124''' which are similar to the structures of the cog 124 of FIGS. 19 and 20 are depicted in FIG. 23 with like reference characters as those utilized in FIGS. 19 and 20. In particular, rather than including splines 288 configured as a plurality of radial grooves, in some embodiments, the cog 124''' of FIG. 23 includes a plurality of radially positioned protrusions 288''' positioned along a substantially flat upper surface 282. For example, as illustrated in FIG. 23, the cog 124''' can include radially positioned protrusions 288''' relative to the vertical axis $A_1$.

In embodiments implementing a cog 124''' including a plurality of protrusions 288''' positioned along a substantially flat upper surface 282 perpendicular to the vertical axis $A_1$, a force ring 128 can be utilized which includes complementary radially positioned grooves positioned along a substantially flat surface and configured and dimensioned to interlock with the protrusions 288''' of the cog 124'''. In particular, it should be understood that in various embodiments, the protrusions 288''' of the cog 124''' and the openings of the force ring 128 can include complementary geometries for mating relative to each other such that the handle assembly 104 can be detachably interlocked relative to the body assembly 102 to maintain a desired position of the butterfly valve, e.g., open, partially opened at a specific angle, or closed.

Figure 24:
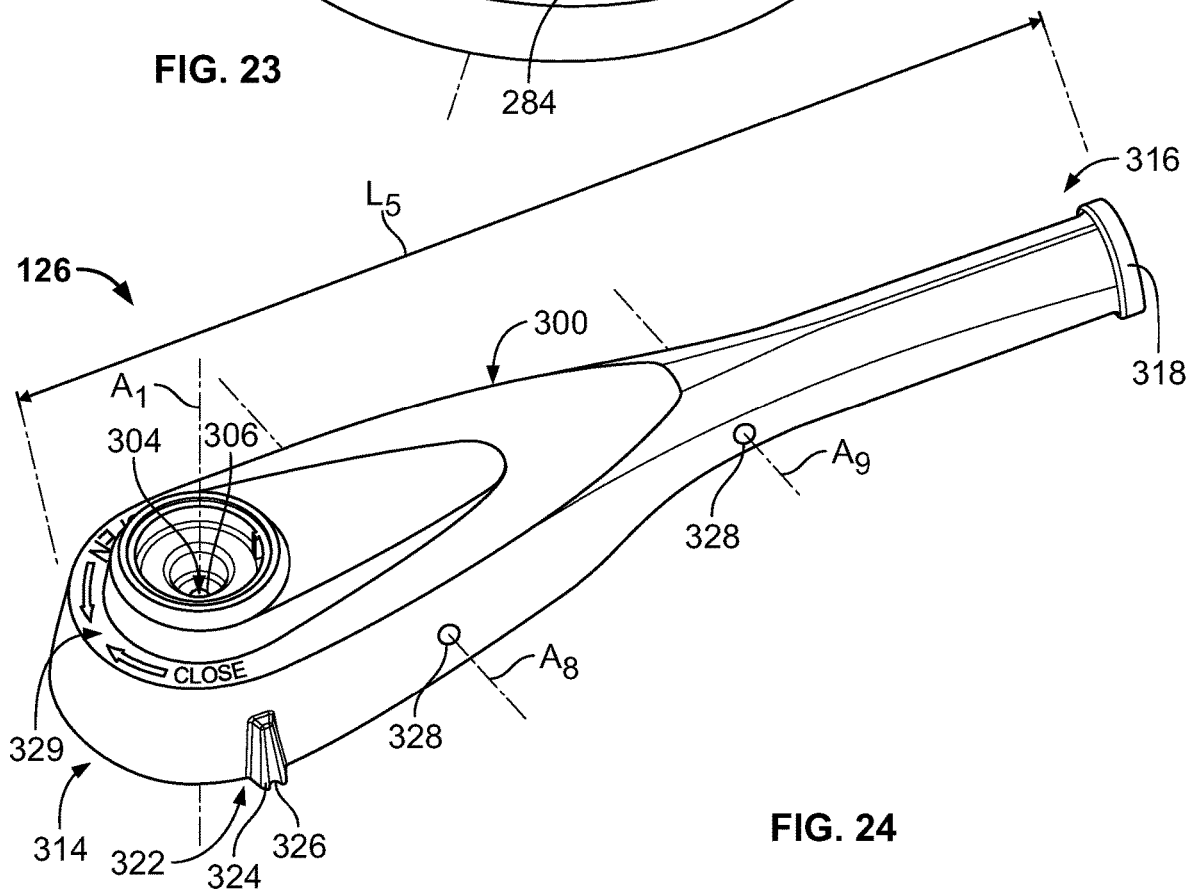
FIG. 24 shows a top, perspective view of a handle body of an exemplary butterfly valve according to the present disclosure.
Figure 25:
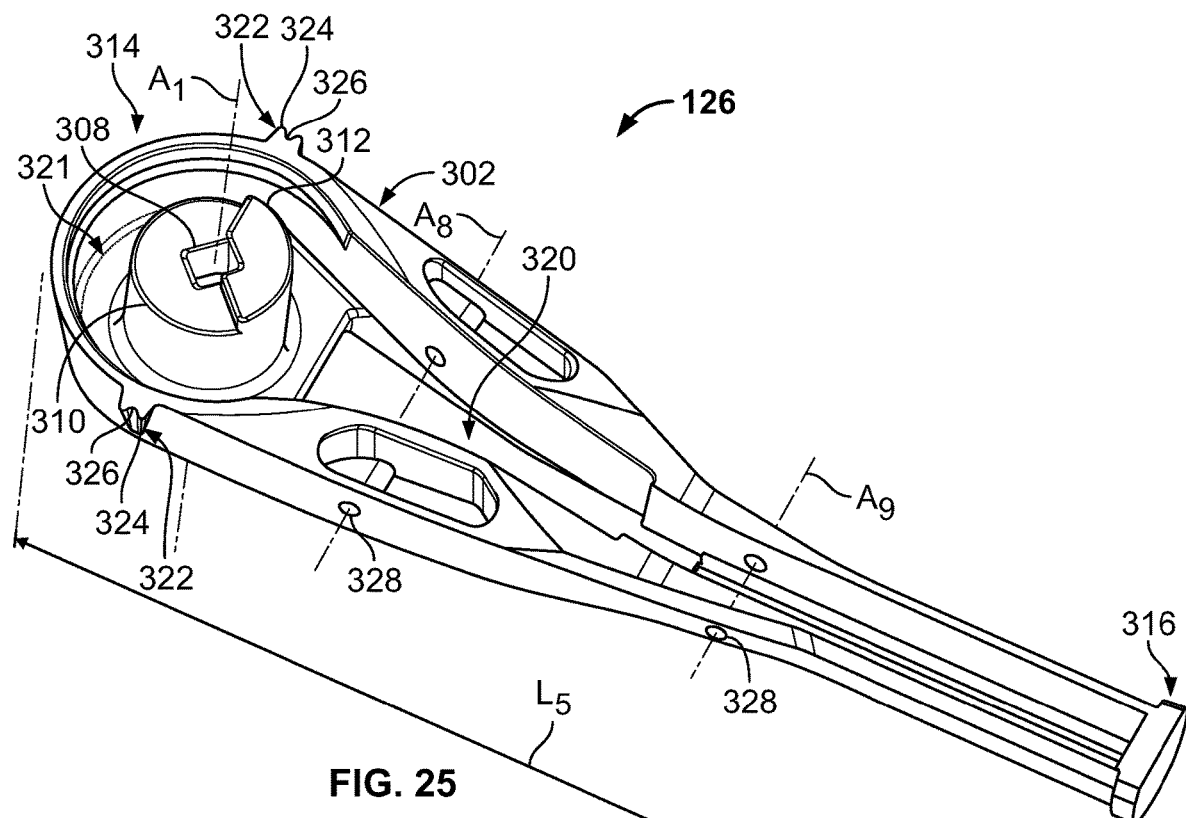
FIG. 25 shows a bottom, perspective view of a handle body of an exemplary butterfly valve according to the present disclosure.

Turning now to FIGS. 24 and 25, top and bottom perspective views, respectively, of an exemplary handle body 126 of a butterfly valve 100 are provided. As noted above, the handle body 126 can be part of the handle assembly 104 of the butterfly valve 100. The handle body 126 generally defines an elongated component of the butterfly valve 100 which can be positioned to extend perpendicularly relative to the vertical axis $A_1$. The handle body 126 includes an upper surface 300 and a bottom surface 302. The handle body 126 further includes a bore 304 extending therethrough along the vertical axis $A_1$, e.g., the axis along which the vertical axis $A_4$ of the stem 116 can be aligned when the butterfly valve 100 is assembled.

On the upper surface 300, the bore 304 can include a first bore section 306 configured as a circular bore. The upper surface 300 further includes a counter bore leading to the first bore section 306 configured and dimensioned to receive therein a first washer 140, a second washer 142 and a handle bezel 144 of FIG. 1. On the bottom surface 302, the bore 304 can include a second bore section 308, e.g., a recess, configured to correlate to the cross-sectional shape of the third section 238 of the stem 116. In the embodiment illustrated in FIGS. 24 and 25, the second bore section 308 is configured as substantially square in cross-section corresponding to the square cross-section of the third section 238 of the stem 116 of FIG. 14. When the body assembly 102 is assembled, at least part of the third section 238 of the stem 116 can extend out of the body 106 such that the third section 238 of the stem 116 can be inserted into at least a portion of the second bore section 308 of the handle body 126.

The handle body 126 includes a boss 310 on the bottom surface 302 which surrounds the second bore section 308 which mates to the stem 116. In some embodiments, the boss 310 can be fabricated from a single material. In some embodiments, the boss 310 can be fabricated from two or more materials. For example, a first material can be a separately produced component which can be placed in a mold such that the first material becomes over-molded by the material of the handle body 126. This component of the boss 310, e.g., a drive insert (not shown), can include a hole passing through its center axis which has a cross-section corresponding to the third section 238 of the stem 116. Alternatively, the drive insert or third section 238 can be, e.g., pressed into, welded into, glued, or secured by means other than over-molding. In some embodiments, one or more keyways (not shown) on an outer surface of the drive insert along axial paths parallel to the vertical axis $A_4$ of the stem 116 can be used to secure the drive insert relative to the handle body 126. The one or more keyways of the drive insert can correspond to keyways manufactured into the coincident surface of the handle body 126 (not shown).

The embodiment including the keyway(s) may be advantageous when keys are tailored to fail in shear at a given load applied to the handle body 126 while rotating the valve internals, e.g., the stem 116 and the disc 112, of the butterfly valve 100. For example, the keys can be configured to withstand a predetermined amount of shear force which is less than the shear force the handle body 126 can withstand. Thus, when a force greater than the predetermined shear force is applied to the handle body 126, rather than the handle body 126 failing in shear, one or more of the keys can fail in shear to prevent damage to the handle body 126. In particular, before the shear force the handle body 126 can withstand is reached, one or more of the keys can fail to prevent damage to the handle body 126. In some embodiments, the keys can be, e.g., square, round, rectangular, or of any shape that allows the keys to resist shear loads generated by operation of the butterfly valve 100. In some embodiments, the geometry of the keys may be molded or manufactured into the handle body 126 and/or the drive insert as an integral feature of the handle body 126 or drive insert of the boss 310. The boss 310 further includes a step 312 protruding therefrom which can interlock relative to the cog 124 of the body assembly 102 to limit the amount of rotation permitted by the handle assembly 104.

Referring to FIGS. 24 and 25, the handle body 126 defines a proximal end 314 relative to the vertical axis $A_1$ and a distal end 316 positioned away from the vertical axis $A_1$. The proximal end 314 defines a substantially circular configuration. The distal end 316 can define a semi-round cross-section. However, it should be understood that in some embodiments, other configurations of the distal end 316 cross-section can be used, e.g., square, round, rectangular, and the like. The distal end 316 can include a protrusion 318 which forms, e.g., a ring-like edge at the furthest extremity of the distal end 316.

The handle body 126 can include a shrouding volume 321 which encloses the internals near the proximal end 314. In particular, the handle body 126 can include a cavity 320 and a shrouding volume 321 extending along the bottom surface 302 of the handle body 126 such that the inner volume of the handle body 126 can be substantially hollow and surrounded by side walls. The upper surface 300 of the proximal end 314 can include two protrusions 322 or notches extending therefrom parallel to the vertical axis $A_1$ and extending from an edge of the bottom surface 302 of the shrouded volume 321. Each of the two protrusions 322 can define a face that creates two rounded points 324 with a rounded bridging area 326 bridging the points 324. Each of the two protrusions 322 can be positioned approximately 180 degrees relative to each other along the outer surface of the proximal end 314. A plane (not shown) passing through both protrusions 322 would therefore be perpendicular to the axis created by the length $L_5$ of the handle body 126. As the handle assembly 104 rotates the disc 112 relative to the body assembly 102, the protrusions 322 can rotate and align relative to the visual indicators 184 on the body indicator bezel 108 to indicate to a user the position of the butterfly valve 100, e.g., a closed position, a fully open position, or an angle or degree of a partially open position. In particular, the protrusions 322 or notches on the handle body 126 can partially surround the visual indicators 184 on the body indicator bezel 108 and can provide a greater visibility in indicating a precise position of the disc 112 relative to the body 106.

As will be discussed in greater detail below, the shrouded volume 321 and/or cavity 320 of the handle body 126 can be configured and dimensioned to receive therein the force ring 128, the lever 130, the grip 134 and the spring 136 of FIG. 1. The cross-section along the length $L_5$ of the handle body 126 can vary accordingly to contain the inner components of the handle assembly 104, e.g., the force ring 128, the lever 130, the grip 134 and the spring 136. The handle body 126 also includes pin holes 328 extending horizontally through the handle body 126. In particular, the pin holes 328 can extend through the handle body 126 along a plane (not shown) defined by the length $L_5$ of the handle body 126. Further, a first pin hole 328 can extend through the handle body 126 along a longitudinal axis $A_8$ and a second pin hole 328 can extend through the handle body 126 along a longitudinal axis $A_9$. The longitudinal axes $A_8$ and $A_9$ can be parallel relative to each other and perpendicular relative to the vertical axis $A_1$. The pin holes 328 can be configured and dimensioned to receive therein pivot pins 132a and 132b of FIG. 1 to create pivot points for the lever 130 and the grip 134, respectively, when assembled with the handle body 126. In particular, the pin 132a can be used to create a pivot point for the lever 130 and the pin 132b can be used to create a pivot point for the grip 134. The pivot pins 132a and 132b can also be used to secure the location of the lever 130 and the grip 134, respectively, relative to the handle body 126 and/or relative to each other.

A length $L_5$ of the handle body 126 can be dimensioned such that a user can apply a load to one end of the handle assembly 104, e.g., a distal end 316, and create a rotation of the stem 116 and disc 112 within the body 106. In particular, the handle body 126 can be attached to the stem 116 that intersects the body 106 and on the third section 238 of the stem 116 which extends beyond the outer envelope of the body 106. A load can be applied along the length $L_5$ of the handle body 126 at a distance from the vertical axis $A_1$, e.g., the butterfly valve 100 centerline, such that a moment can be created about the stem 116 axis, e.g., the vertical axis $A_4$. As the handle body 126 moves through an approximately 90 degree arc, the stem 116 can rotate through a corresponding angle to position the butterfly valve 100 in, e.g., an open position, a partially open position, or a closed position. In some embodiments, the handle body 126 can include designations 329 along the upper surface 300 on the proximal end 314 to indicate which direction the handle body 126 may be rotated in to, e.g., open or close the butterfly valve 100. For example, as illustrated in FIG. 24, the designations 329 can be "OPEN" and "CLOSE" with arrows pointing in the appropriate direction of rotation to perform each action.

Figure 26:
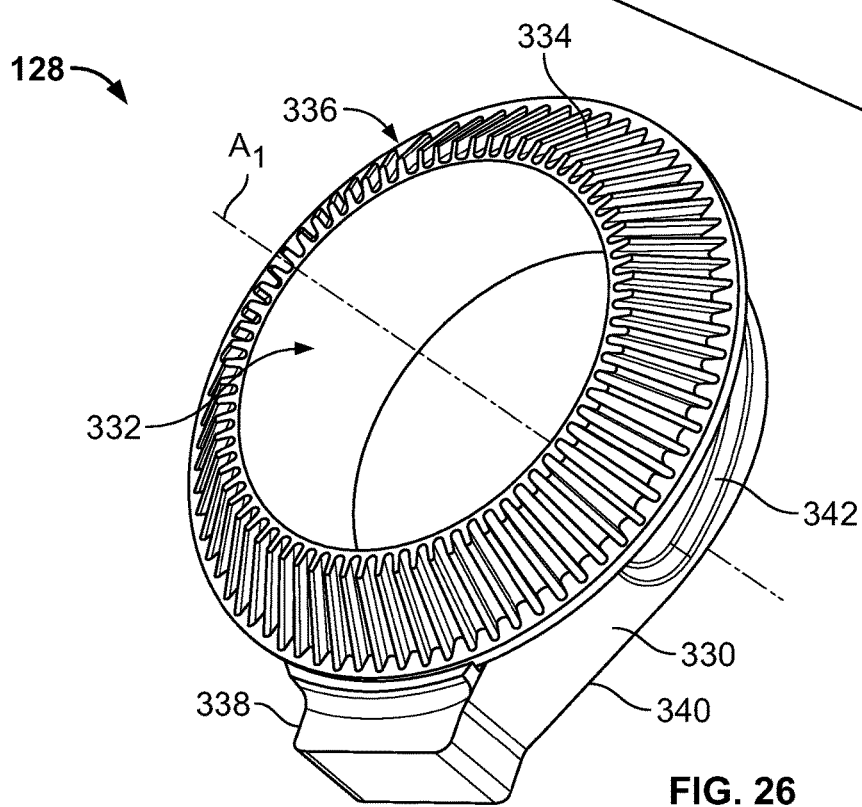
FIG. 26 shows a bottom, perspective view of a first embodiment of a force ring of an exemplary butterfly valve according to the present disclosure.
Figure 27:
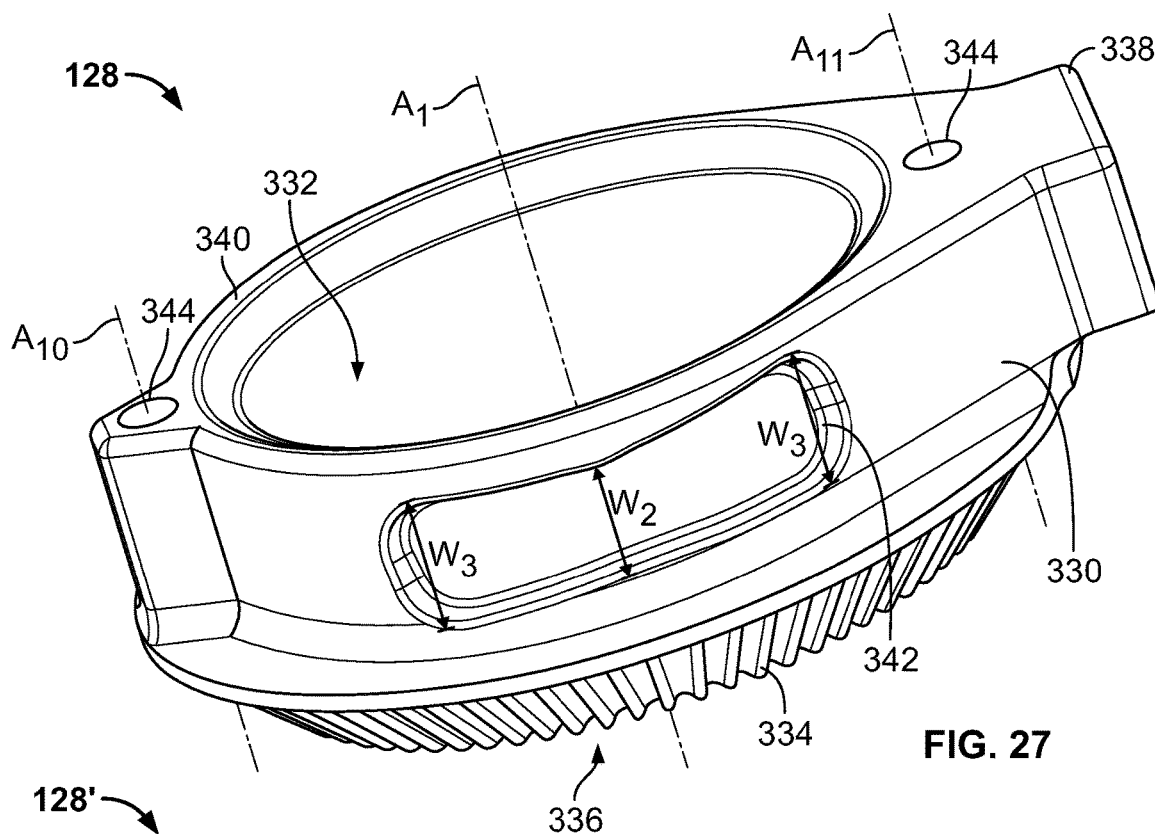
FIG. 27 shows a top, perspective view of a first embodiment of a force ring of an exemplary butterfly valve according to the present disclosure.

With reference to FIGS. 26 and 27, bottom and top perspective views, respectively, of a first embodiment of an exemplary force ring 128 of a butterfly valve 100 are provided. The force ring 128 includes a vertical axis $A_1$ passing centrally therethrough. The force ring 128 defines a substantially circular outer surface 330 and includes a bore 332 or hole passing therethrough and centered along the vertical axis $A_1$, e.g., the centerline for the stem 116. The force ring 128 includes radial pattern of splines 334 along the bottom surface 336, e.g., protrusions, which can be configured and dimensioned to mate with the splines 288 of the cog 124 as discussed above. In some embodiments, the radial pattern of splines 334 can radially extend 360 degrees around the vertical axis $A_1$ to allow spline 334 and 288 engagement between the force ring 128 and the cog 124 around a full 360 degrees of contact. In some embodiments, the radial pattern of splines 334 can radially extend less than 360 degrees. In some embodiments, the splines 288 of the cog 124 and the splines 334 of the force ring 128 can overlap by a total of 50 degrees or more during operation.

Off a plane (not shown) parallel to the pattern of splines 334, the force ring 128 can include a rectangular protrusion 338, such as an extrusion, encompassing the bore 332, e.g., a through hole, and bounded within the handle body 126. In some embodiments, the protrusion 338 can be configured as a cylindrical protrusion. The rectangular protrusion 338 can define an upper surface 340 of the force ring 128 and includes two slots which trace an arc along and define the outer surface 330 fillet of the protrusion 338. A second set of slots 342 or grooves follow a similar path and are symmetrically canted across the center plane of the original groove perpendicular to the face formed by the splines 334. The resulting composite slots 342, e.g., side slots, define a depth of the original slot and a cross-sectional width that varies from its thinnest at the middle of the arc traced by the slot 342, e.g., width $W_2$, and the widest at the extents of the slot 342, e.g., width $W_3$. The shape or configuration of the slots 342 facilitates the use of components associated with the lever 130, as will be discussed below, to engage and disengage the splines 334, e.g., mating grooves and protrusions, between the cog 124 and the force ring 128.

The force ring 128 can thereby be implemented within the handle assembly 104 to engage the cog 124 of the body assembly 102 and hinder the rotation of the stem 116 while using the handle assembly 104 as part of the butterfly valve 100. The mating splines 334 between the cog 124 and the force ring 128 facilitate positioning the butterfly valve 100 in open, closed or intermediate positions. In some embodiments, the splines 334 of the force ring 128 and the splines 288 of the cog 124 can mesh on the opposing force ring 128 and the cog 334 by defining long spline faces that are nearly perpendicular to the surface from which they protrude. In some embodiments, the splines 288 and/or 334 can be minimized to create a surface that relies on friction to maintain the relative rotational position of the force ring 128 relative to the cog 124. In some embodiments, the splines 288 and/or 334 can mesh while defining a face that is inclined relative to the surface from which it extends. The inclined spline configuration can be used to allow movement of the force ring 128 and the cog 124 relative to each other by allowing the user to lift the force ring 128 off the cog 124 to disengage the splines 288 and 334 and to rotate the force ring 128 relative to the cog 124 to vary a position of the disc 112. A distance between the force ring 128 and the cog 124 can thereby be varied to allow disengagement of the force ring 128 relative to the cog 124. When the desired position of the disc 112 has been achieved, the splines 288 and 334 of the force ring 128 and the cog 124 can be engaged by lowering the force ring 128 onto the cog 124 to maintain the desired position of the disc 112.

In some embodiments, the splines 334 of the force ring 128 can be positioned along a truncated conical shape of the force ring 128, while the cog 124 includes a mating female conical shaped counter bore with splines 288. In some embodiments, the angle of the conical shape of the force ring 128 and the cog 124 can be any angle, including 0 degrees, e.g., flat, in which case the force ring 128 and the cog 124 engagement surfaces could be flat, and 90 degrees, e.g., vertical, in which case the male force ring 128 could be cylindrical and the female cog 124 could be a cylindrical counter bore. In some embodiments, the cog 124 and the force ring 128 could be inverted, such that the cog 124 assumes a male truncated cone shape and the force ring 128 assumes a female conical shaped counter bore. In some embodiments, the splines 288 of the cog 124 and the splines 334 of the force ring 128 can be minimized or modified to the point that the friction between the two mating surfaces holds the position of the handle assembly 104 relative to the body assembly 102.

In some embodiments, a rotational load can be supplied to the force ring 128 via the handle body 126. One or more springs 136 of FIG. 1 can be positioned between the handle body 126 and the force ring 128 to maintain a biasing force for biasing the force ring 128 against the cog 124. In particular, the force ring 128 can include one or more partial bores 344 located at the upper surface 340 of the force ring 128 configured and dimensioned to receive a spring 136. The partial bores 344 can extend partially into the force ring 128 to a distance sufficient to receive the spring 136 and can extend along vertical axes $A_{10}$ and $A_{11}$ positioned parallel to the vertical axis $A_1$ and radially positioned at approximately 180 degrees relative to each other and around the vertical axis $A_1$. Thus, as the force ring 128 rotates, the inclined portions of the splines 334 can slide over each other and relative rotational movement can be accomplished. The splines 334 can mesh with the splines 288 of the cog 124 due to the spring load created by the springs 136 and the process can be repeated, as will be discussed below, as long as a sufficient load can be applied to the handle assembly 104 to disengage the force ring 128 from the cog 124. This "ratcheting" rotation accomplishes operation of the butterfly valve 100.

Figure 28:
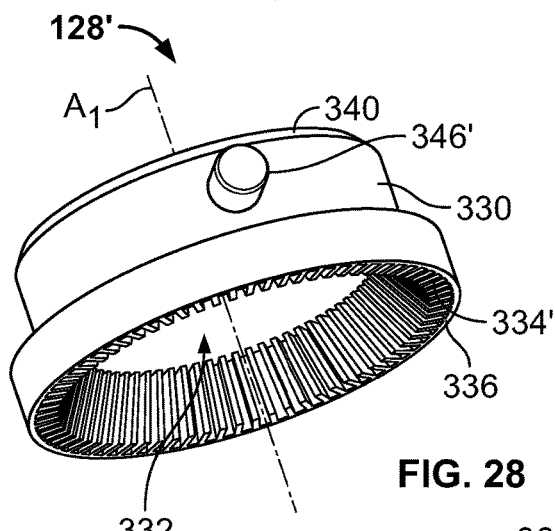
FIG. 28 shows a perspective view of a second embodiment of a force ring of an exemplary butterfly valve according to the present disclosure.

With reference to FIG. 28, a perspective view of a second embodiment of an exemplary force ring 128' of a butterfly valve 100 is provided. The force ring 128' can be substantially similar to the force ring 128 of FIGS. 26 and 27 in structure and function, except for the distinctions discussed herein. It should be noted that the structures of the force ring 128' which are similar to the structures of the force ring 128 of FIGS. 26 and 27 are depicted in FIG. 28 with like reference characters as those utilized in FIGS. 26 and 27. In particular, rather than including slots 342 along the outer surface 330 for engaging components of a lever 130 of FIG. 1, in some embodiments, the force ring 128' can include at least two protrusions 346' extending from the outer surface 330 of the force ring 128' which can be engaged by complementary components of the lever 130' of FIG. 32. As will be discussed below, in some embodiments, rather than implementing integral protrusions 346' extending from the force ring 128', removable force ring pins (not shown) can be used to secure the force ring 128' to the lever 130'. In addition, the splines 334' of the force ring 128' of FIG. 28 can be slanted inward in the direction of the bore 332. It should be understood that in embodiments implementing the force ring 128', the cog 124 can include complementary splines 288 or grooves for receiving the splines 334' of the force ring 128' to allow meshing therebetween. For example, in some embodiments, a cog 124' of FIG. 21 can be utilized in conjunction with the force ring 128'.

Figure 29:
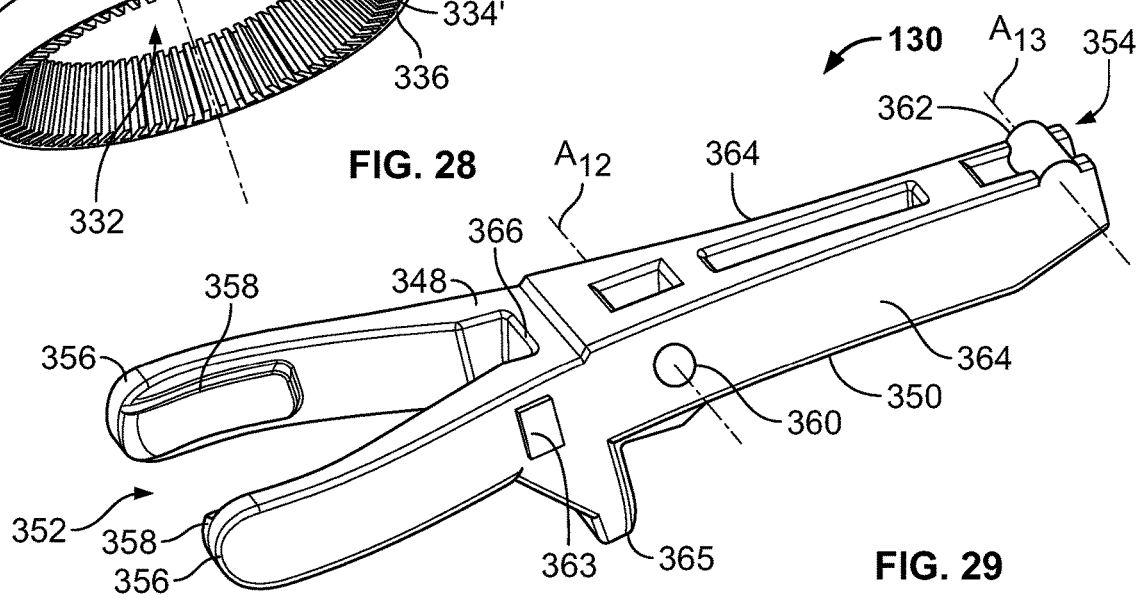
FIG. 29 shows a top, perspective view of a first embodiment of a lever of an exemplary butterfly valve according to the present disclosure.
Figure 30:
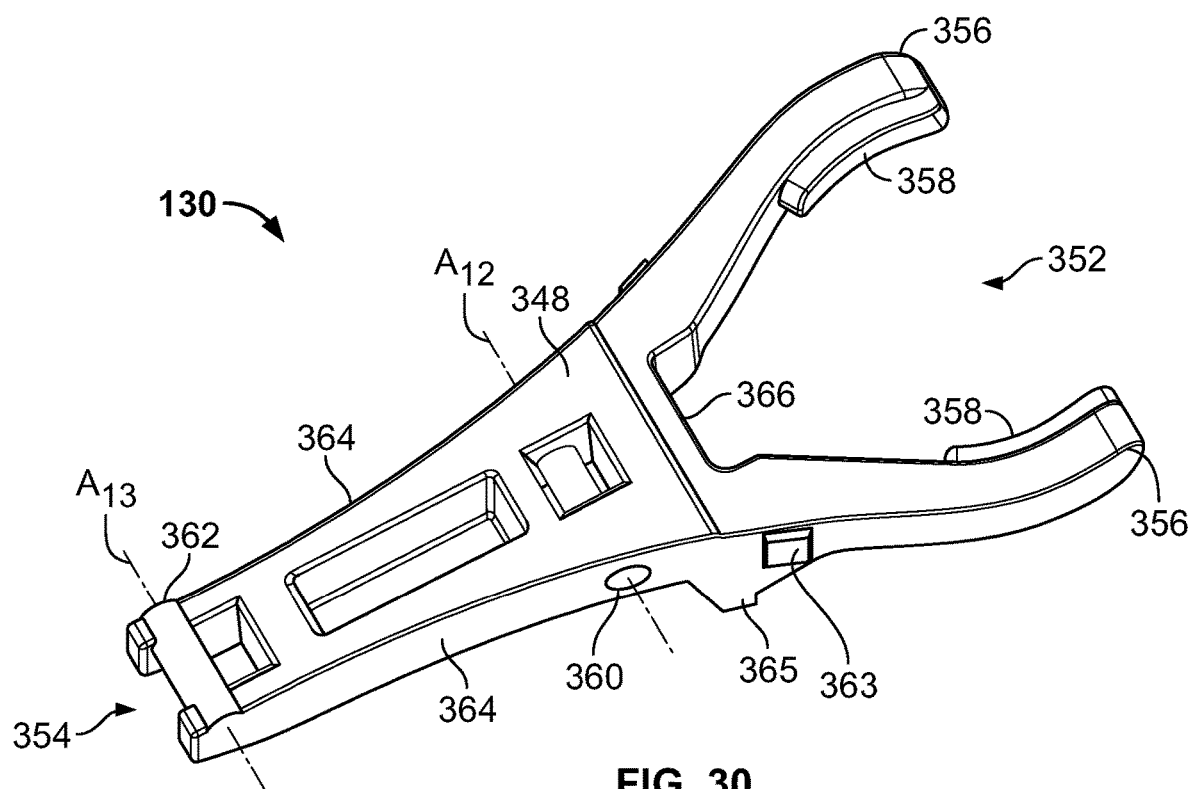
FIG. 30 shows a top, perspective view of a first embodiment of a lever of an exemplary butterfly valve according to the present disclosure.
Figure 31:
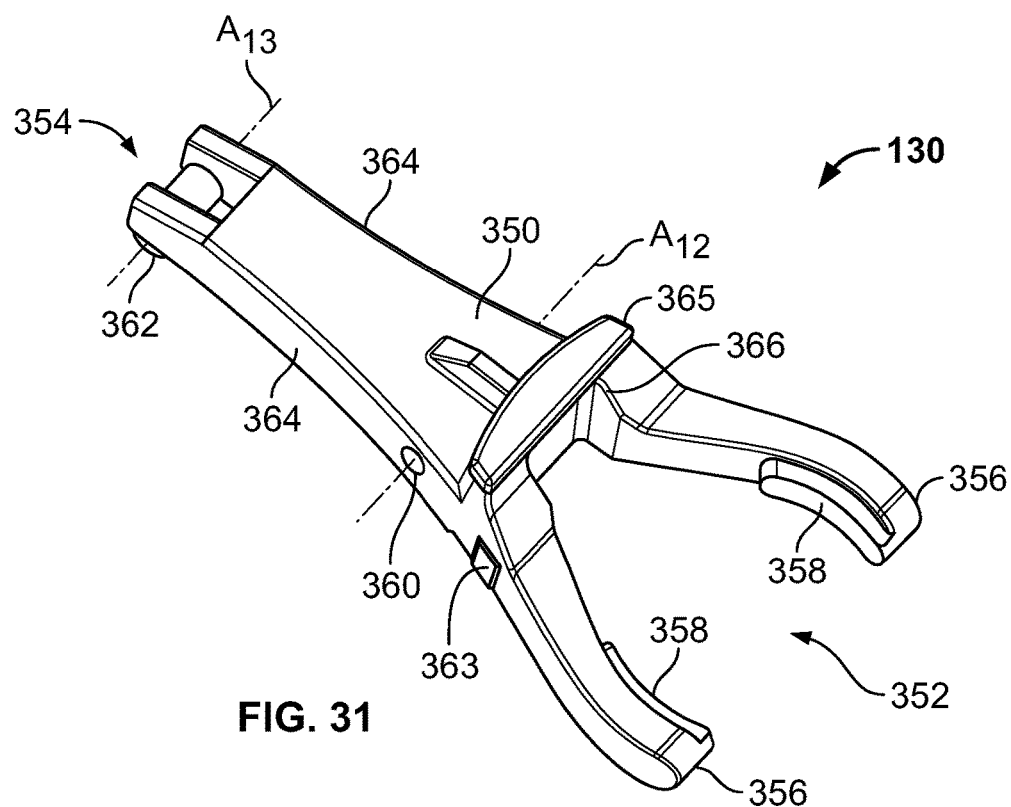
FIG. 31 shows a bottom, perspective view of a first embodiment of a lever of an exemplary butterfly valve according to the present disclosure.

With reference to FIGS. 29-31, top and bottom perspective views of a first embodiment of an exemplary lever 130 of a butterfly valve 100 are provided. The lever 130 defines an upper surface 348 and a bottom surface 350, as well as a proximal end 352 and a distal end 354. The proximal end 352 can include the portion of the lever 130 which is positioned closest to the vertical axis $A_1$ during assembly of the butterfly valve 100 and the distal end 354 can include the portion of the lever 130 extending away from the vertical axis $A_1$ during assembly of the butterfly valve 100.

The lever 130 includes two arms 356, e.g., fixed arms, extending from the body of the lever 130 and defining the proximal end 352 of the lever 130. Each of the arms 356 can include a protrusion 358 extending therefrom along an inner surface of the arms 356. The protrusions 358 can be configured and dimensioned to straddle and/or mesh with the side slots 342 or grooves of the force ring 128 such that the force ring 128 can be detachably interlocked relative to the lever 130 via, e.g., a snap fit. It should be understood that the space created between the protrusion 358 on each arm 356 of the lever 130 can be configured and dimensioned slightly smaller than the diameter of the force ring 128 to create a force against the force ring 128 when the force ring 128 has been interlocked with the arms 356 of the lever 130. The lever 130 includes a pin hole 360 extending therethrough along a longitudinal axis $A_{12}$ which can be positioned substantially perpendicular to the vertical axis $A_1$ of the force ring 128. Thus, when inserted within the handle body 126, the pin hole 360 along the longitudinal axis $A_{12}$ can be aligned with the pin hole 328 along longitudinal axis $A_8$ of the handle body 126 and a pivot pin 132a can be used to intersect the pin hole 360 and the pin hole 328 and secure the lever 130 relative to the handle body 126.

At the distal end 354, the lever 130 can include a pin 362, e.g., a molded-in pin integrally molded into the body of the lever 130 and defining a longitudinal axis $A_{13}$ substantially parallel to the longitudinal axis $A_{12}$ and perpendicular to the vertical axis $A_1$ of the force ring 128. As will be described below, the pin 362 can be used to mate the lever 130 relative to the grip 134 of the handle assembly 104. The outer surfaces 364 of the sides of the lever 130, running perpendicular to the pin hole 360, the sides of the arms 356, and the pin 362, can be configured and dimensioned to fit within the cavity 320 of the handle body 126. In some embodiments, the surfaces parallel to the direction of the pin hole 360, e.g., the pivot hole, can include differing features. For example, the upper surface 348 of the lever 130 can be essentially flat with indentations to facilitate manufacture of the lever 130. The opposing face, e.g., the bottom surface 350, can include a group of protruding ribs 365 which can aid in positioning the lever 130 relative to the force ring 128 and/or the cog 124.

In addition to the interlocking between the slots 342 of the force ring 128 and the protrusions 358 of the lever 130, in some embodiments, an additional interface between the lever 130 and the force ring 128 can aid in interlocking and/or aligning the force ring 128 relative to the lever 130. In particular, the lever 130 can include an interior space 366 located between the arms 356 and where the yoke arms 356 meet the center of the lever 130 configured and dimensioned to receive therein the protrusion 338, e.g., an extrusion, of the force ring 128 extending off the outer surface 330 of the force ring 128. The protrusion 338 on the force ring 128 can be positioned above the group of splines 334 and can be centered between the slots 342 or grooves which mate with the protrusions 358 of the lever 130.

The fit between the interior space 366 and the protrusion 338 can be essentially planar and close to minimize independent rotational movement of the lever 130 with respect to the force ring 128. The lever 130 can also be fit closely to the interior cavity 320 of the handle body 126 near the planar interface of the force ring 128 and the lever 130 to facilitate creating a minimal amount of independent movement between the lever 130 and the handle body 126. In some embodiments, the lever 130 can include a boss 363 protruding on each side of the lever 130. The boss 363 can act as a centering means for centering or ensuring a correct positioning of the lever 130 within the handle body 126. As will be discussed below, the meshing of the components of the lever 130 and the force ring 128 advantageously provides an interface between the lever 130 and the force ring 128 which substantially reduces the handle rotational load being transferred through the groove or pin arrangement used to apply a force from squeezing the grip 134 to disengage the cog 124 and the force ring 128.

In some embodiments, additional holes or slots and additional components, e.g., a pin or a shaped component roughly corresponding to a slot in the force ring 128 (not shown) can be used to create an interface for load transfer and mobility of the force ring 128 relative to the rotation of the lever 130. In particular, and as will be discussed below, the lever 130 can be mechanically interlocked relative to the force ring 128 and the grip 134 to lift the force ring 128 off of the cog 124, thereby disengaging the mechanical ability of the force ring 128 and the cog 124 to impede rotation of the stem 116. In some embodiments, the lever 130 can lift the force ring 128 off of the cog 124 while maintaining the force ring 128 in a substantially horizontal or level orientation relative to the cog 124, while allowing the yoke portion of the lever 130 and the lever 130 to travel in an arc centered about the pivot pin 132a. The handle assembly 104 can then be used to rotate the stem 116 and, thereby, the disc 112, to position the butterfly valve 100 in, e.g., an open position, a closed position, or partially open positions.

In some embodiments, alternative configurations of the lever 130 can be used to create a mechanically-interlocking interface relative to the force ring 128. The alternative embodiments for the interface of the force ring 128 and the lever 130 create different geometries that can facilitate the same or an essentially similar result of moving the cog 124 juxtaposed to the force ring 128 during engagement or disengagement.

Figure 32:
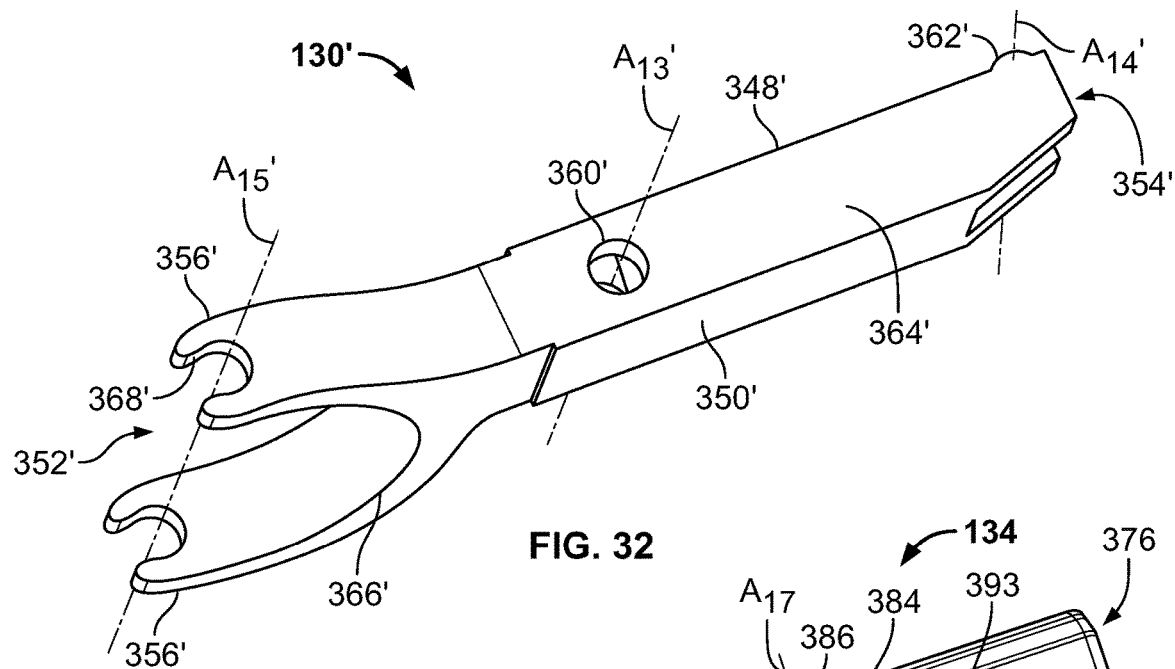
FIG. 32 shows a perspective view of a second embodiment of a lever of an exemplary butterfly valve according to the present disclosure.

With reference to FIG. 32, a perspective view of a second embodiment of an exemplary lever 130' of a butterfly valve 100 is provided for implementation with, e.g., the force ring 128' of FIG. 28. In particular, the lever 130' can be used with force ring 128' which includes a protrusion 346' or similar structure for interlocking with a mating structure located on the lever 130'. In some embodiments, secondary means such as a pin or a rivet (not shown) can be used to affect the appropriate interface between the force ring 128' and the lever 130'.

Similar to the lever 130 discussed above, the lever 130' includes an upper surface 348', a bottom surface 350', a proximal end 352' and a distal end 354'. The proximal end 352' can include the portion of the lever 130' which interlocks with the force ring 128', while the distal end 352' can include the portion of the lever 130' which interlocks with the grip 134. The lever 130' also includes two arms 356' protruding from the central body of the lever 130' which create a semi-circular interior space 366' therebetween for receipt of the force ring 128'. Each of the two arms 356' includes a mating groove 368', e.g., a yoke portion, at the proximal end 352' configured as, e.g., partially circular grooves configured and dimensioned to receive therein the protrusions 346' of the force ring 128' via a snap fit. The force ring 128' and the lever 130' can thereby be interlocked relative to each other while allowing the force ring 128' to rotate about a longitudinal axis $A_{15}'$ passing through the mating grooves 368'. In some embodiments, the protrusions 346' can be positioned on the arms 356' of the lever 130' and the mating grooves 368' can be positioned on the force ring 128'. The protrusions 346' or pins can thereby extend inwardly from the arms 356' and engage the mating grooves 368', e.g., holes or slots, in the force ring 128'. In some embodiments, rather than open mating grooves 368', the arms 356' of the lever 130' can include closed circular openings at the proximal end 352' and the force ring 128' can include complementary openings in place of the protrusions 346'. The force ring 128' can be positioned between the arms 356' of the lever 130' and the openings of the lever 130' and the force ring 128' can be aligned. One or more non-integral pins can then be inserted through the openings to secure the force ring 128' relative to the lever 130'. The force ring 128' can thereby be pinned to the lever 130'.

The lever 130' includes a pin hole 360' for alignment with the pin hole 328 of the handle body 126 and for receipt of a pivot pin 132a of FIG. 1. The pin hole 360' extends through the lever 130' along a longitudinal axis $A_{13}'$ parallel to the longitudinal axis $A_{15}'$. The distal end 354' of the lever 130' includes a pin 362' integrally molded with the lever 130' which defines a longitudinal axis $A_{14}'$ extending therethrough. The pin 362' can be used for mechanically interlocking the lever 130' relative to the grip 134. In some embodiments, as will be discussed below, the lever 130' and the force ring 128' may be joined at an interface to create one component.

Figure 33:
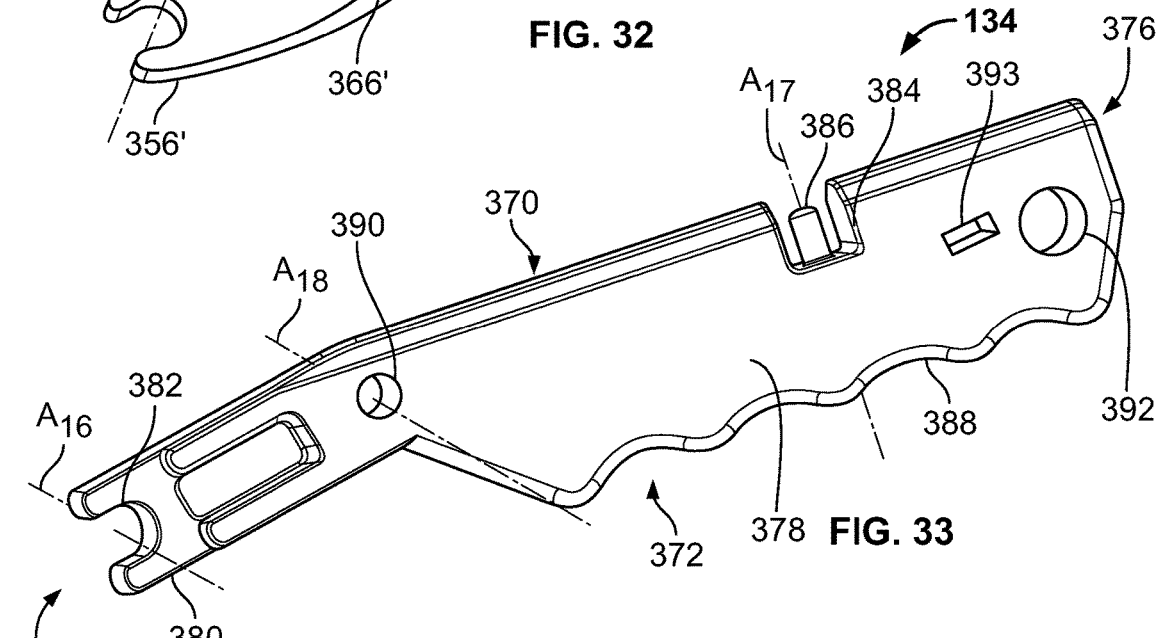
FIG. 33 shows a perspective view of a grip of an exemplary butterfly valve according to the present disclosure.
Figure 34:
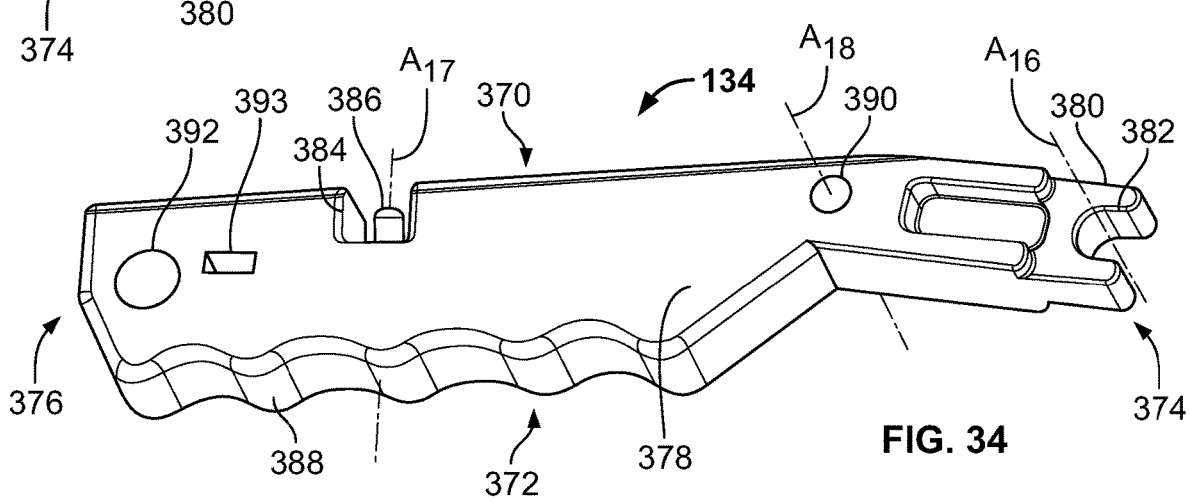
FIG. 34 shows a perspective view of a grip of an exemplary butterfly valve according to the present disclosure.
Figure 35:
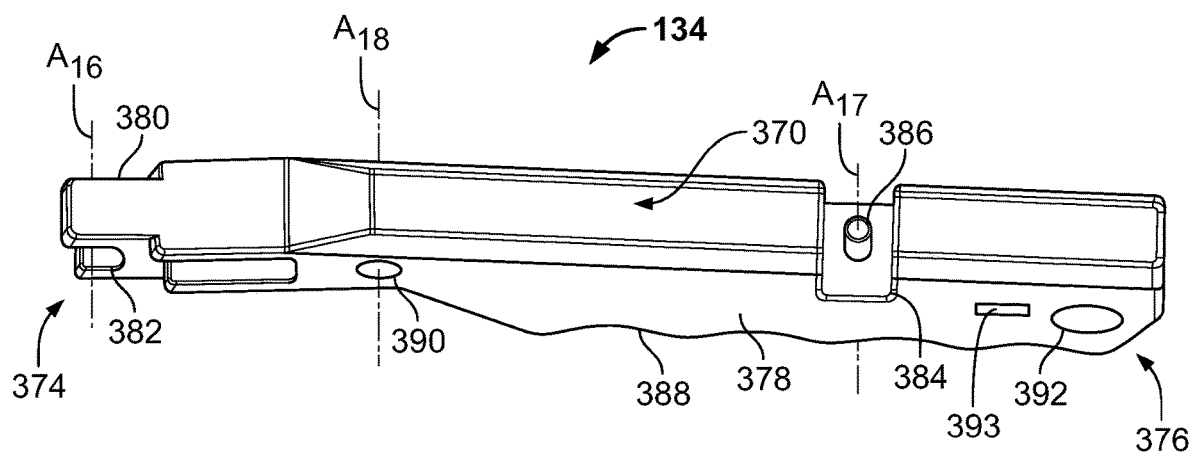
FIG. 35 shows a top, perspective view of a grip of an exemplary butterfly valve according to the present disclosure.

With reference to FIGS. 33-35, side and top perspective views, respectively, of an exemplary grip 134 of a butterfly valve 100 are provided. The grip 134 defines an upper surface 370, a bottom surface 372, a proximal end 374 and a distal end 376. The proximal end 374 can include a portion of the grip 134 which mechanically interlocks with the lever 130 and the distal end 376 can include the portion of the grip 134 which can be depressed to actuate the lever 130 and the force ring 128. The outer surface 378 of the grip 134 and, in particular, the configuration and dimensions of the upper surface 370 of the grip 134 can be such that the grip 134 fits within the cavity 320 of the handle body 126.

The proximal end 374 can include an arm 380 extending from the central portion of the grip 134. The arm 380 can include a slot 382, e.g., a semi-circular opening, configured and dimensioned to at least partially surround the pin 362 of the lever 130 when the lever 130 and the grip 134 are interlocked relative to each other. The slot 382 can include a longitudinal axis $A_{16}$ passing centrally therethrough which substantially aligns with the longitudinal axis $A_{14}$ of the pin 362 of the lever 130 when the lever 130 and the grip 134 are interlocked relative to each other. The upper surface 370 of the grip 134 includes a channel 384 formed therein extending partially from the upper surface 370 to the bottom surface 372. The channel 384 includes a pin 386 extending vertically in the channel 384 along a vertical axis $A_{17}$. The pin 386 can extend to a height slightly less than the upper surface 370 of the grip 134. The pin 386 can be configured as substantially cylindrical and can be dimensioned to receive thereon a spring 136 of FIG. 1. Thus, when the grip 134 is positioned within the cavity 320 of the handle body 126, the spring 136 can maintain a load against the grip 134 such that a force by a user is necessary to compress the spring 136. By compressing the spring 136, the user can depress the grip 134 in the direction of the handle body 126.

The bottom surface 372 along the distal end 376 of the grip 134 includes scallops 388 that reasonably match the contours of fingers on a hand of a user operating the butterfly valve 100. The scallops 388 create a comfortable surface against which a user can provide a force to depress the grip 134 relative to the handle body 126. In some embodiments, the grip 134 can include a pin hole 390 located at a central portion of the grip 134, e.g., between the proximal end 374 and the distal end 376. The pin hole 390 can be aligned with the bore 328 along the longitudinal axis $A_9$ of the handle body 126 and a pivot pin 132b can be inserted through both the pin hole 390 and the bore 328 to create a pivot point between the grip 134 and the handle body 126. The pivot point creates a pivoting movement of the grip 134 in the handle body 126 as the grip 134 is depressed against the spring 136.

In particular, the pivot point allows an operator or user to squeeze the grip 134 along the bottom surface 372 when it is assembled in the handle assembly 104. The squeezing dynamic can be accomplished when a user grips the handle assembly 104 and the palm of the hand comes across the bottom surface 372 of the grip 134. The fingers of the hand can wrap around the bottom surface 372 of the grip 134 and as the hand tightens against the grip 134, the grip 134 can be pulled into or squeezed into the handle body 126 while compressing the internal spring 136. Squeezing of the grip 134 disengages the splines 288 of the cog 124 relative to the splines 334 of the force ring 128 by pivoting the grip 134 at the longitudinal axis $A_{18}$, which in turn causes the slot 382 to engage the pin 362 of the lever 130 and forces the lever 130 to pivot about the longitudinal axis $A_{13}$. Pivoting of the lever 130 about the longitudinal axis $A_{13}$ lifts the force ring 128 off of the cog 124 such that the handle assembly 104 can be rotated relative to the cog 124. In some embodiments, the lever 130 can lift the force ring 128 off of the cog 124 while maintaining the force ring 128 in a substantially horizontal or level orientation relative to the cog 124, while allowing the yoke portion of the lever 130 and the lever 130 to travel in an arc centered about the longitudinal axis $A_{13}$. Releasing of the grip 134 forces the spring 136 between the grip 134 and the handle body 126 to expand, which pivots the grip 134 about the longitudinal axis $A_{18}$, which in turn causes the slot 382 to engage the pin 362 of the lever 130 and forces the lever 130 to pivot about the longitudinal axis $A_{13}$. The force ring 128 can thereby be lowered against the cog 124 and the splines 288 of the cog 124 can interlock with the splines 334 of the force ring 128 to lock the handle assembly 104 and the disc 112 relative to the body assembly 102 in the desired position. In some embodiments, rather than fully lifting the force ring 128 off of the cog 124, the force ring 128 can be partially lifted off of the cog 124 such that the splines 288 of the cog 124 and the splines 334 of the force ring 128 can ratchet over each other.

In some embodiments, the grip 134 includes one or more bores 392 adjacent to the distal end 376 and scallops 388 strategically placed to allow a user to insert a lock or a similar device (not shown) to inhibit rotation of the grip 134 around its pivot point. For example, a lock can be inserted into the bore 392 to prevent the grip 134 from being depressed into the handle body 126, thereby preventing the grip 134 from pivoting about the longitudinal axis $A_{18}$, which in turn prevents the lever 130 to pivot about the longitudinal axis $A_{13}$. The lock blocks movement of the grip 134 into the handle body 126, thereby not allowing the splines 288 of the cog 124 and the splines 334 of the force ring 128 to be disengaged. Operation of the butterfly valve 100, e.g., changing the position of the handle assembly 104 relative to the body assembly 102, can thereby be prevented until the lock has been removed from the bore 392. Similarly, in some embodiments, the grip 134 includes one or more slots 393, e.g., rectangular slots, oval slots, and the like, adjacent to the distal end 376 to allow a user to insert a wire and/or cable in place of or in combination with the lock discussed above to prevent depression of the grip 134 relative to the handle body 126.

Figure 36:
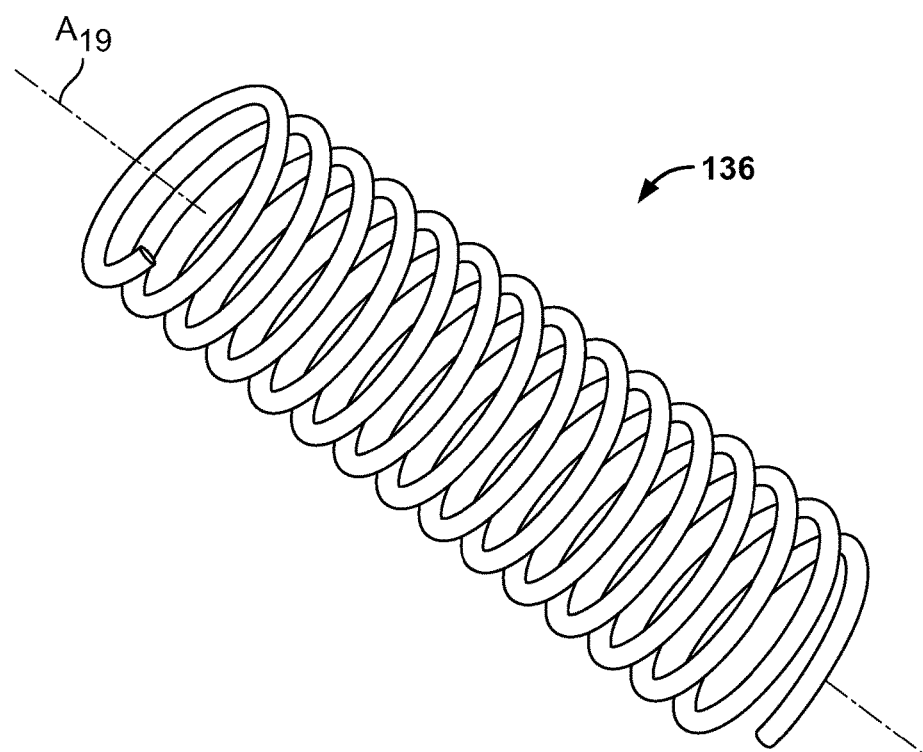
FIG. 36 shows a perspective view of a spring of an exemplary butterfly valve according to the present disclosure.

With reference to FIG. 36, a perspective view of an exemplary spring 136 of a butterfly valve 100 is provided. The spring 136 defines a vertical axis $A_{19}$ centrally extending between the coils of the spring 136. As discussed above, the spring 136 can be positioned between the handle body 126 and the grip 134 onto the pin 386 of the grip 134 to create a force between the handle body 126 and the grip 134. The force created by the spring 136 can be used to disposition the grip 134 away from the handle body 126 in a normal or expanded state of the spring 136. Expansion of the spring 136 forces the grip 134 away from the handle body 126 and causes a rotation of the grip 134 about a pivot pin 132b at the longitudinal axis $A_{18}$. Since the slot 382 of the grip 134 surrounds the pin 362 of the lever 130, the lever 130 can be forced to pivot by the pivoting grip 134 to keep the force ring 128 and the cog 124 engaged when the grip 134 is not squeezed. The normal state of the force ring 128 and cog 124 can thereby be in an engaged state. In some embodiments, secondary springs 136 can be positioned between the force ring 128 and the handle body 126, as described above. In some embodiments, the secondary springs 136 can be used between the force ring 128 and the handle body 126, as described above, instead of or in combination with the spring 136 between the grip 134 and the handle body 126 to provide a load sufficient to engage the force ring 128 and the cog 124.

Figure 37:
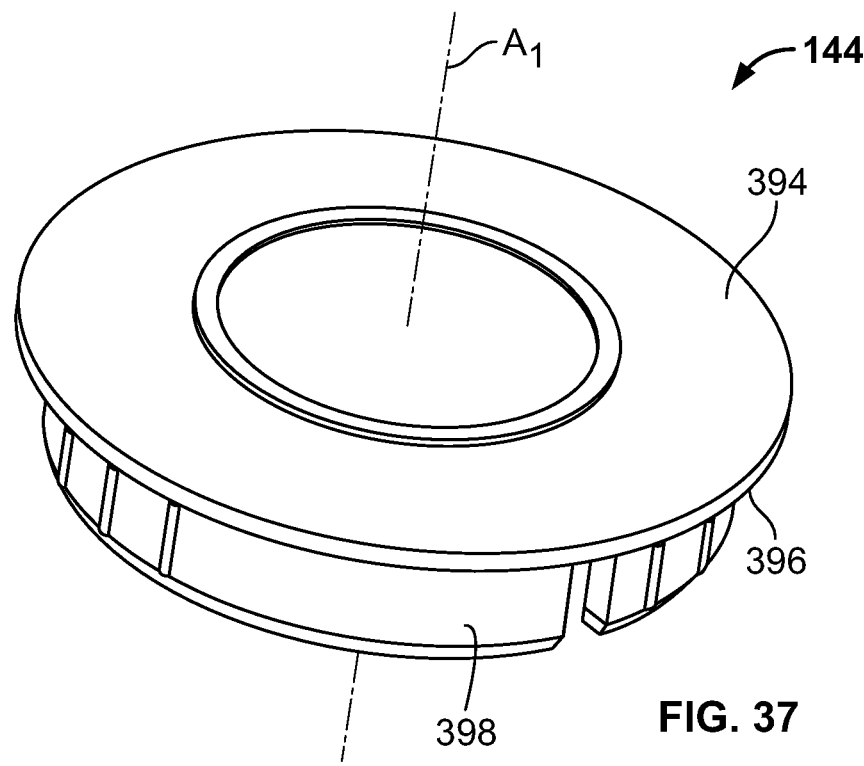
FIG. 37 shows a perspective view of a handle bezel of an exemplary butterfly valve according to the present disclosure.

With reference to FIG. 37, a perspective view of an exemplary handle bezel 144 of a butterfly valve 100 is provided. The handle bezel 144 can include a vertical axis $A_1$ extending therethrough. As illustrated in FIG. 1, when the components of the body assembly 102 have been assembled, the force ring 128, the lever 130, the grip 134 and the handle body 126 can be assembled relative to the body assembly 102. In some embodiments, one or more washers, e.g., a first washer 140 and a second washer 142, can be positioned in the bore 304 of the handle body 126 and a fastener 138 can be used to rotatably secure the handle assembly 104 relative to the body assembly 102. The handle bezel 144 can then be positioned within the counter bore adjacent to the bore 304 of the handle body 126 to cover the fastener 138.

The handle bezel 144 can resemble a plug and can be configured as a substantially round plate that fits within the counter bore of the handle body 126. The handle bezel 144 functions to cover the fastener 138 (e.g., a screw) which holds the handle assembly 104 to the stem 116. In some embodiments, the handle bezel 144 can also include information printed and/or molded on an upper surface 394 to identify the brand of the butterfly valve 100 and/or allow a customization of the butterfly valve 100 to, e.g., identify the process the butterfly valve 100 may be used in, the materials in the butterfly valve 100, the age of the butterfly valve 100, and the like (not shown). In some embodiments, the handle bezel 144 can be customized to the point of containing an electronic signature (not shown) for the butterfly valve 100. The bottom surface 396 of the handle bezel 144 can include a radial protrusion 398 extending therefrom. The radial protrusion 398 can be configured and dimensioned to detachably interlock the handle bezel 144 relative to the counter bore of the handle body 126 via, e.g., a friction fit.

Figure 38:
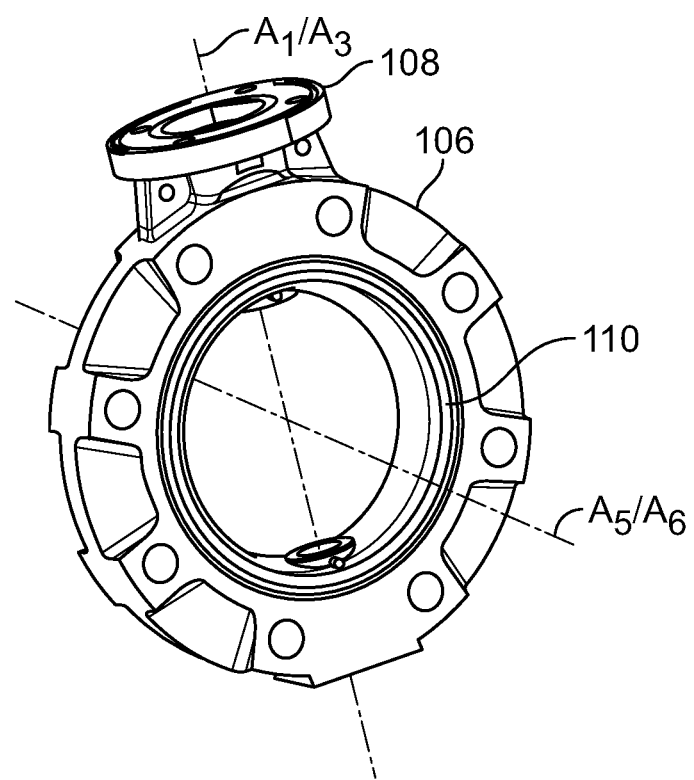
FIG. 38 shows a perspective view of a body and liner assembly of an exemplary butterfly valve according to the present disclosure.

Turning now to FIG. 38, a perspective view of a body 106, a liner 110 and a body indicator bezel 108 assembly is provided. In some embodiments, an assembly of the butterfly valve 100 begins with selection of the valve body 106. The size of the valve body 106 can dictate the selection of the corresponding parts to complete the assembly. The size of the valve body 106 can be selected based on, e.g., the intended use for the butterfly valve 100, the type of fluid to be used with the butterfly valve 100, the amount of fluid to be used with the butterfly valve 100, and the like. The liner 110 can be placed in the opening 148 of the body 106 such that the protrusion 151 of the inner surface 150 of the opening 148 corresponds to the central groove 194 in the liner 110. The central position of the liner 110 relative to the body 106 can thereby be maintained during operation of the butterfly valve 100. The liner 110 can also be positioned circumferentially such that the first bore 166 and the second bore 178 of the body 106 align with the first bore 198 and the second bore 200 of the liner 110. In addition, the liner 110 and the body 106 can be assembled such that the vertical axis $A_1$ of the body 106 aligns with the vertical axis $A_3$ of the liner 110 and the longitudinal axis $A_5$ of the body 106 aligns with the longitudinal axis $A_6$ of the liner 110. The body indicator bezels 108 can then be assembled to the body 106 at grooves 164 on the mounting plate 158 via, e.g., a snap fit.

Figure 39:
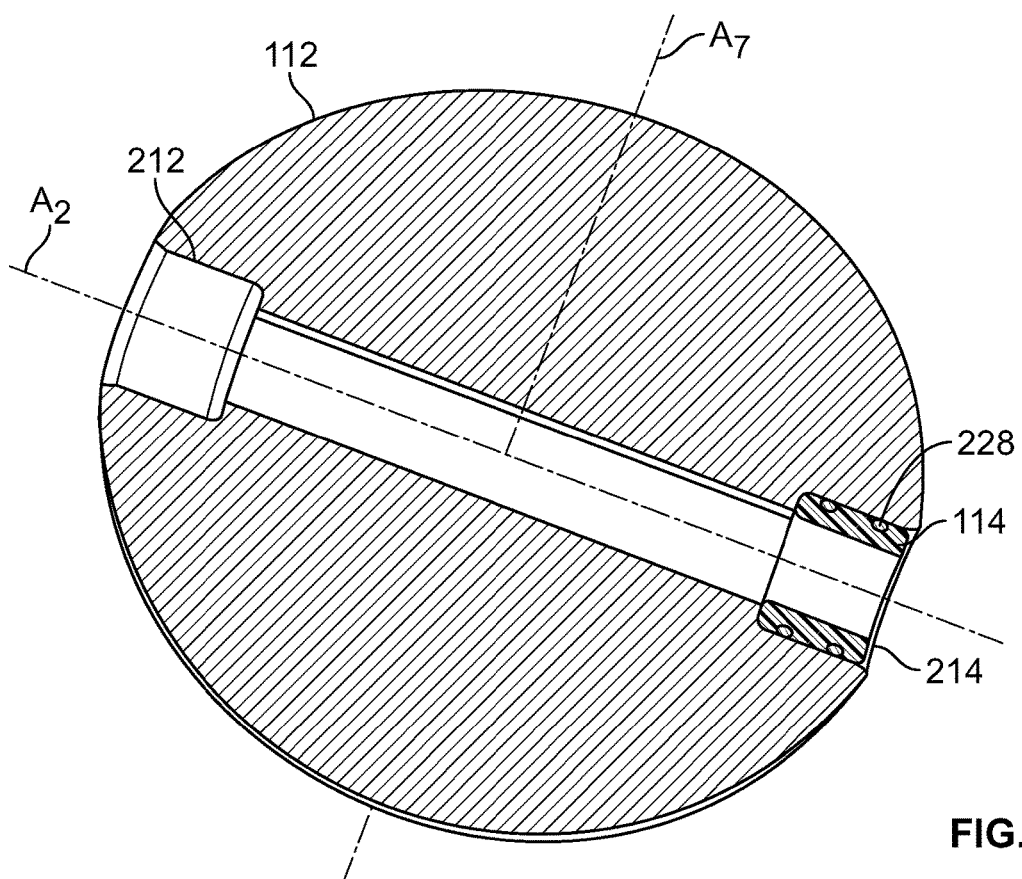
FIG. 39 shows a cross-sectional, perspective view of a partial disc assembly of an exemplary butterfly valve according to the present disclosure.

With reference to FIG. 39, a perspective view of a partial disc 112 assembly of a butterfly valve 100 is provided. In particular, and as previously shown in FIG. 13, seals 228, e.g., O-rings, can be installed into the grooves 226 of the seal retainer 114. The seal retainer 114 can then be placed into the second bore 214 of the disc 112 along the vertical axis $A_1$. The seal retainer 114 can be inserted into the second bore 214 such that it is nearly flush or below the second region 210 of the disc 112, e.g., the outer envelope of the disc 112. Inserting the seal retainer 114 into the disc 112 before the disc 112 is positioned in the body 106 prevents a need for a second bore 178 which passes through the thickness $T_4$ of the body 106 for installation of the seal retainer 114 and reduces the number of components and features required to include a seal retainer 114 in the assembly. The lack of a through hole also reduces areas of potential leaks in the body 106. Thus, as described above, the second bore 178 of the body 106 partially extends through the thickness $T_4$ of the body 106.

Figure 40:
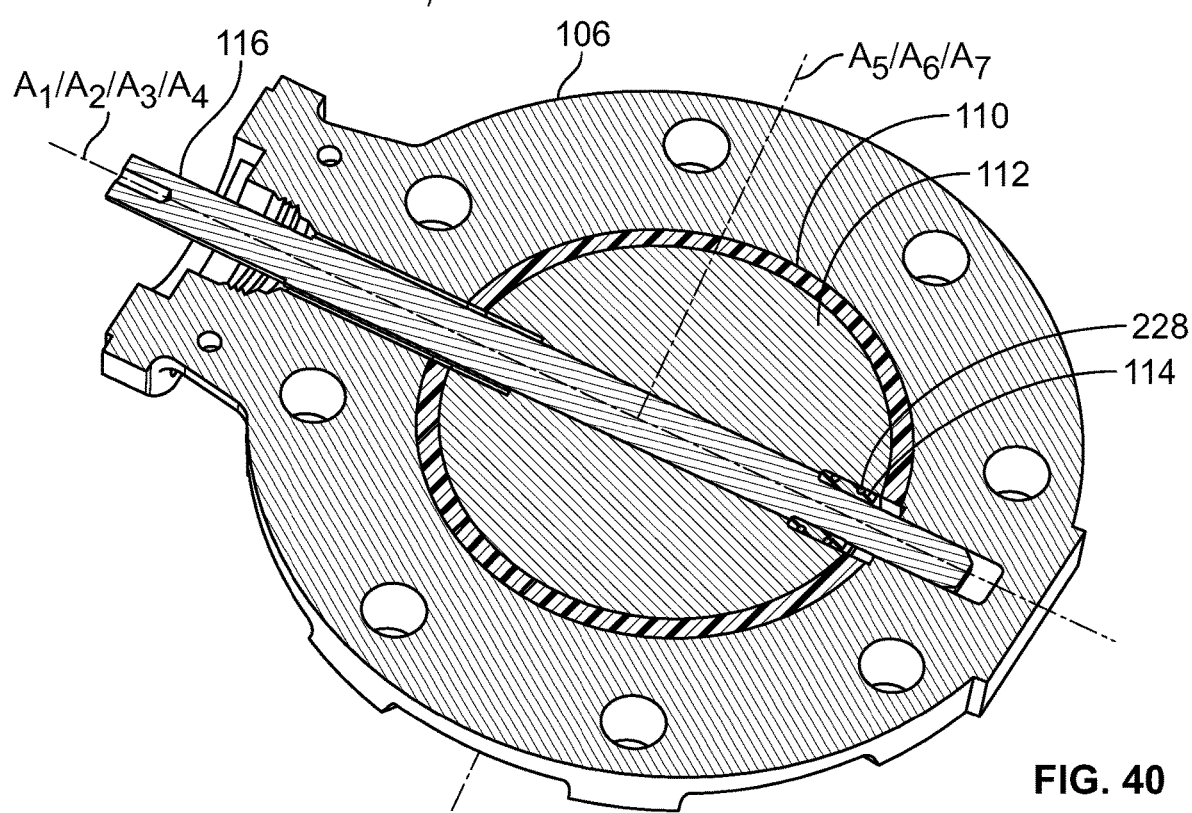
FIG. 40 shows a cross-sectional, perspective view of a partial body assembly of an exemplary butterfly valve according to the present disclosure.
Figure 41:
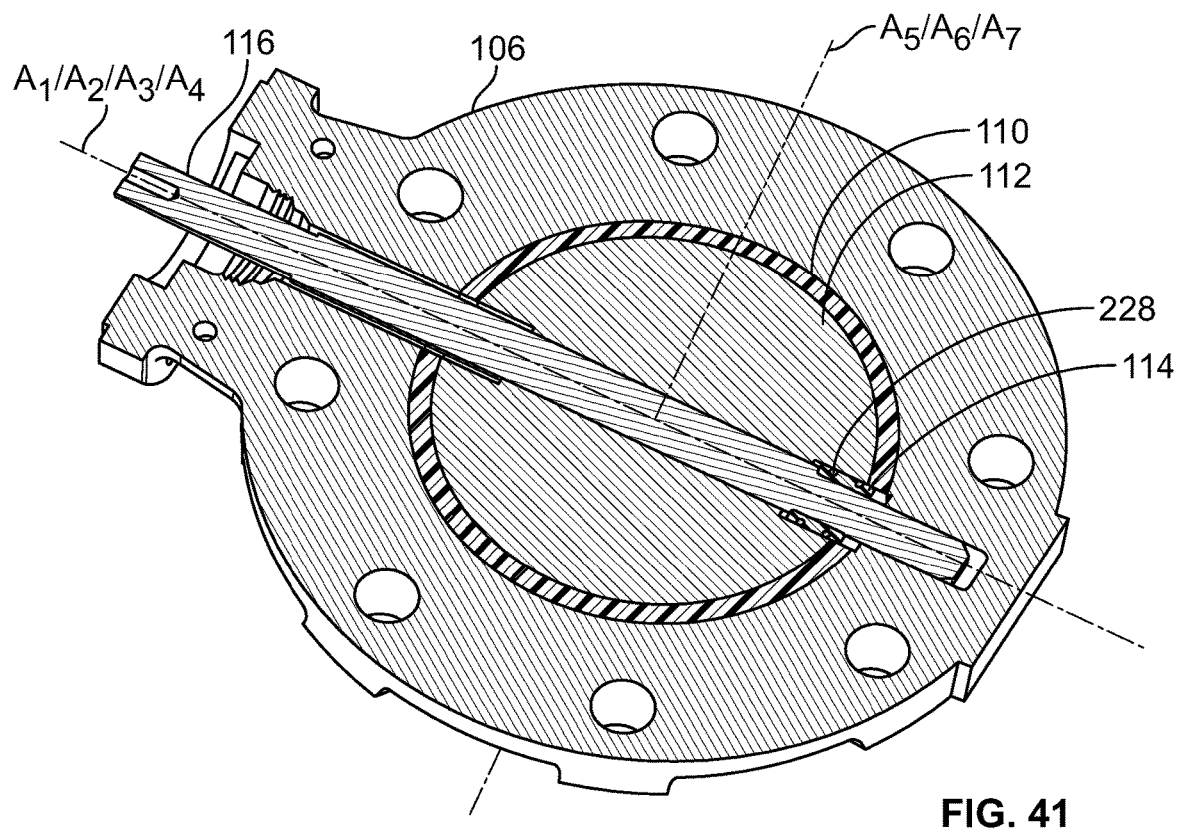
FIG. 41 shows a cross-sectional, perspective view of a partial body assembly of an exemplary butterfly valve according to the present disclosure.
Figure 42:
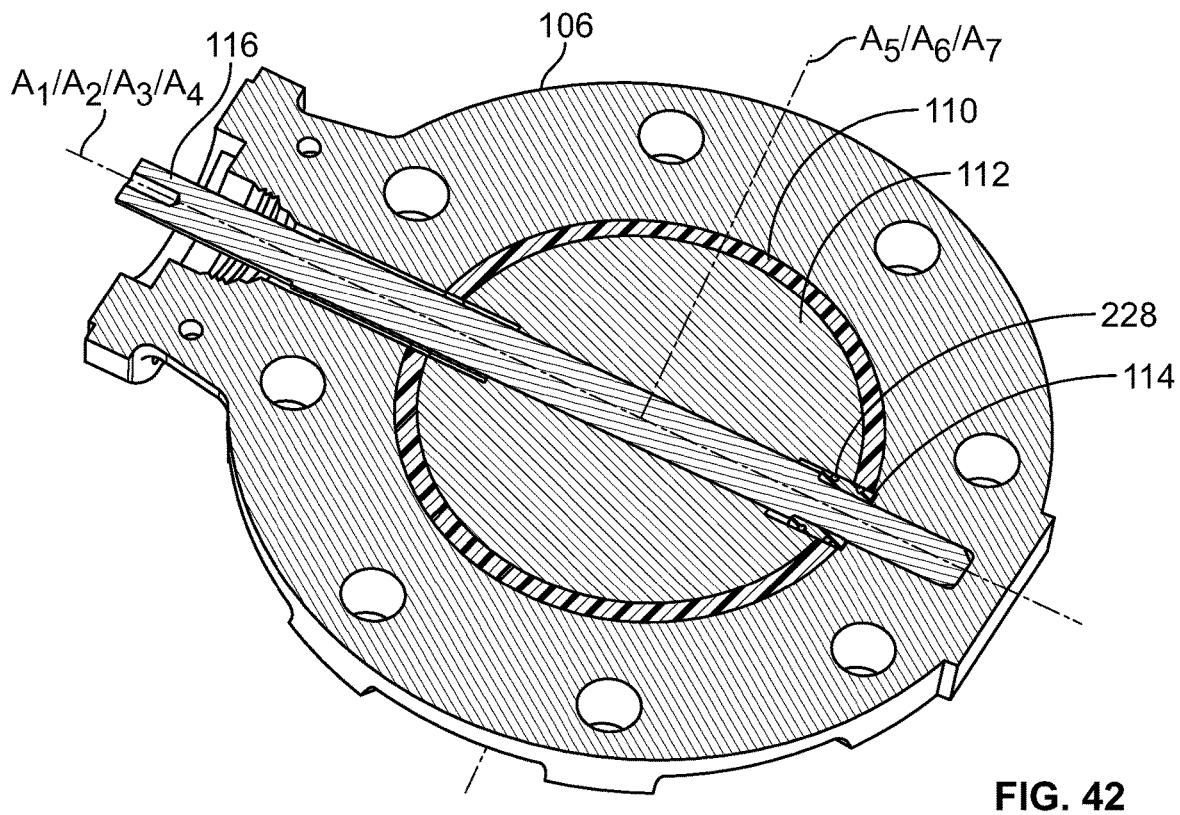
FIG. 42 shows a cross-sectional, perspective view of a partial body assembly of an exemplary butterfly valve according to the present disclosure.

With reference to FIGS. 40-42, perspective views of partial body assemblies 102 of a butterfly valve 100 are provided. Although the partial body assemblies 102 of the butterfly valve 100 are shown in a fully closed position, in some embodiments, the butterfly valve 100 can be assembled in any position, e.g., a fully open position, a fully closed position, a partially open position, and the like. The partial disc 112 assembly of FIG. 39, e.g., the disc 112 and the seal retainer 114, can be installed into the liner 110 assembled with the body 106. In particular, the assembly of the disc 112, the liner 110 and the body 106 can be performed with care to align the first and second bores 212 and 214 of the disc 112 with the first and second bores 166 and 178 of the body 106 and the first and second bores 198 and 200 of the liner 110. In addition, the disc 112 may be assembled with the liner 110 and the body 106 such that the seal retainer 114 located within the disc 112 is positioned adjacent to the second bore 178 of the body 106 opposite from the mounting plate 158. When correctly assembled, the vertical axes $A_1$, $A_2$ and $A_3$ of the body 106, the disc 112 and the liner 110, respectively, may be substantially aligned relative to each other, and the longitudinal axes $A_5$, $A_6$ and $A_7$ of the body 106, the liner 110 and the disc 112, respectively, may be substantially aligned relative to each other. The action or step of installing the disc 112 within the liner 110 can compress the liner 110 at the "top" and "bottom" portions near the first and second bores 198 and 200 where the liner 110 and the disc 112 come into contact. In some embodiments, installing the disc 112 within the liner 110 can compress the entire perimeter of the opening 195 of the liner 110 due to the contact between the liner 110 and the disc 112.

The stem 116 can be aligned with the body 106 such that the vertical axis $A_4$ of the stem 116 substantially aligns with the vertical axes $A_1$, $A_2$ and $A_3$ of the body 106, the disc 112 and the liner 110, respectively. In some embodiments, the stem 116 can be specifically aligned to the disc 112 prior to assembly such that an indicating mark (not shown) on the third section 238 of the stem 116 extending externally from the body 106 corresponds to a specific position of the face of the disc 112 with respect to the flow through the line, e.g., the opening 148 of the body 106. For example, the indicating mark (not shown) on the third section 238 of the stem 116 can be substantially aligned with the plane created by the outer perimeter 146 of the body 106, which can correspond to a closed position of the disc 112 relative to the body 106.

As illustrated in FIGS. 40-42, the first section 234 of the stem 116 can be slid into the body 106 through the first bore 166 of the body 106, through the first and second bores 198 and 200 of the liner 110, through the disc 112, and into the second bore 178 of the body 106. As the stem 116 is passed through the body 106, the liner 110 and the disc 112, the hexagonal cross-section of the second section 236 of the stem 116 can be aligned with the hexagonal shaped bore 206 of the disc 112. The first section 234 of the stem 116 can be passed through the seal retainer 114 and into the second bore 178 of the body 106. As the first section 234 of the stem 116 is passed through the seal retainer 114, the first edge 240 of the stem 116, e.g., the change in cross-section of the stem 116 between the first and second section 236, can contact the first end of the seal retainer 114 inside the disc 112. Additional force can be exerted on the stem 116 to slide the stem 116 into the second bore 178 of the body 106, thereby exerting a force on the seal retainer 114 through the first edge 240 of the stem 116, causing the seal retainer 114 to translate in the second bore 214 of the disc 112. This translating action moves the seal retainer 114 towards the second bore 178 of the body 106 through the second bore 200 of the liner 110. One of the seals 228 of the seal retainer 114 can thereby remain within the second bore 214 of the disc 112, while the second seal 228 of the seal retainer 114 can be aligned within the second bore 200 of the liner 110 to form a seal with the liner 110. As the seal retainer 114 is translated in this manner, the adjacent end of the stem 116, e.g., the first section 234, enters the second bore 178 in the lower portion of the body 106. Thus, rather than implementing a tool to position the seal retainer 114 within the disc 112 and the liner 110, the stem 116 can be used as described above. It should be understood that in some embodiments, the body 106 can include a through hole for insertion of the seal retainer 114 within the second bore 214 of the disc 112.

In some embodiments, the bearing 118, the gland 120 and the junk seal 122 can then be inserted into body 106. Seals, e.g., O-rings, can be placed into the grooves 264 on the bearing 118. The bearing 118 can then be oriented such that the first opening section 254 aligns with the hexagonal cross-section of the second section 236 of the stem 116 and the cross-section of the third section 238 of the stem 116, e.g., the drive section, aligns with the second opening section 256 of the bearing 118. The bearing 118 can then be slid into the body 106 until it rests within the first bore 166 of the body 106. In particular, the bearing 118 can be slid into the body 106 until the edge 258 of the bearing 118, formed by a change in cross-section between the first and second opening sections 254 and 256, mates against the second edge 244 of the stem 116. In some embodiments, the cross-section of the opening 252 of the bearing 118 can be constant and the bottom surface 262 of the bearing 118 can mate with the second edge 244 of the stem 116 in the disc 112. Once the bearing 118 has been positioned in the desired position within the disc 112 and the body 106, the seals, e.g., O-rings, on the bearing 118 establish a seal with the liner 110 and with the disc 112. In particular, one seal can be created between the bearing 118 and the liner 110, while a second seal can be created between the bearing 118 and the first bore 212 of the disc 112.

In some embodiments, the gland 120 can be threaded into the first bore 166 of the body 106 to retain the stem 116 within the body 106. As the gland 120 is threaded into the threaded second section 170 of the first bore 166, the bottom surface 276 of the gland 120 contacts the exposed upper surface 260 of the bearing 118 and applies a load to the bearing 118 to ensure that the stem 116 is fully retained within the body 106. The gland 120 thereby minimizes translation of the stem 116 within the body assembly 102. In some embodiments, the gland 120 can be threaded into the threaded second section 170 of the first bore 166 such that an angled side surface of the gland 120 is positioned against a complementary angled inner surface of the threaded second section 170. In particular, the angled inner surface of the threaded second section 170 can limit the depth to which the gland 120 can be threaded into the threaded second section 170. Thus, rather than imparting a load against the bearing 118, the gland 120 can restrict the area in which the bearing 118 can translate and, in turn, restrict translation of the stem 116 within the body assembly 102.

Figure 43:
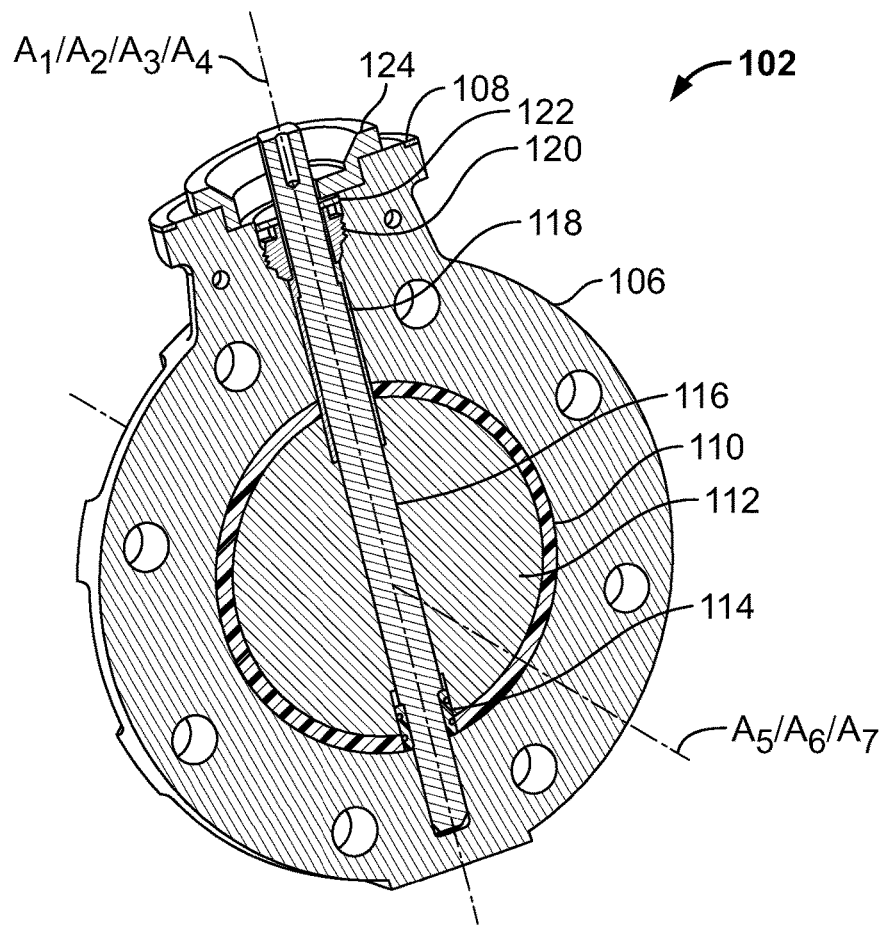
FIG. 43 shows a cross-sectional, perspective view of a body assembly of an exemplary butterfly valve according to the present disclosure.

The junk seal 122 can be placed over the third section 238 of the stem 116 by aligning the opening 280 of the junk seal 122 with the cross-section of the third section 238 of the stem 116 and can be moved to the corresponding third section 172 of the first bore 166 of the body 106. For manual operation of the butterfly valve 100 with a handle assembly 104, the cog 124 can be placed into the fourth section 174 of the first bore 166 of the body 106 inside the mounting plate 158. In particular, the step 286 of the cog 124 can be aligned with the step 176 within the mounting plate 158 to ensure that the cog 124 is correctly placed within the body assembly 102. In addition, the interaction between the step 286 of the cog 124 and the step 176 within the mounting plate 158 can minimize the ability of the cog 124 to rotate in the body 106. As will be discussed in greater detail below, when the cog 124 with the 135 degrees of material of the segment 298 and the handle body 126 with the 135 degrees of material of the step 312 are assembled with the body 106, the assembly can only take place such that the handle body 126 is in one of two positions which are 180 degrees relative to each other. The segment 298 can thereby control the orientation of the handle body 126 relative to the body 106. In some embodiments, the orientation of the handle body 126 relative to the body 106 can be regulated by the position of the cog 124 relative to the body 106. For example, the cog 124 can be rotated 180 degrees relative to the body 106 to reposition the segment 298 relative to the body 106 by 180 degrees. The orientation of the handle body 126 relative to the body 106 can thereby also be repositioned by 180 degrees relative to the body 106 to interlock the segment 298 of the cog 124 with the step 312 of the handle body 126. FIG. 43 illustrates a cross-sectional view of a body assembly 102 of a butterfly valve 100 as described above.

In some embodiments, after the body assembly 102 has been assembled, the handle assembly 104 may be assembled to complete the butterfly valve 100. Initially, a size of the handle body 126 may be chosen to correspond to the size of the body 106 being used. The components corresponding to the handle body 126 chosen can then be selected. These components include the force ring 128, the lever 130, pivot pins 132a and 132b, the grip 134, the springs 136, the screws 138, the washers 140 and 142, and the handle bezel 144.

Figure 44:
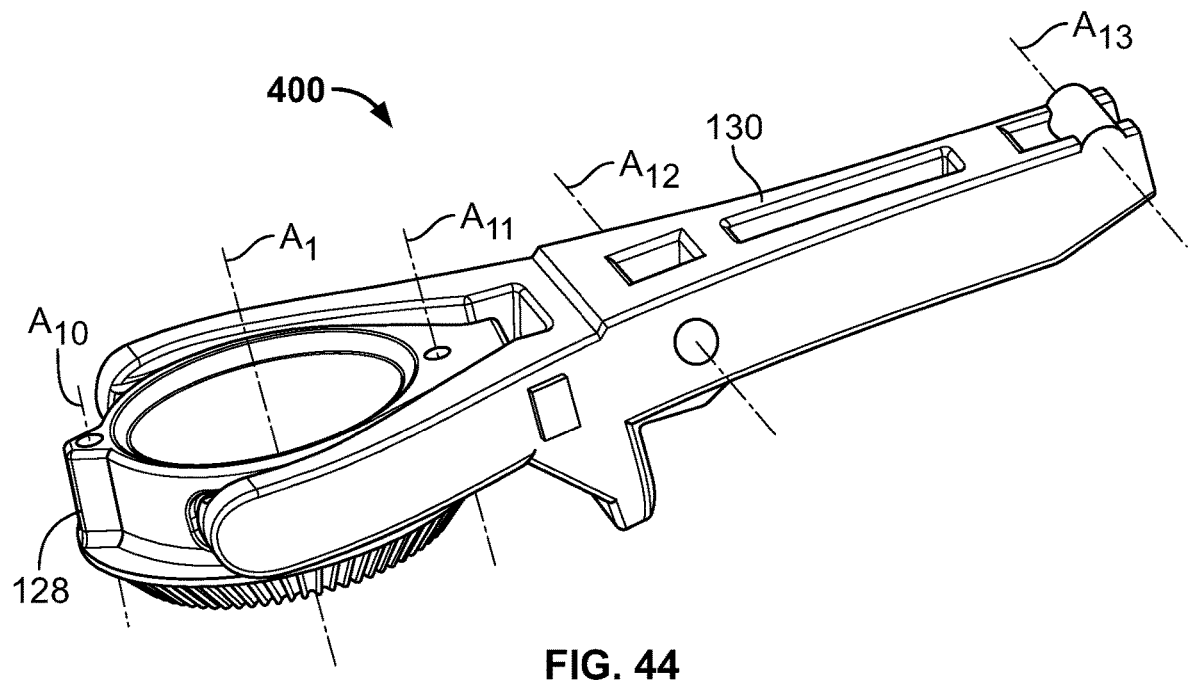
FIG. 44 shows a perspective view of a first embodiment of a force ring and lever assembly of an exemplary butterfly valve according to the present disclosure.

With reference to FIG. 44, a perspective view of a first embodiment of a force ring 128 and a lever 130 subassembly 400 is provided. The lever 130 can be pressed onto the force ring 128 such that the slots 342 or grooves in the force ring 128 correspond to the mating inward protrusions 358 along the inside surfaces of the arms 356 of the lever 130. The protrusion 338 of the force ring 128 can also be aligned within the interior space 366 between the arms 356 of the lever 130. The orientation of the force ring 128 can be such that the bottom surface 336 of the force ring 128 with the splines 334 points in the same direction as the ribs 365 on the bottom surface 350 of the lever 130. In some embodiments, secondary springs 136 can be inserted into the partial bores 344 of the force ring 128 opposite of the splines 334.

Figure 45:
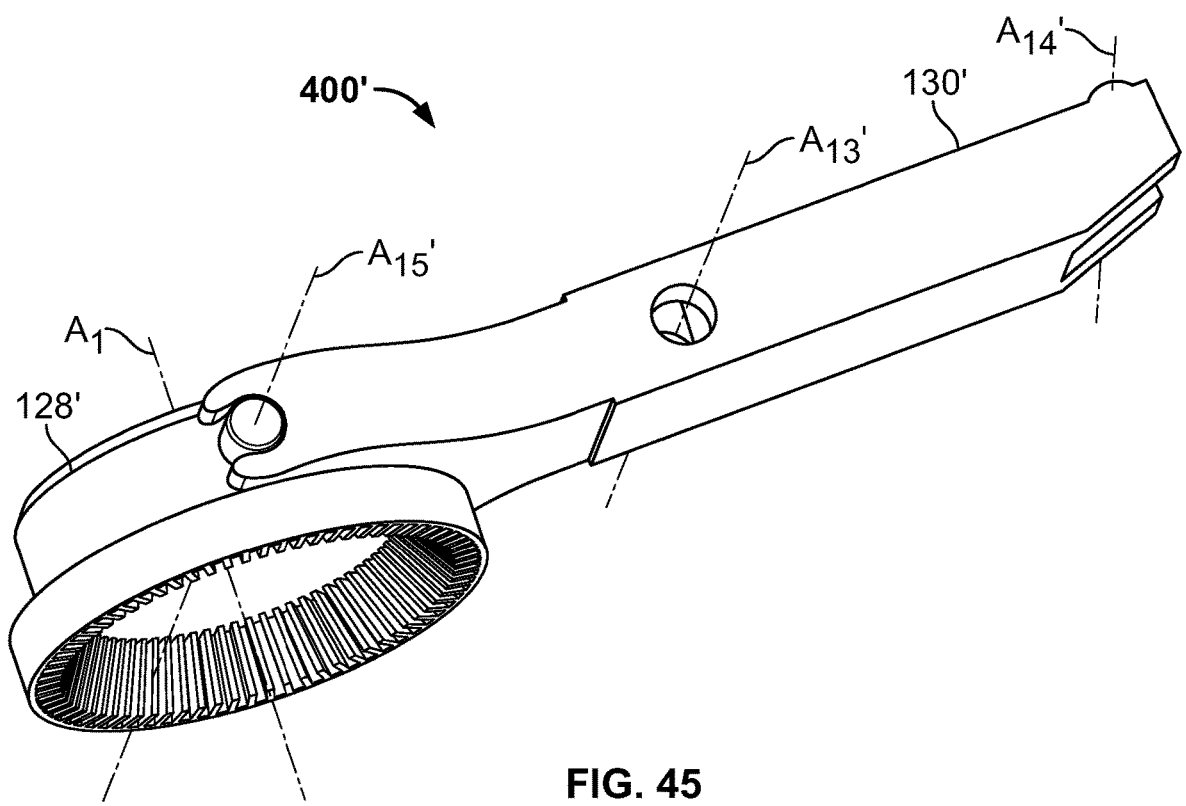
FIG. 45 shows a perspective view of a second embodiment of a force ring and lever assembly of an exemplary butterfly valve according to the present disclosure.
Figure 46:
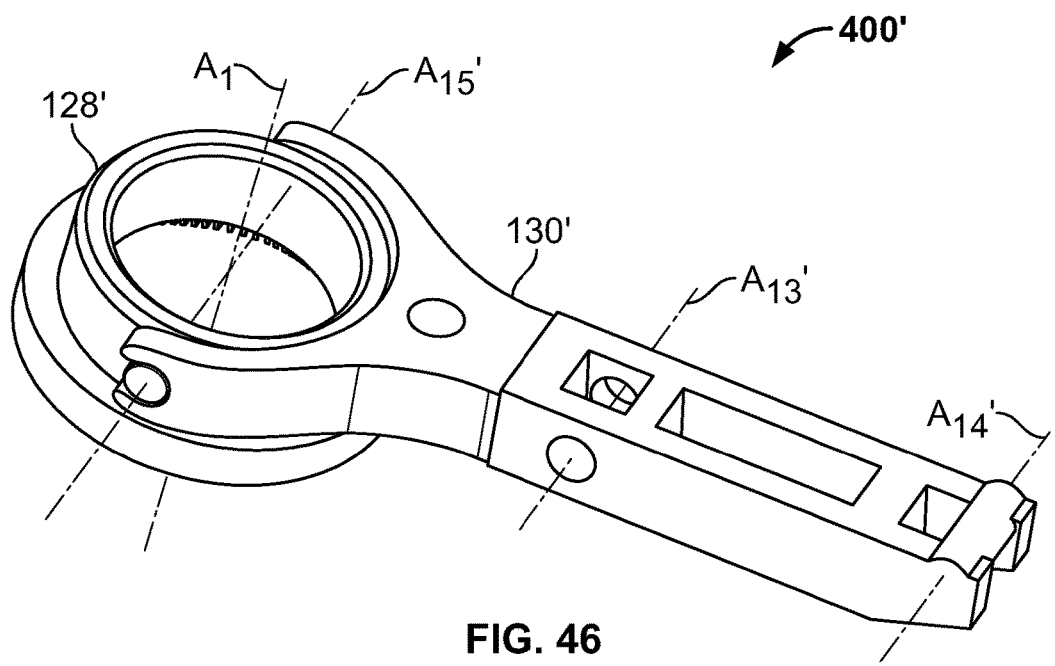
FIG. 46 shows a perspective view of a second embodiment of a force ring and lever assembly of an exemplary butterfly valve according to the present disclosure.

In some embodiments, such as the force ring 128' and the lever 130' of FIGS. 28 and 32, the assembly of the force ring 128' and the lever 130' can be accomplished by inserting the protrusions 346' or pins of the force ring 128' into the mating grooves 368' on the arms 356' of the lever 130'. A second embodiment of an exemplary subassembly 400' of the force ring 128' relative to the lever 130' is illustrated in FIGS. 45 and 46. In some embodiments, such as those implementing separate pins (not shown) for mechanically interlocking the force ring 128 and the lever 130, pivot holes in the force ring 128 and the lever 130 can be aligned and pins can be inserted into the pivot holes to secure the force ring 128 relative to the lever 130. The pins can fit tightly on either the force ring 128 and/or the lever 130 and some clearance can be afforded on the interacting components to allow the splines 334 on the force ring 128 to freely seat or align with the splines 288 on the cog 124.

Figure 47:
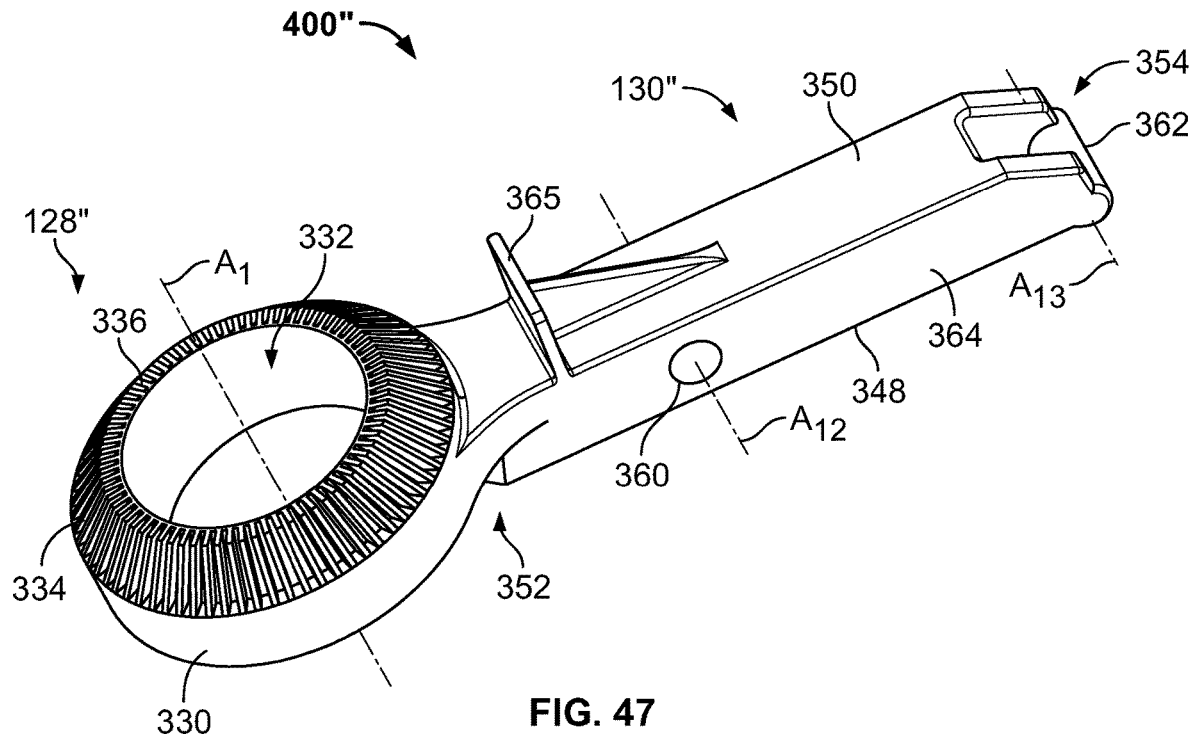
FIG. 47 shows a bottom, perspective view of a third embodiment of a force ring and lever of an exemplary butterfly valve according to the present disclosure.
Figure 48:
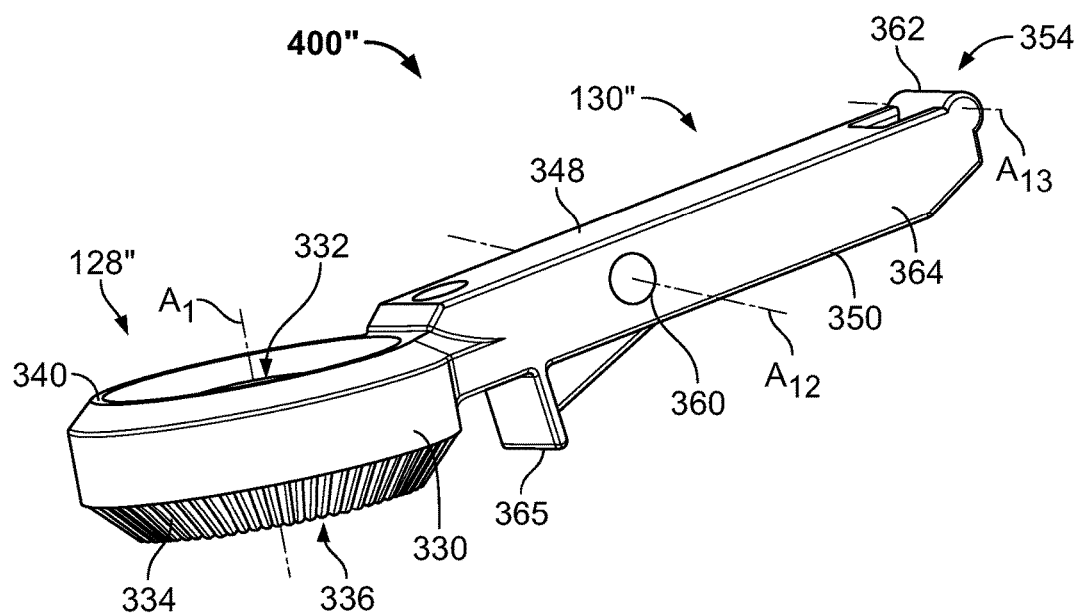
FIG. 48 shows a top, perspective view of a third embodiment of a force ring and lever of an exemplary butterfly valve according to the present disclosure.

In some embodiments, rather than implementing separate components for the force ring 128 and the lever 130, a single component can be used. For example, FIGS. 47 and 48 show perspective views of a third embodiment of an exemplary subassembly 400" which includes a combination of a force ring 128" and a lever 130" component. In particular, the subassembly 400" can be substantially similar in function as the subassembly 400 of the force ring 128 and the lever 130. Thus, in describing the subassembly 400", the like structures will be described with like reference characters. The subassembly 400" includes a force ring 128" and a lever 130" molded as one component. The force ring 128" includes an outer surface 330, a bore 332 extending therethrough, splines 334, bottom surface 336, and an upper surface 340. The lever 130" includes an upper surface 348, a bottom surface 350, a proximal end 352 attached to the force ring 128", a distal end 354, a pin hole 360, a pin 362 molded into the distal end 354, an outer surface 364 and a rib 365 extending from the bottom surface 350. Allowances can be made on the inner diameter of the bore 332 of the force ring 128" portion such that the subassembly 400" can travel in an arc centered about the pin hole 360 without the inner diameter of the bore 332 engaging the mating boss 310 of the handle body 126. For example, the inner diameter of the bore 332 can be formed as an elliptical shape (not shown). Thus, rather than assembling a force ring 128 and a lever 130, in some embodiments, a single component combining the force ring 128" and the lever 130" can be implemented. Although discussed herein with reference to the subassembly 400, it should be understood that the subassembly 400' or the subassembly 400" can be used in a similar manner.

Figure 49:
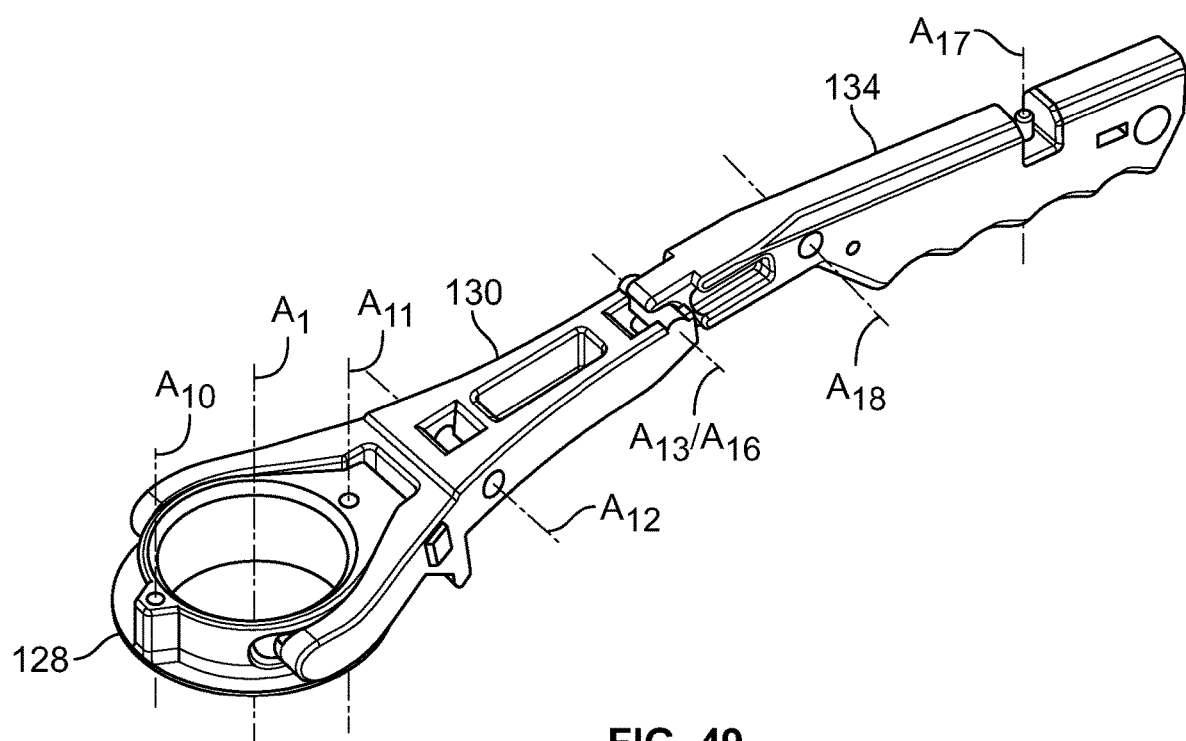
FIG. 49 shows a top, perspective view of a force ring, lever and grip assembly of an exemplary butterfly valve according to the present disclosure.
Figure 50:
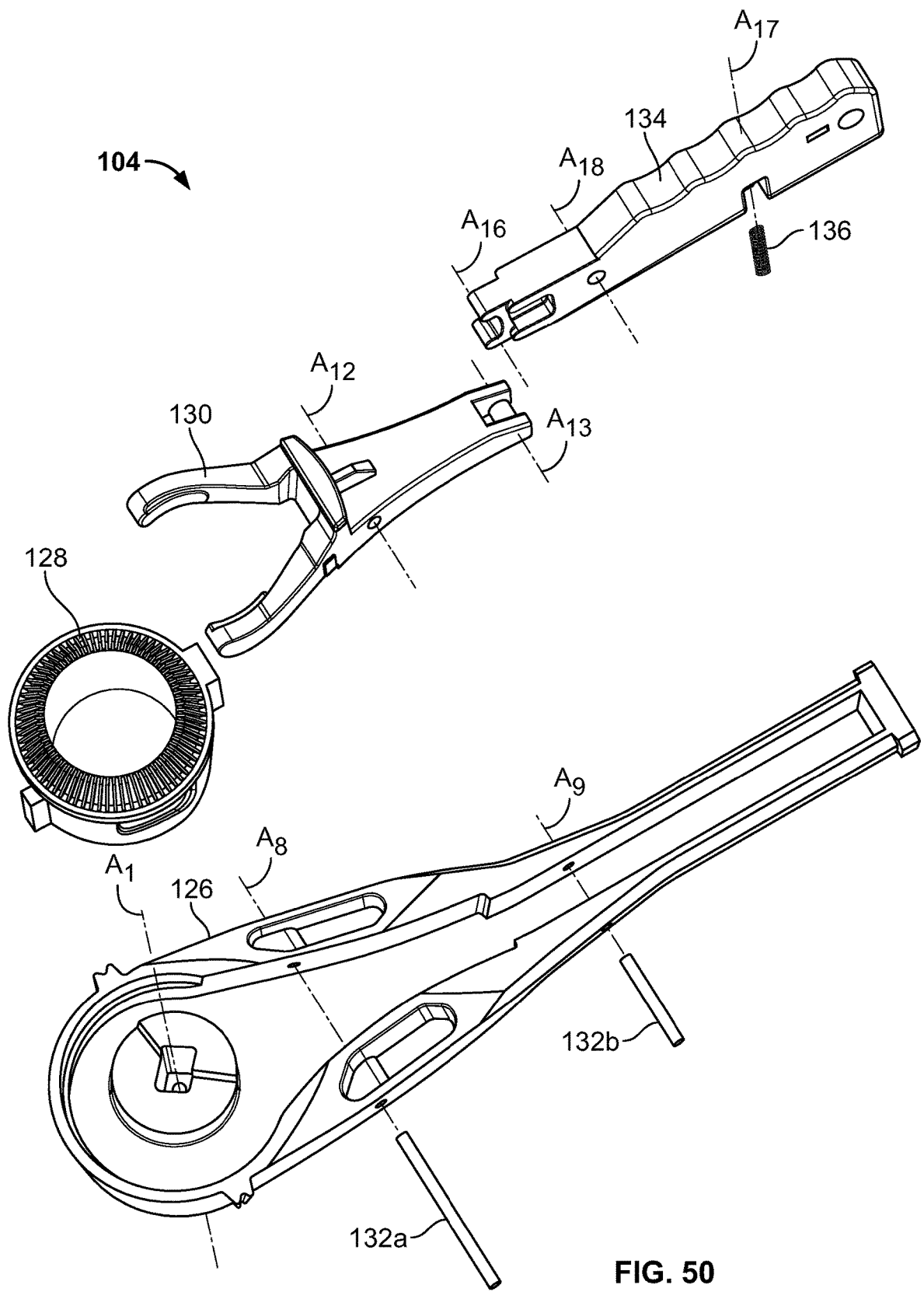
FIG. 50 shows an exploded, perspective view of a first embodiment of a handle assembly for an exemplary butterfly valve according to the present disclosure.
Figure 51:
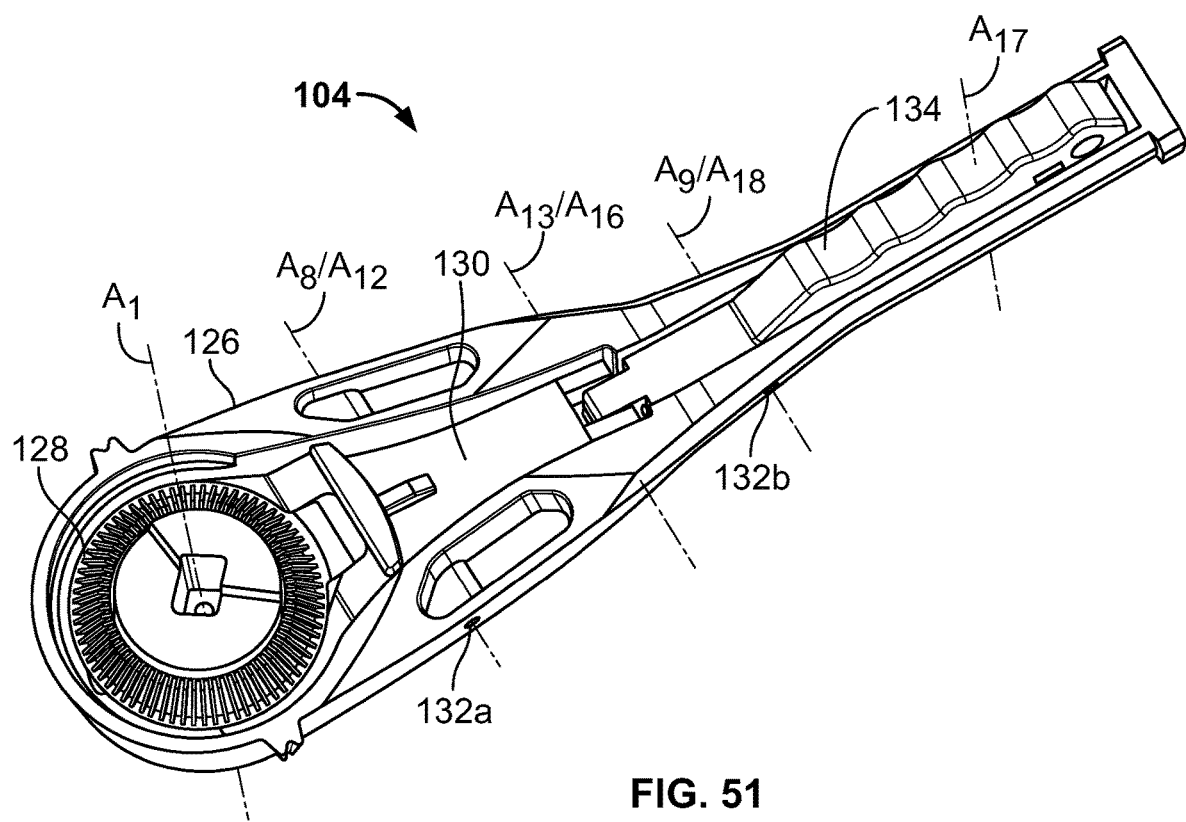
FIG. 51 shows a bottom, perspective view of a first embodiment of a handle assembly of an exemplary butterfly valve according to the present disclosure.

With reference to FIGS. 49-51, perspective views of partial handle assemblies 104 are provided. In particular, FIG. 49 shows an assembly of the force ring 128, the lever 130 and the grip 134, and FIGS. 50 and 51 show exploded and assembled perspective views of a first embodiment of an assembly 104 of the handle body 126, the force ring 128, the lever 130, the grip 134, the pivot pins 132a and 132b, and the spring 136. The subassembly 400 of the force ring 128, the lever 130 and, optionally, the springs 136 for the force ring 128, can be placed inside the shrouding volume 321 and the cavity 320 of the handle body 126 around the boss 310 which encloses the recess to receive the third section 238 of the stem 116. While the position of the springs 136 is maintained within the force ring 128, the grip 134, or both, the pivot or pin hole 360 in the lever 130 can be aligned with the nearest pivot hole in the handle body 126, e.g., the pin hole 328. The pin hole 360 of the lever 130 and the pin hole 328 of the handle body 126 can be aligned such that the longitudinal axes $A_8$ and $A_{12}$ of the handle body 126 and the lever 130, respectively, can be substantially aligned. A pivot pin 132a, e.g., the longest pivot pin 132a of the assembly, can be inserted through one end of the pin hole 328 of the handle body 126, through the pin hole 360 in the lever 130, and into the remaining portion of the pin hole 328 of the handle body 126 on the opposite side of the handle body 126.

The spring 136 corresponding to the grip 134 can then be installed onto the pin 386 of the grip 134 and the grip 134 can be placed into the cavity 320 of the handle body 126 such that the pin 362 molded into the distal end 354 of the lever 130 mates with the slot 382 on the arm 380 of the grip 134. The grip 134 can be oriented relative to the handle body 126 such that the scallops 388 on the bottom surface 372 of the grip 134 for interface with the fingers of a user protrude from the handle body 126 and the spring 136 of the grip 134 is positioned against the inner surface of the cavity 320 of the handle body 126. The pin hole 390 of the grip 134 can then be aligned with the pin hole 328 of the handle body 126 such that the longitudinal axes $A_9$ and $A_{18}$ of the handle body 126 and the grip 134, respectively, can be substantially aligned. A pivot pin 132b can be inserted into the pin hole 328 of the handle body 126, through the pin hole 390 of the grip 134, and through the remaining portion of the pin hole 328 of the handle body 126 on the opposite side of the handle body 126.

When assembled, squeezing the grip 134 against the handle body 126 can be accomplished by wrapping a hand and applying an increasing force round the handle body 126 and the grip 134 sufficient to compress the spring 136 positioned between the handle body 126 and the grip 134. Squeezing the grip 134 forces the grip 134 to pivot about the longitudinal axis $A_9$ or $A_{18}$ which, in turn, forces the lever 130 to pivot about the longitudinal axis $A_8$ or $A_{12}$, thereby moving the force ring 128 within the handle assembly 104.

Release of the grip 134 causes the spring 136 between the handle body 126 and the grip 134 to expand, creating an opposite pivoting effect of the lever 130 and the grip 134, thereby moving the force ring 128 to its normal position within the handle assembly 104. It should be noted that the handle assembly 104 design discussed herein protects the internal components of the handle assembly 104 from external effects. In particular, the internal components of the handle assembly 104, such as the splines 334 of the force ring 128, can be shielded by the handle body 126 from the effects of the environment.

Figure 52:
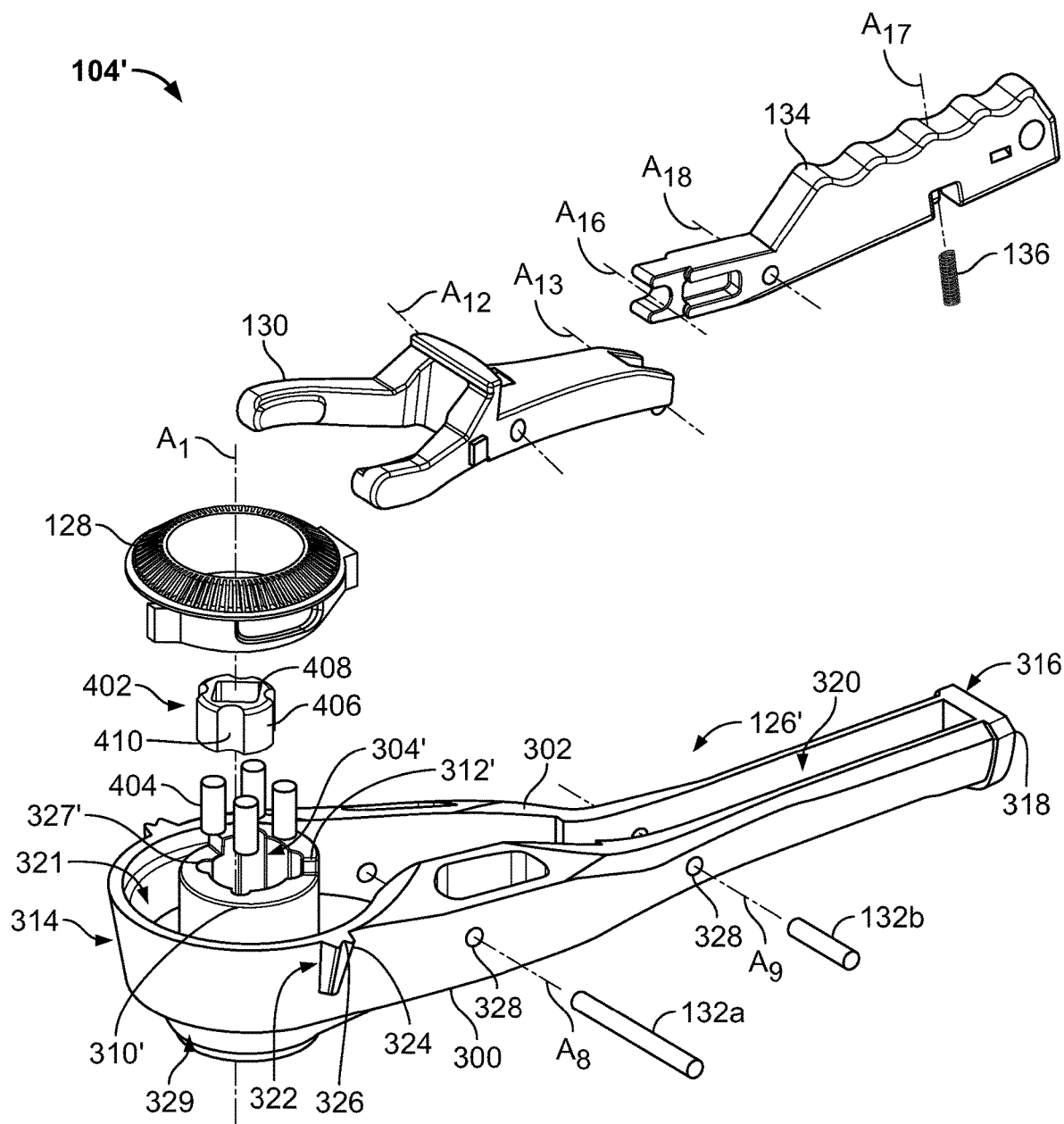
FIG. 52 shows an exploded, perspective view of a second embodiment of a handle assembly of an exemplary butterfly valve according to the present disclosure.
Figure 53:
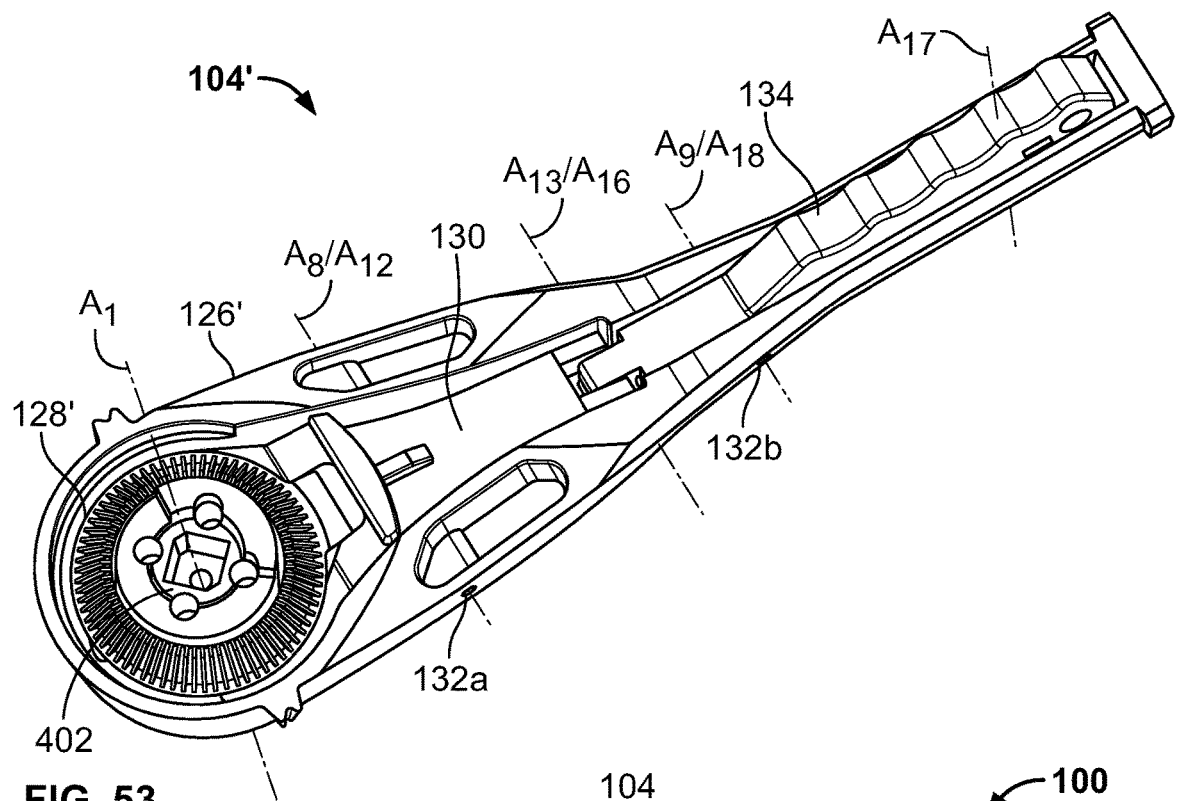
FIG. 53 shows a bottom, perspective view of a second embodiment of a handle assembly of an exemplary butterfly valve according to the present disclosure.

With reference to FIGS. 52 and 53, perspective exploded and assembled views, respectively, of a second embodiment of a handle assembly 104' are provided. In particular, and as discussed above, in some embodiments, the handle assembly 104' can include an insert 402 with keys 404. The insert 402 can include a substantially circular outer surface 406 and a bore 408 extending therethrough along vertical axis $A_1$. The outer surface 406 of the insert 402 can also include a radial pattern of semi-circular keyways 410, e.g., four keyways 410, positioned relative to the vertical axis $A_1$. The keyways 410 can be configured and dimensioned to receive therein the cylindrically shaped keys 404. Although the handle assembly 104' is illustrated with four keys 404 and four keyways 410, in some embodiments, the handle assembly 104' can include any number of keys 404 and keyways 410, e.g., one, two, three, four, five, six, and the like. Further, although the keys 404 and corresponding keyways 410 are illustrated as cylindrical, it should be understood that the keys 404 and corresponding keyways 410 can be configured in a variety of shapes, e.g., cylindrical, rectangular, square, triangular, hexagonal, and the like.

The handle body 126' of the handle assembly 104' can be substantially similar in structure and function to the handle body 126 discussed above, except for the distinctions discussed herein. Thus, like structural elements are marked with like reference characters. The handle body 126' includes an upper surface 300, a bottom surface 302, a proximal end 314 and a distal end 316. The handle body 126' also includes a cavity 320 and protrusions 322 on the proximal end 314 which include points 324 and a bridging area 326. The handle body 126' further includes pin holes 328 to create pivot points for the lever 130 and the grip 134, and the designations 329.

The handle body 126' can include a boss 310' with a bore 304' passing therethrough. The boss 310' can also include a step 312' extending therefrom for interlocking relative to the cog 124. The bore 304' can further include a radial pattern of semi-circular keyways 327' configured and dimensioned to partially receive therein the keys 404. The insert 402 can be positioned within the bore 304' such that the keyways 410 of the insert 402 and the keyways 327' of the bore 304' align to form circular openings configured and dimensioned to receive the keys 404. In some embodiments, the keys 404 and keyways 410 can be configured in a variety of shapes, e.g., cylindrical, rectangular, square, triangular, hexagonal, and the like. The illustrative embodiments discussed herein should therefore not be considered a limiting with respect to the variety of configurations which can be implemented. The keys 404 can then be pressed into the keyways 410 and 327' to fixate the insert 402 within the bore 304'. The bore 408 of the insert 402 can be configured to match the cross-section of the third section 238 of the stem 116. The insert 402 can receive the third section 238 of the stem 116 in the bore 408 and can be used to secure the stem 116 relative to the handle body 126'. The handle body 126' can be further assembled with the force ring 128, the lever 130, the grip 134, the pivot pins 132a and 132b, and the spring or springs 136, as described above. In particular, a spring 136 can be positioned between the grip 134 and the handle body 126' to generate a force which maintains the grip 134 pushed in a direction away from the handle body 126', requiring depression of the grip 134 and the spring 136 to reposition the force ring 128.

As described above, the handle body 126' can be designed to allow the use of an insert 402 with keyways 410 containing keys 404 or key stock. For example, excessive handle body 126' deflection during operation or the breakage of the handle body 126' during operation can confuse or frustrate operators. One or more keyways 410 between the handle body 126' and the components inserted therein can be used to limit detrimental operation of the handle assembly 104'. Excessive operating forces applies to the handle assembly 104' can cause torsion failure to the stem 116, breakage of the disc 112, breakage of the handle body 126', breakage of the cog 124 and/or breakage to the mechanism within the handle assembly 104'. Failure of one or more keys 404 between the handle body 126' and the components inserted therein can be set at a force level designed to otherwise protect more costly components of the handle assembly 104' during operation. Although illustrated as cylindrical, in some embodiments, the keys 404 can be, e.g., square, rectangular, round, and the like, and can be dimensioned of a length designed to allow the keys 404 to fail at desired limits.

In some embodiments, the handle assembly 104 can then be attached to the body assembly 102. In some embodiments, this can be performed by moving the disc 112 to a position between a fully closed and a fully open position, e.g., a partially open position. As discussed above, the boss 310 of the handle body 126 includes a step 312 or protrusion which extends approximately 135 degrees relative to the boss 310. The boss 310 can be used to limit the rotation of the handle assembly 104 relative to the body assembly 102 to 90 degrees of operation between the fully closed and the fully open positions. The step 312 can be aligned such that it fits within the partial bore 290 adjacent to the partial outer bore 294 and press fit or aligned with the segment 298 of the cog 124. The step 312 thereby passes through the bulk of the thickness of the cog 124 and leads the alignment of the handle assembly 104 into the body assembly 102. The second bore section 308 of the bore 304 (or alternatively the drive bore 408 of the insert 402) can receive the third section 238 of the stem 116 therein. It should be understood that when the cog 124 with the 135 degrees of material of the segment 298 and the handle body 126 with the 135 degrees of material of the step 312 are assembled with the body 106, the assembly can only take place such that the handle body 126 is in one of two positions which are 180 degrees relative to each other. The grip 134 of the handle assembly 104 can thereby be aligned with the disc 112 position and generally cannot be mistakenly misaligned relative to the body assembly 102 during installation or subsequent removal and replacement of the handle assembly 104.

As the handle assembly 104 is placed onto the stem 116 and lowered against the body assembly 102, the splines 334 of the force ring 128 and the splines 288 of the cog 124 can contact each other and interlock. In particular, slight rotational movement of the handle assembly 104 relative to the body assembly 102 can ensure that the splines 288 and 334 have overlapped or meshed. Next, a fastener 138, e.g., a screw, and first and second washers 140 and 142 can be positioned into the counter bore above the bore 304 of the handle body 126. One of the first and/or second washers 140 can be a lock washer. The fastener 138 can then be tightened into the threaded hole 246 of the stem 116 to secure the handle assembly 104 to the body assembly 102. The assembly of the butterfly valve 100 can be completed by the addition of the handle bezel 144. In some embodiments, markings, tagging and/or labeling of the butterfly valve 100 can be added. The grip 134 can be squeezed to lift the force ring 128 off of the cog 124, thereby disengaging the splines 288 of the cog 124 and the splines 334 of the force ring 128, such that the handle assembly 104 can be rotated relative to the body assembly 102 to rotate the disc 112 through its full range of intended motion, e.g., to position the butterfly valve 100 into a fully closed position, a fully open position, or an angle at a partially open position. In some embodiments, the lever 130 can lift the force ring 128 off of the cog 124 while maintaining the force ring 128 in a substantially horizontal or level orientation relative to the cog 124, while allowing the yoke portion of the lever 130 and the lever 130 to travel in an arc centered about the longitudinal axis $A_{12}$.

Figure 54:
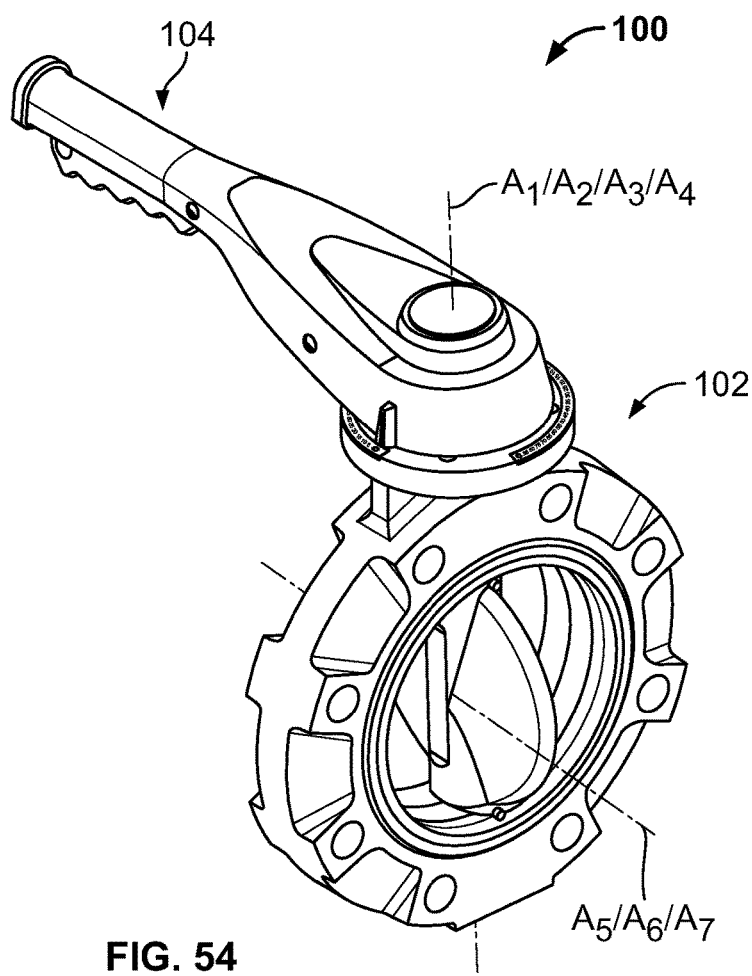
FIG. 54 shows a perspective view of an exemplary butterfly valve in an open position according to the present disclosure.
Figure 55:
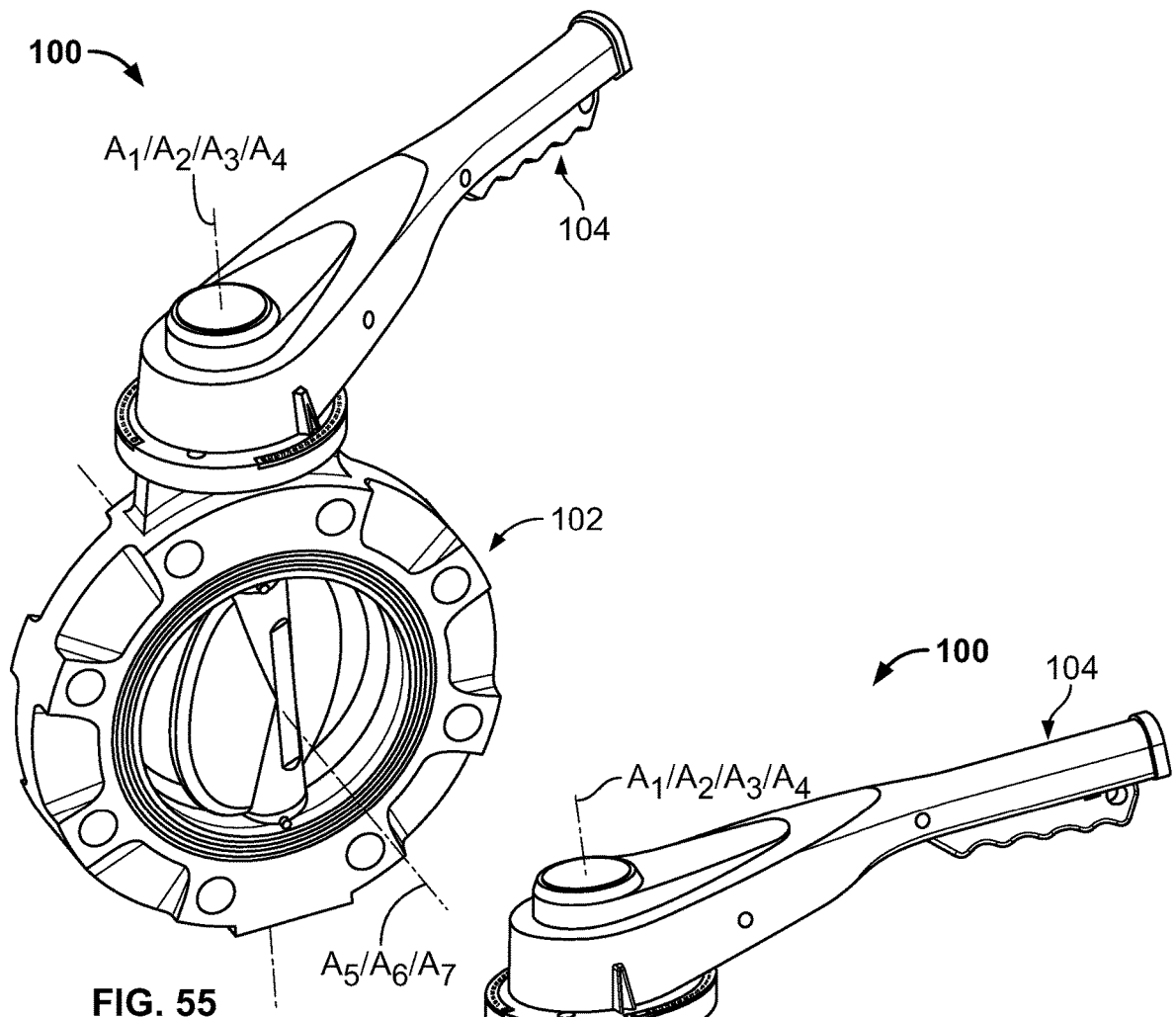
FIG. 55 shows a perspective view of an exemplary butterfly valve in a partially open position according to the present disclosure.
Figure 56:
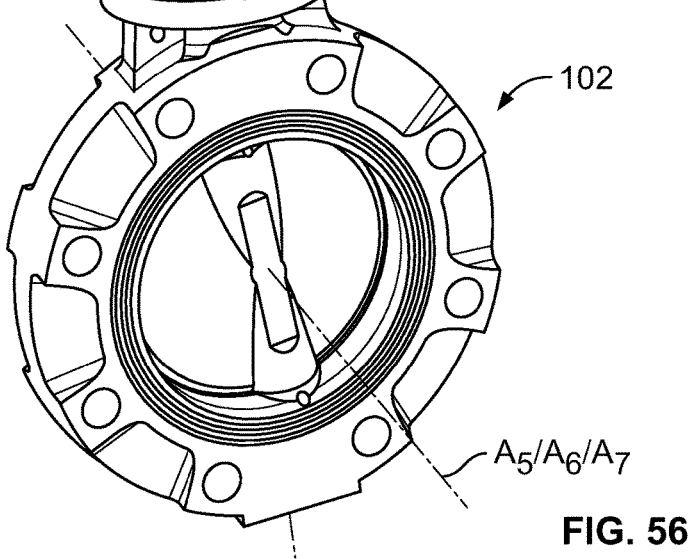
FIG. 56 shows a perspective view of an exemplary butterfly valve in a closed position according to the present disclosure.
Figure 57:
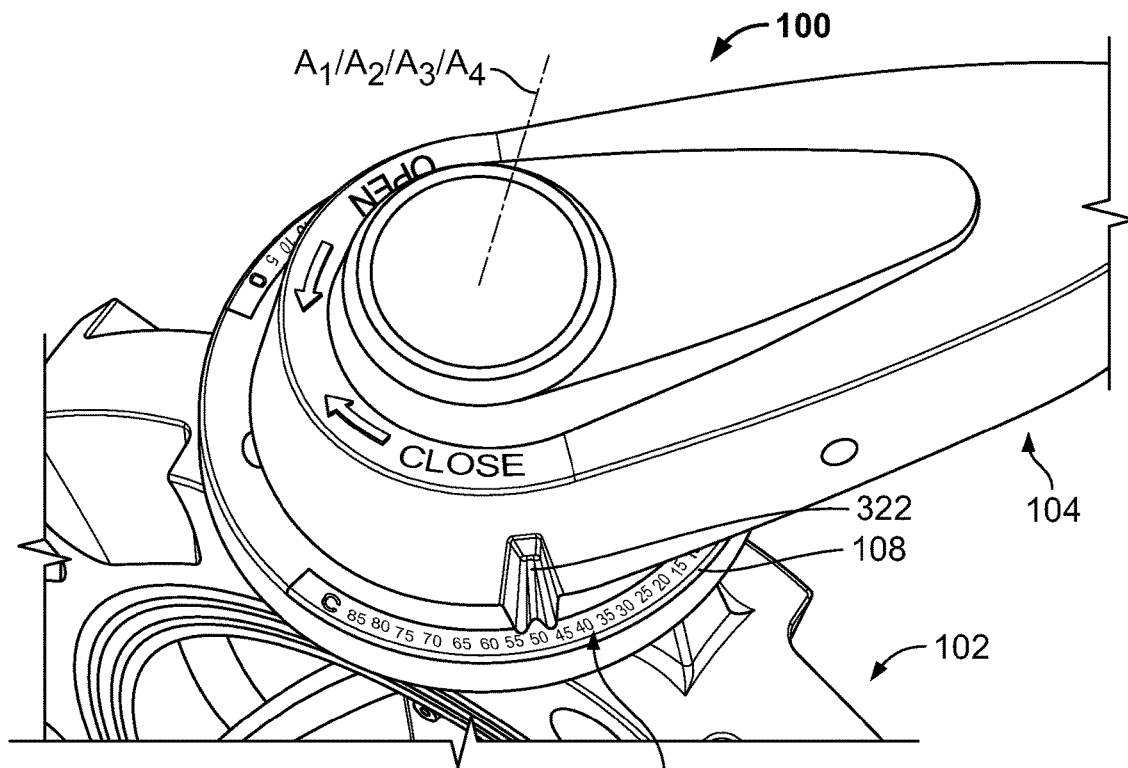
FIG. 57 shows a perspective view of a handle assembly relative to a body indicator bezel according to the present disclosure.

With reference to FIGS. 54-56, perspective views of an assembled butterfly valve 100 are provided. In particular, FIG. 54 shows the butterfly valve 100 positioned in a fully open position, FIG. 55 shows the butterfly valve 100 positioned in a partially open position, and FIG. 56 shows the butterfly valve 100 positioned in a fully closed position. When assembled, the vertical axes $A_1$, $A_2$, $A_3$ and $A_4$ of the components of the butterfly valve 100 can be substantially aligned. Similarly, the longitudinal axes $A_5$, $A_6$ and $A_7$ of the components of the butterfly valve 100 can be substantially aligned. As can be seen from FIGS. 54-56, as the handle assembly 104 and the disc 112 are rotated relative to the body assembly 102, the protrusions 322 on the handle body 126 align with the visual indicators 184 on the body indicator bezel 108 to indicate the angle or position of the disc 112 relative to the body 106. FIG. 57 illustrates a detailed view of the protrusions 322 on the handle body 126 aligned with the visual indicators 184 on the body indicator bezel 108.

Figure 58:
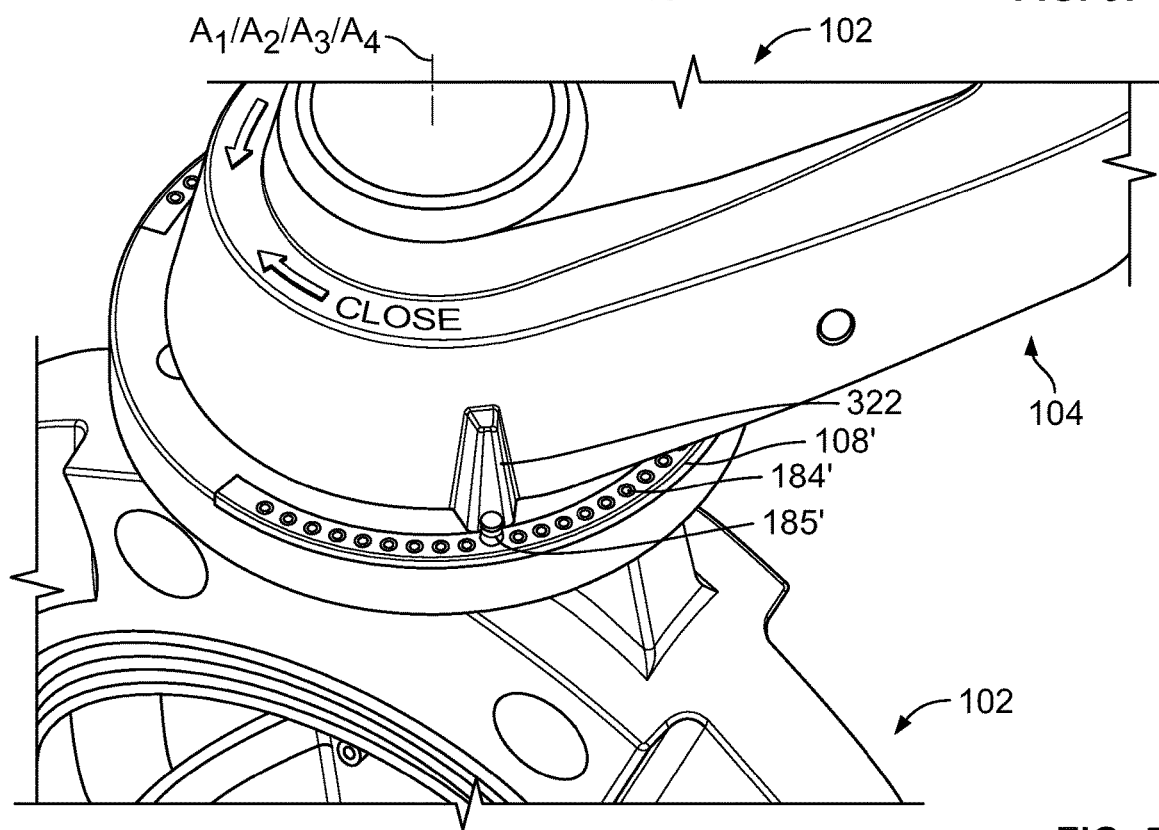
FIG. 58 shows a perspective view of a handle assembly relative to a body indicator bezel with sensors according to the present disclosure.

With reference to FIG. 58, in some embodiments, the butterfly valve 100 can include a position indication system with sensors. In particular, the body assembly 102 can include a body indicator bezel 108' with a plurality of sensors 184' positioned thereon. As the handle assembly 104 rotates the disc 112 relative to the body assembly 102, a target 185' can be moved over the sensors 184'. When the disc 112 has been positioned in the desired orientation relative to the body assembly 102, the sensor 184' aligned with the target 185' can provide a signal response output corresponding to the position of the butterfly valve 100.

Figure 59:
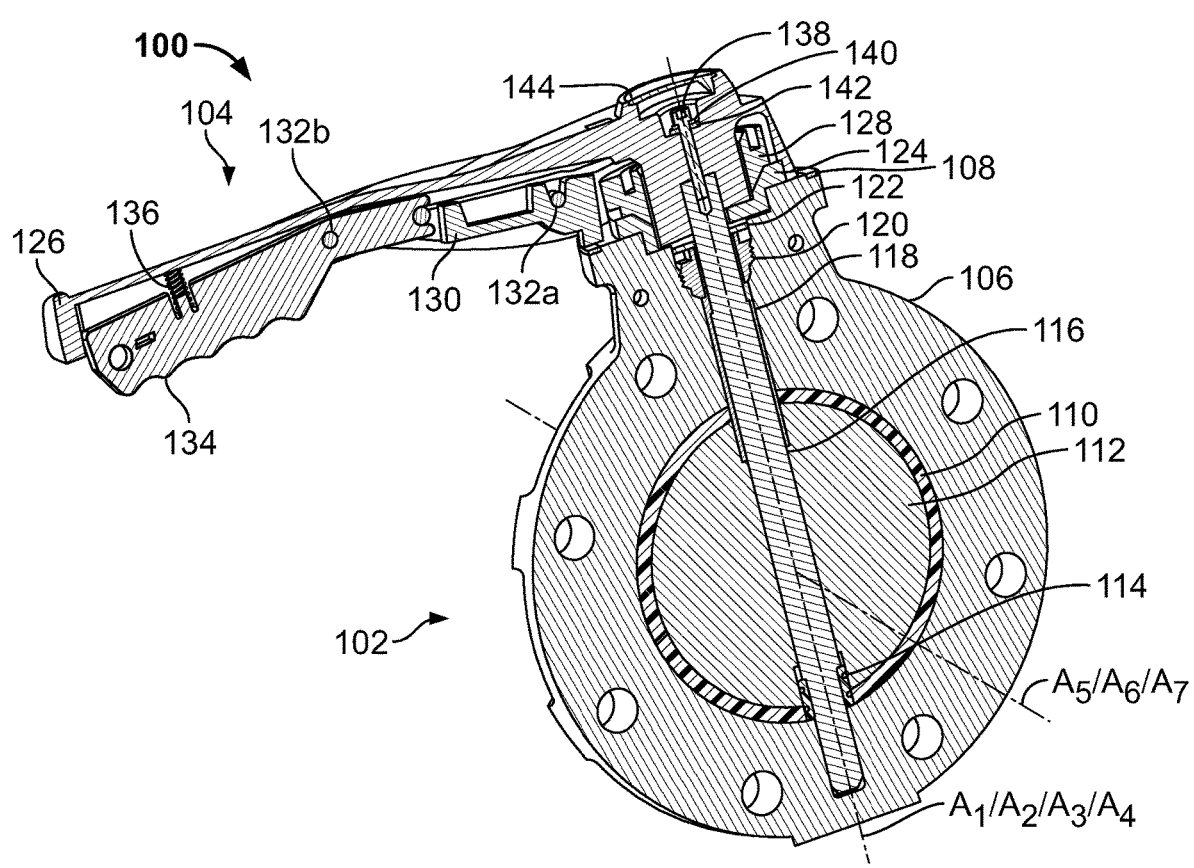
FIG. 59 shows a cross-sectional, perspective view of an exemplary butterfly valve in a closed and locked position according to the present disclosure.
Figure 60:
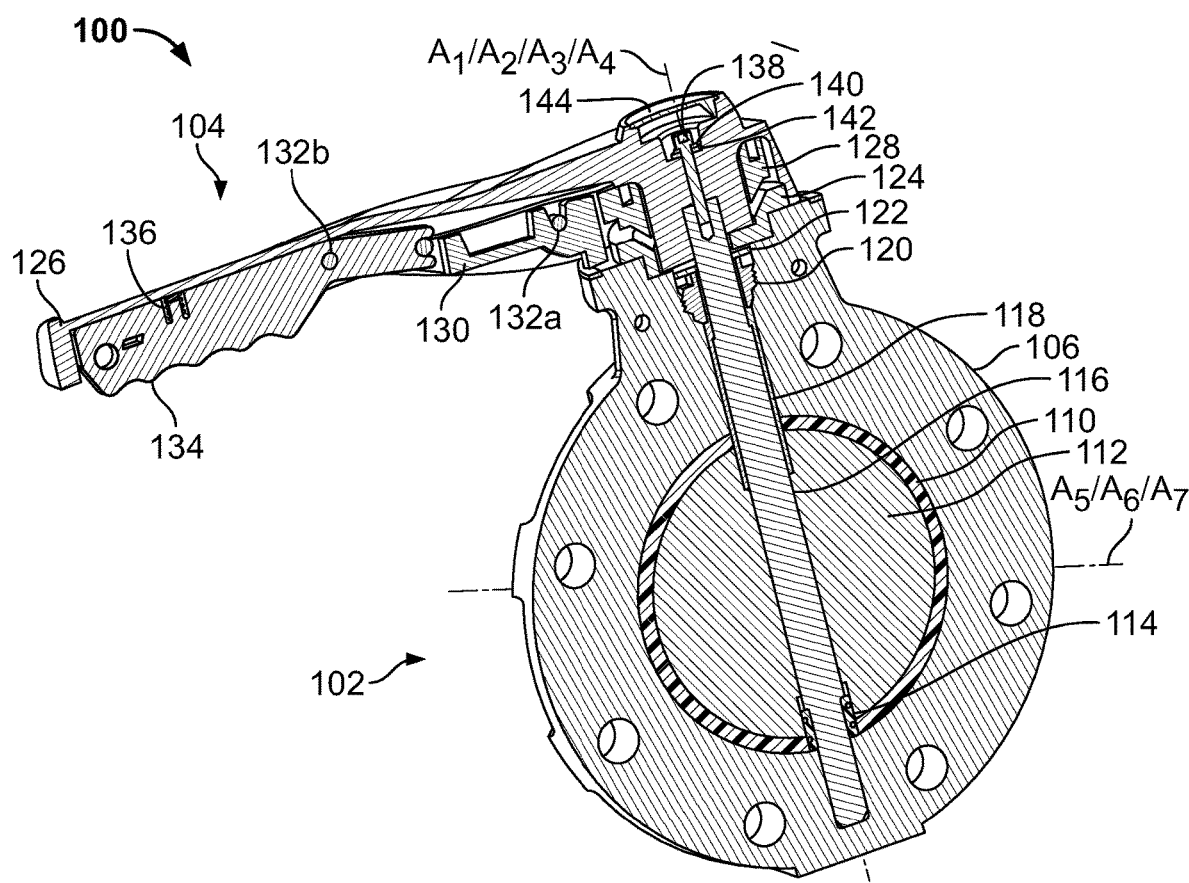
FIG. 60 shows a cross-sectional, perspective view of an exemplary butterfly valve in a closed and unlocked position according to the present disclosure.

With reference to FIGS. 59 and 60, cross-sectional views of the butterfly valve 100 are provided. In particular, FIG. 59 shows the butterfly valve 100 in a locked position, e.g., the grip 134 is uncompressed, the spring 136 is expanded, and the force ring 128 and the cog 124 are interlocked relative to each other. The position of the butterfly valve 100 as shown in FIG. 59 can be the normal position of the butterfly valve 100, thus preventing undesired movement of the disc 112. FIG. 60 shows the butterfly valve 100 in an unlocked position, e.g., the grip 134 is compressed in the direction of the handle body 126, the spring 136 has been compressed due to the force on the grip 134, and the force ring 128 has been lifted off of the cog 124 such that the handle assembly 104 can rotate the disc 112 relative to the body assembly 102. The position of the butterfly valve 100 as shown in FIG. 60 can be the squeezed position.

One goal of operation of the butterfly valve 100 can be to control the position of the disc 112 within the butterfly valve 100 for the purpose of altering the rate of flow of a fluid through the butterfly valve, up to and including a closed position. Operating the butterfly valve 100 with a handle assembly 104 can be accomplished by first squeezing the grip 134 of the handle assembly 104 such that the stem 116 and the disc 112 can be rotated about the vertical axis $A_1$. Since the position of the handle assembly 104 is aligned with the position of the faces of the disc 112 during assembly of the butterfly valve 100, the position of the disc 112 with respect to the flow line can be inferred by the position of the handle assembly 104.

The handle body 126 can act as a rough position indicator since the length $L_5$ extension of the handle body 126 can generally be aligned to the face of the disc 112. In some embodiments, visual indicators 184 on the body indicator bezel 108 positioned on the mounting plate 158 of the body 106 and protrusions 322 on the handle body 126 can be aligned to indicate a position of the disc 112. The handle body 126 can also include designations 329 indicating the direction of rotation of the handle assembly 104 to move the butterfly valve 100 into a closed or open position (or to reduce or increase the flow passing through the butterfly valve 100). The splines 288 on the cog 124 and the splines 334 on the force ring 128 can be spaced such that discrete and repeatable rotation of the disc 112 to particular positions can be accomplished. In some embodiments, when friction is used to hold the cog 124 and the force ring 128 relative to each other, rotation of the disc 112 to specific locations can be dependent on the user.

While the handle assembly 104 discussed herein has been implemented for a butterfly valve 100, it should be understood that the handle assembly 104 can be adapted for any quarter turn valve (not shown). In some embodiments which utilize the spline interface between the cog 124 and the force ring 128, a position of the handle assembly 104 can be positioned in a plane perpendicular to the vertical axis $A_1$ and can be used on any valve that requires less than a quarter of a turn to operate or more than a quarter of a turn to operate.

In some embodiments, the operation of the butterfly valve 100 can be accomplished without or in combination with the use of the cog 124 and the handle assembly 104 by incorporating manual, powered or automatic quarter turn actuators (not shown). For example, if the butterfly valve 100 is not to be operated with a handle assembly 104, the body assembly 102 can be assembled without the cog 124 and an alternative method of operation of the butterfly valve 100 can be used, e.g., a worm gear (not shown). A variety of worm gears can be used which provide the quarter turn movement needed for the butterfly valve 100. Three primary features of the worm gear can affect the assembly of the butterfly valve 100. The worm gear generally includes a recess in its drive center that can be matched or adapted to the third section 238 of the stem 116. The housing of the worm gear can include a pattern of holes designed to match the pattern of holes in the mounting plate 258 of the body 106. The gear capacity can be selected for the torsion operational load required by the butterfly valve 100. In some embodiments, other devices (not shown), e.g., electric, pneumatic, or hydraulic actuators, which provide a quarter turn movement (or other specific extent of movement above or below the quarter turn movement of the stem 116 and the disc 112) can also be used in conjunction with the mounting plate 258 of the body 106. It should be noted that since the cog 124 can be removed from the butterfly valve 100, the valve stops can also be removed. Thus, when the butterfly valve 100 requires operation with a mechanism other than a handle assembly 104, e.g., power actuators, automatic actuators, and the like, the handle assembly 104 can be removed to facilitate a simple mounting of the actuator to the stem 116 (not shown). The butterfly valve 100 discussed herein can thereby be manually and/or automatically positioned in a fully open position, a fully closed position, or at a desired angle for a partially open position.

Figure 61:
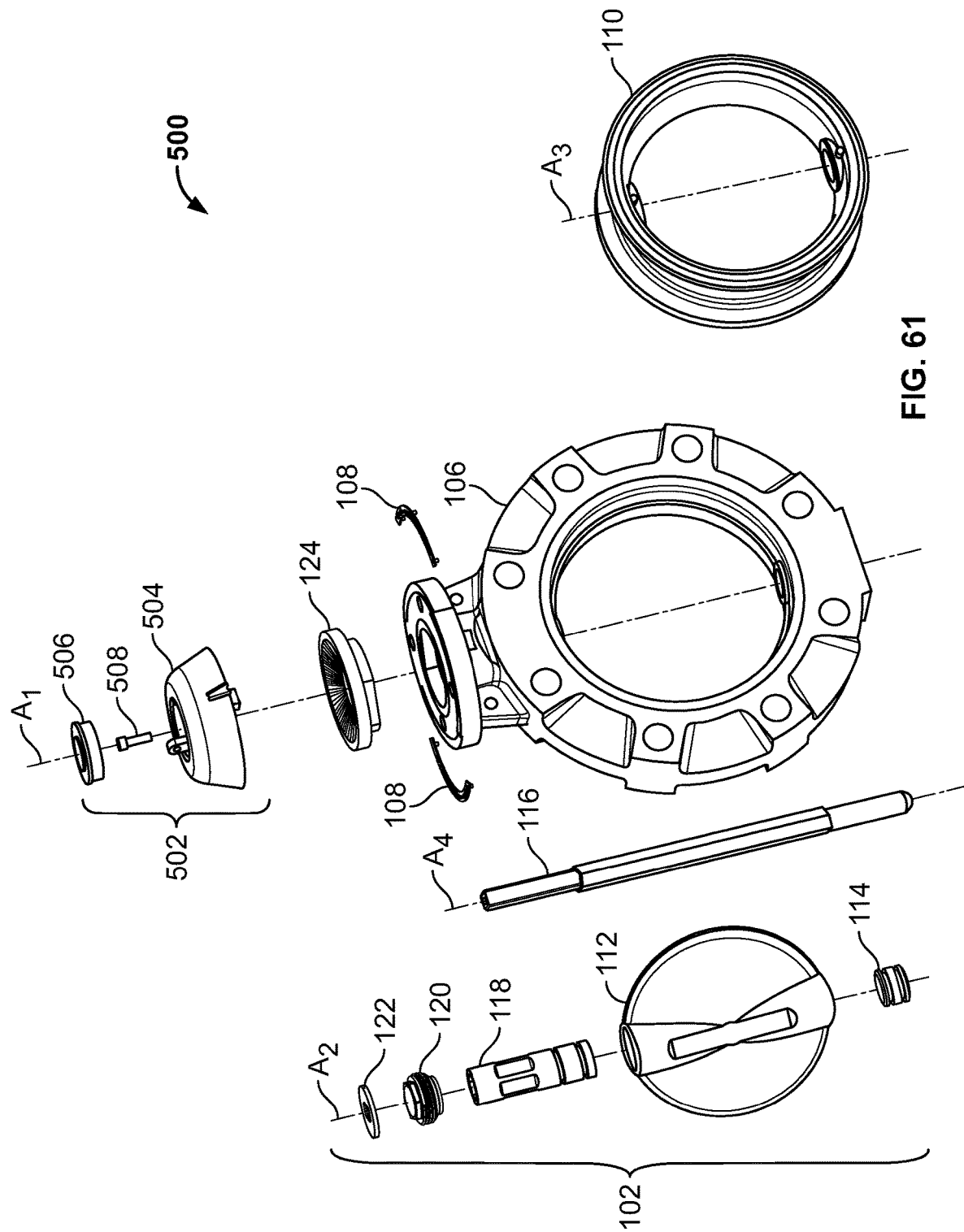
FIG. 61 shows an exploded, perspective view of an exemplary butterfly valve according to the present disclosure.

Turning now to FIG. 61, an exploded, perspective view of an exemplary embodiment of a butterfly valve and a locking cap assembly 500 (hereinafter "butterfly valve 500") is provided. The butterfly valve 500 includes a body assembly 102 substantially similar to the body assembly 102 discussed above and a locking cap assembly 502 mechanically connected relative to each other. As discussed above, the body assembly 102 includes a body 106, a body indicator bezel 108, a liner 110, a disc 112, a seal retainer 114, a stem 116, a bearing 118, a gland 120, a junk seal 122 and a cog 124. The locking cap assembly 502 includes a locking cap 504, a cap bezel 506 and a fastener 508 (e.g., a screw), each of which will be discussed in greater detail below. In some embodiments, the locking cap assembly 502 can include one or more washers (not shown) similar to the first and second washers 140 and 142 of FIG. 1.

Still with reference to FIG. 61, when assembled, the body 106, the body indicator bezel 108, the cog 124, the locking cap 504, the cap bezel 506 and the fastener 508 can be aligned along vertical axis $A_1$. Similarly, when assembled, the disc 112, the seal retainer 114, the bearing 118, the gland 120 and the junk seal 122 can be aligned along vertical axis $A_2$, and vertical axis $A_2$ can be aligned relative to the vertical axis $A_1$. Further, when assembled, the vertical axis $A_3$ of the liner 110 and the vertical axis $A_4$ of the stem 116 can be aligned relative to the vertical axis $A_1$.

In some embodiments, all or some of the components of the butterfly valve 500 can be fabricated from, e.g., polyvinyl chloride (PVC), chlorinated polyvinyl chloride (CPVC), glass-filled polypropylene, and the like. In some embodiments, additional materials selected for their strength and/or dimensional stability, e.g., glass-filled polyethermide (PEI), can be used in the cog 124 or the locking cap 504. The design of the butterfly valve 500 discussed herein should not be limited to the field of thermoplastics and can be adapted to products constructed from metal or other materials. In some embodiments, the liner 110 can be fabricated from an elastomeric material, e.g., an ethylene propylene diene monomer (EPDM), a fluoropolymer elastomer (FPM), a nitrile rubber (NBR), materials with resiliency of elastomers, materials with more or less resiliency than elastomers, and the like.

Figure 62:
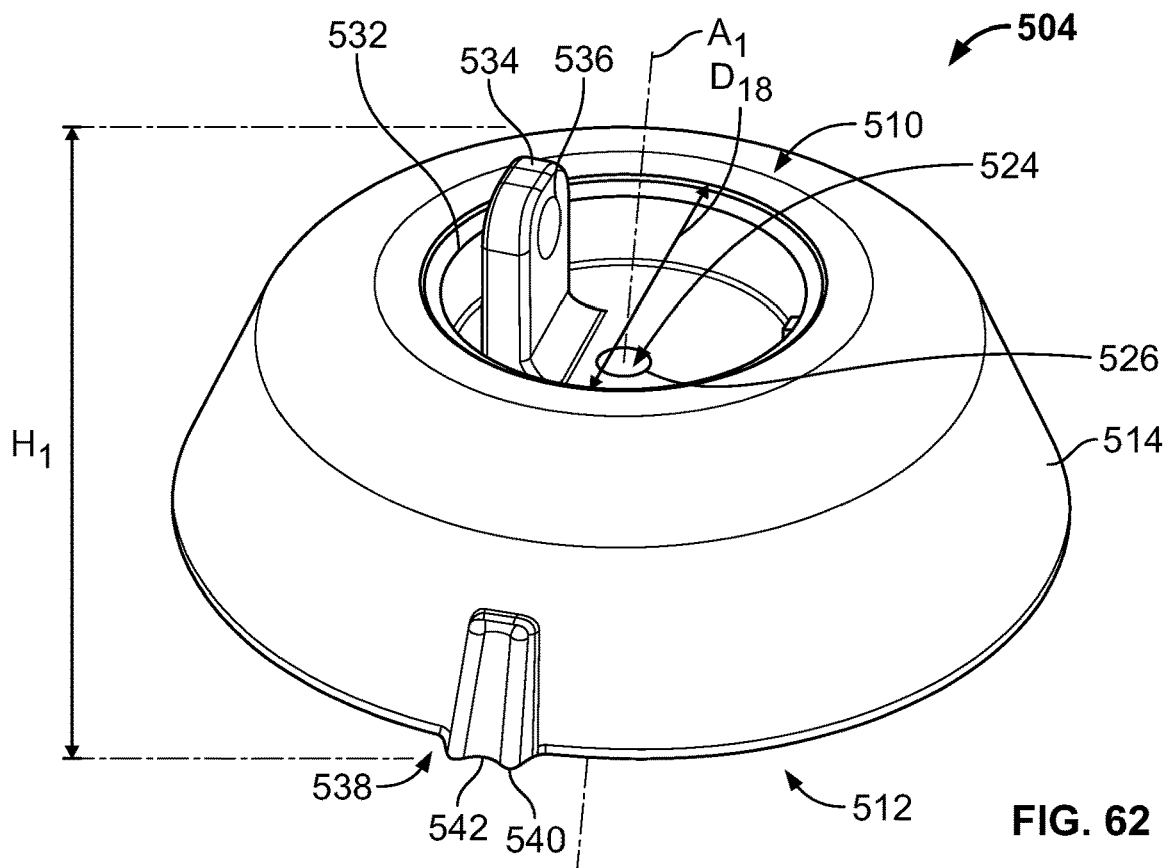
FIG. 62 shows a top, perspective view of a first embodiment of a cap of an exemplary butterfly valve according to the present disclosure.
Figure 63:
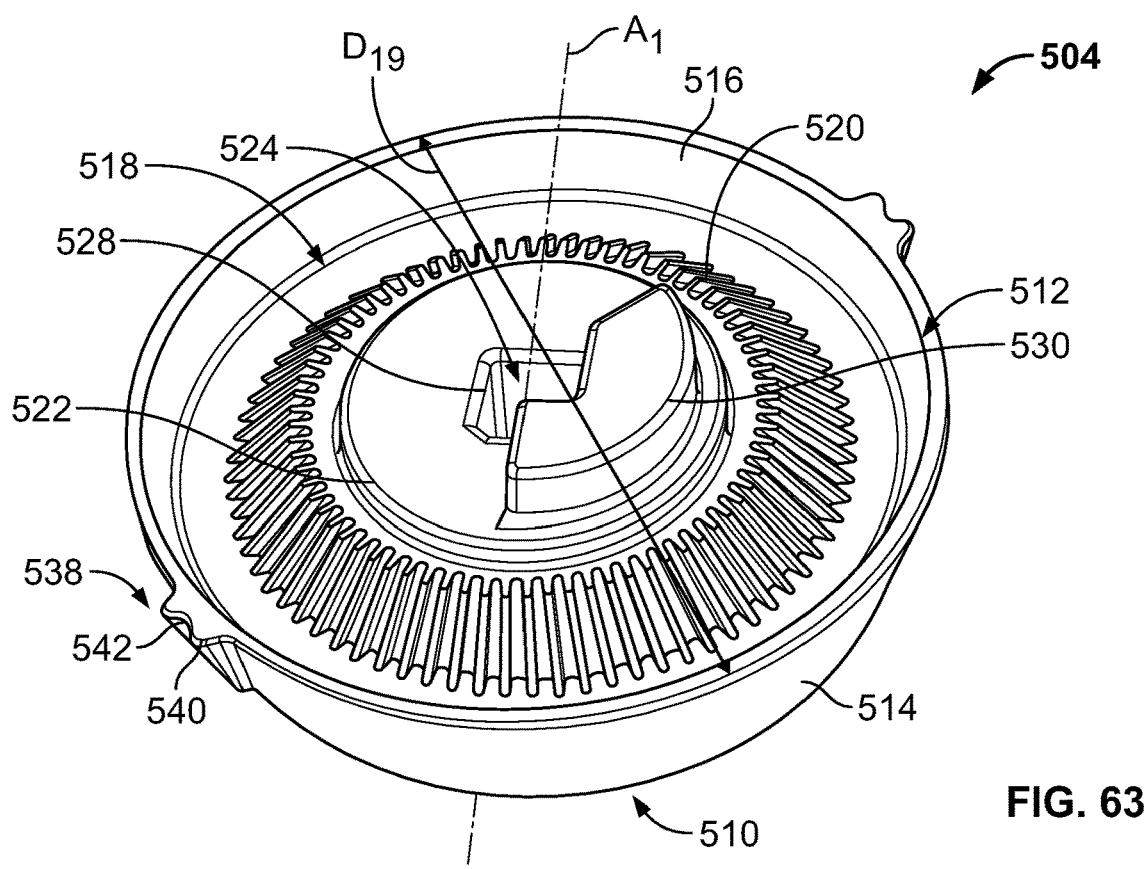
FIG. 63 shows a bottom, perspective view of a first embodiment of a cap of an exemplary butterfly valve according to the present disclosure.

With reference to FIGS. 62 and 63, top and bottom perspective views, respectively, of an exemplary locking cap 504 are provided. Although discussed herein as implemented with a butterfly valve 500, it should be understood that the locking cap 504 can be implemented with a variety of valves, e.g., butterfly valves, ball valves, and the like. The locking cap 504 can include an upper surface 510 and a bottom surface 512. The locking cap 504 also includes an outer surface 514 and an inner surface 516. The inner surface 516 forms a cavity 518 on the bottom surface 512 of the locking cap 504. The outer surface 514 can define a conical frustum shape at the upper surface 510 of the locking cap 504. A diameter $D_{18}$ of the frustum shape can be larger than a height $H_1$ of the locking cap 504. A diameter $D_{19}$ at the bottom surface 512 of the locking cap 504 can be greater than the diameter $D_{18}$ at the upper surface 510 of the locking cap 504.

The bottom surface 512 and, in particular, the inner surface 516 of the cavity 518, includes a radial pattern of splines 520 positioned relative to the vertical axis $A_1$ configured and dimensioned to correspond or match the splines 288 of the cog 124. In some embodiments, the radial pattern of splines 520 can radially extend 360 degrees around the vertical axis $A_1$ to create a spline 520 engagement around a full circumference of the locking cap 504. In some embodiments, the radial pattern of splines 520 can radially extend less than 360 degrees. In some embodiments, the splines 288 of the cog 124 and the splines 520 of the locking cap 504 can overlap by a total of 360 degrees or less during operation. The locking cap 504 further includes a boss 522 radially centered on the bottom surface 512 relative to the vertical axis $A_1$ which corresponds to the centerline or vertical axis $A_4$ of the stem 116. The center of the locking cap 504 includes a bore 524 extending therethrough. The bore 524 includes a first bore section 526 with a circular cross-section at the upper surface 510 of the locking cap 504 and a second bore section 528 with a cross-section matching the cross-section of the third section 238 of the stem 116 at the bottom surface 512 of the locking cap 504.

The second bore section 528 allows the locking cap 504 to be secured to the stem 116 and the first bore section 526 allows the passage of the fastener 508 therethrough to fasten the locking cap 504 to the stem 116. It should be understood that as the locking cap 504 is fastened to the stem 116, the splines 520 of the locking cap 504 can engage the splines 288 of the cog 124 to prevent rotation of the disc 116 within the body 106. The locking cap 504 thereby secures the position of the stem 116 and the disc 116 relative to the body 106. A step 530 protruding from the boss 522 can radially extend approximately 135 degrees relative to the vertical axis $A_1$ and can be configured and dimensioned to be inserted within the partial bore 290 and against the segment 298 of the cog 124 to prevent rotation of the cog 124.

A counter bore 532 located on the upper surface 510 of the locking cap 504 can be configured and dimensioned to receive therein a cap bezel 506, which will be described in detail below. The counter bore 532 includes a protrusion 534, e.g., a lock boss, which extends in a direction parallel to the vertical axis $A_1$ and which passes through a corresponding opening in the cap bezel 506 when the cap bezel 506 is attached to the locking cap 504. The protrusion 534 includes a hole 536 passing therethrough perpendicular to the vertical axis $A_1$. A position of the hole 536 in the protrusion 534 can be close to the cap bezel 506 when the cap bezel 506 is positioned in the counter bore 532. The hole 536 can be configured and dimensioned to receive a lock (see, e.g., FIGS. 65-67), e.g., a pad lock, a lock out tag out device, or any other device available to restrict removal of the locking cap 504, the cap bezel 506 and/or the fastener 508. The cap bezel 506 cannot be removed to expose the top of the fastener 508 until a user removes the lock (not shown) to remove the bezel 506 and the fastener 508, thereby allowing the splines 288 of the cog 124 to be disengaged from the splines 520 of the locking cap 504. Thus, undesired operation of the butterfly valve 500 can be prevented. In some embodiments, rather than a protrusion 534, holes in the locking cap 504 can be used to fasten the locking cap 504 to the mounting plate 158 on the body 106 (see, e.g., FIGS. 68 and 69).

The outer surface 514 of the locking cap 504 can include one or more protrusions 538 extending therefrom parallel to the vertical axis $A_1$ and extending from an edge of the bottom surface 512. Each of the protrusions 538 can define a face that creates two rounded points 540 with a rounded bridging area 542 bridging the points 540. In embodiments including two protrusions 538, the protrusions 538 can be positioned approximately 180 degrees relative to each other along the outer surface 514 of the locking cap 504. The locking cap 504 can be positioned onto the body assembly 102 such that the protrusions 538 align relative to the visual indicators 184 on the body indicator bezel 108 to indicate to a user the position of the butterfly valve 500, e.g., a fully closed position, a fully open position, or an angle or degree of a partially open position.

Figures 64, 65:
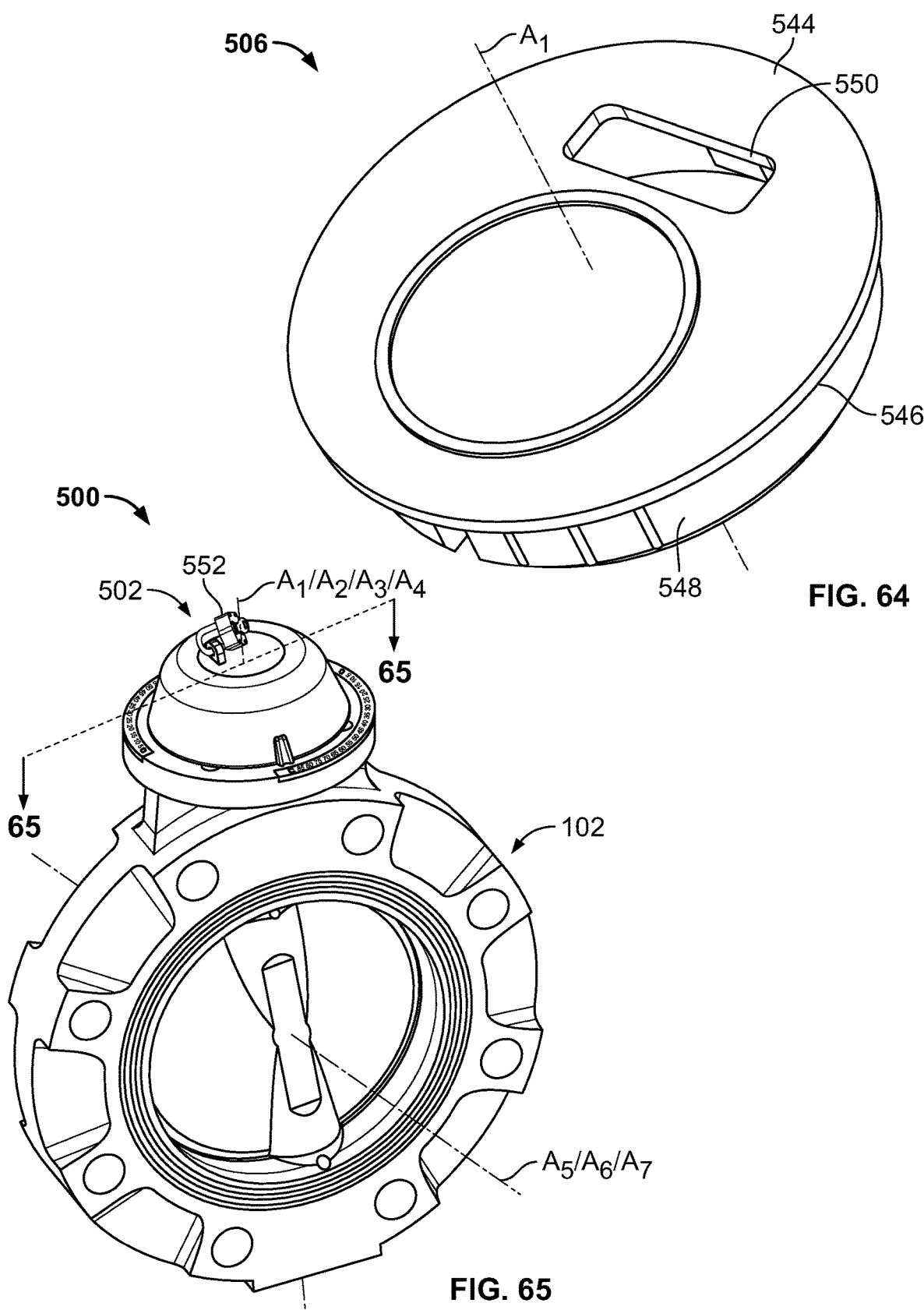
FIG. 64 shows a top, perspective view of a first embodiment of a cap bezel of an exemplary butterfly valve according to the present disclosure.
FIG. 65 shows a perspective view of an exemplary butterfly valve in a closed position according to the present disclosure.

With reference to FIG. 64, a perspective view of an exemplary cap bezel 506 of a butterfly valve 500 is provided. The cap bezel 506 can include a vertical axis $A_1$ extending therethrough. As illustrated in FIG. 61, when the components of the body assembly 102 have been assembled, the locking cap 504 can be assembled with the body assembly 102. In some embodiments, one or more washers (not shown) can be positioned in the counter bore 532 of the locking cap 504 and a fastener 550 can be used to secure the locking cap assembly 502 relative to the body assembly 102. The cap bezel 506 can then be positioned within the counter bore 532 of the locking cap 504 to cover the fastener 508.

The cap bezel 506 can resemble a plug and can be configured as a substantially round plate that fits within the counter bore 532 of the locking cap 504. The cap bezel 506 functions to cover the fastener 508, e.g., a screw, which holds the locking cap 504 to the body assembly 102. In some embodiments, the cap bezel 506 can also include information printed and/or molded on an upper surface 544 to identify the brand of the butterfly valve 500 and/or allow a customization of the butterfly valve 500 to, e.g., identify the process the butterfly valve 500 may be used in, the materials in the butterfly valve 500, the age of the butterfly valve 500, other valve identification, and the like (not shown). In some embodiments, the cap bezel 506 can be customized to the point of containing an electronic signature (not shown) for the butterfly valve 500. The bottom surface 546 of the cap bezel 506 can include a radial protrusion 548 extending therefrom. The radial protrusion 548 can be configured and dimensioned to detachably interlock the cap bezel 506 relative to the counter bore 532 of the locking cap 504 via, e.g., a friction fit. The cap bezel 506 includes an opening 550 passing from the upper surface 510 to the bottom surface 512 configured and dimensioned to accommodate the passing of the protrusion 534 of the locking cap 504 when the cap bezel 506 is positioned onto the locking cap 504.

Thus, rather than using a lock (see, e.g., FIGS. 65-67) passed through the bore 392 of the grip 134 to prevent movement or squeezing of the grip 134 within the handle body 126, in some embodiments, the handle assembly 104 can be removed from the butterfly valve 100 and the locking cap 504 and cap bezel 506 can be secured to the body assembly 102 to fixate the stem 116 and the disc 112 at a desired position, e.g., fully open, fully closed, or partially open at a particular angle. For example, a user can initially operate the butterfly valve 100 with a handle assembly 104 or the other means of operation described above to position the stem 116 and the disc 112 at a desired position relative to the body 106. The handle assembly 104 can then be removed from the body assembly 102 and can be replaced with the locking cap 504, the fastener 508 and the cap bezel 506. A lock (not shown) can be secured through the hole 536 of the locking cap 504 to prevent removal of the cap bezel 506, the fastener 508 and/or the locking cap 504. Thus, without disassembly of or damage to the locking cap assembly 502 and replacement of the handle assembly 104, the locking cap 504 can prevent rotation of the stem 116 and disc 112 relative to the body 106.

Figure 66:
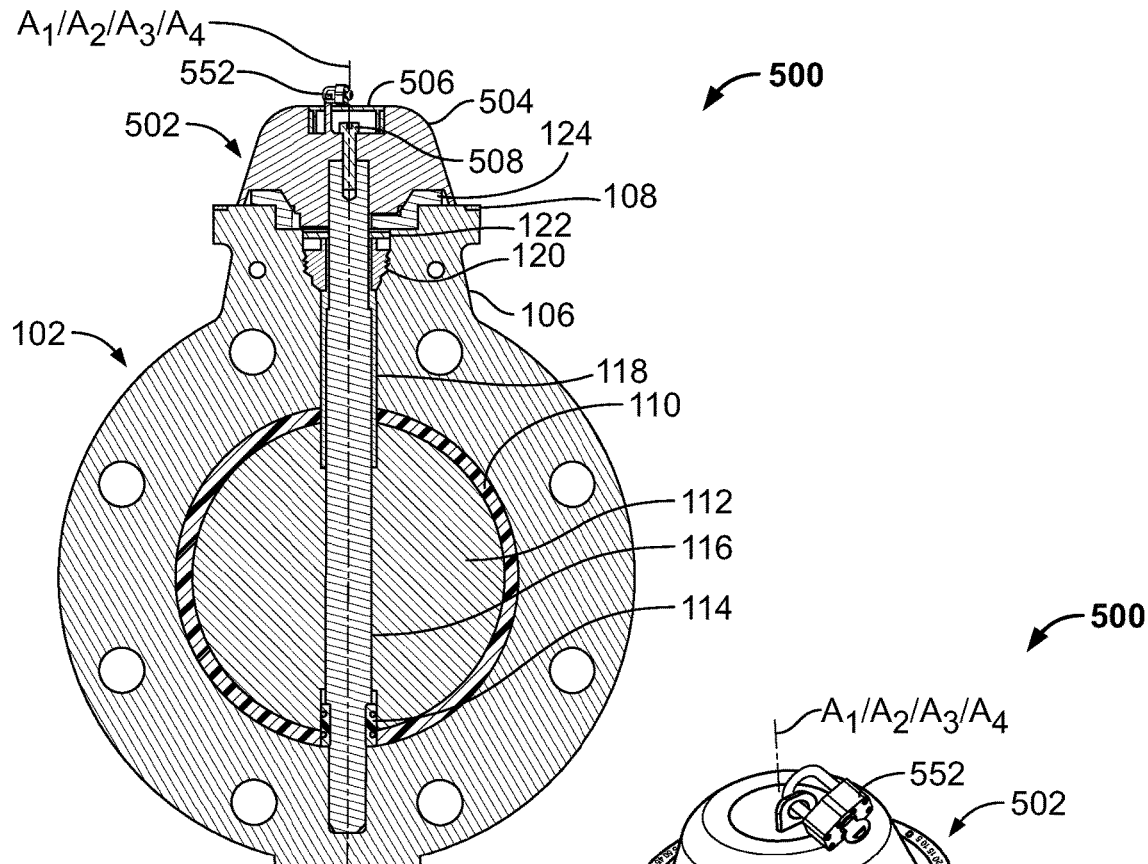
FIG. 66 shows a cross-sectional, perspective view of an exemplary butterfly valve in a closed position according to the present disclosure.
Figure 67:
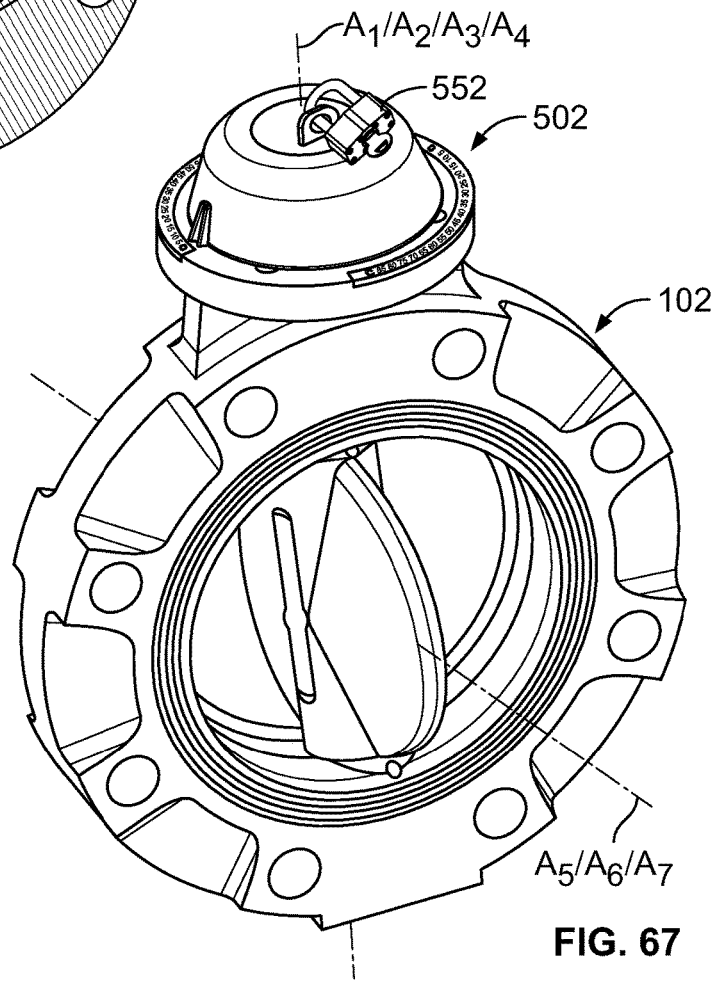
FIG. 67 shows a perspective view of an exemplary butterfly valve in an open position according to the present disclosure.

With reference to FIGS. 65-67, perspective and cross-sectional views of a butterfly valve 500 are provided. In particular, FIG. 65 shows a perspective view of a butterfly valve 500 in a fully closed position, including a cap 504 engaged with the cog 124. As described above, the protrusions 538 on the locking cap 504 are shown aligned with the visual indicators 184 of the body indicator bezel 108 to indicate that the butterfly valve 500 is in a closed position. FIG. 66 shows a cross-sectional view of the butterfly valve 500 of FIG. 65 along the plane 66-66. FIG. 67 shows a perspective view of the butterfly valve 500 in a fully open position. As described above, the protrusions 538 on the locking cap 504 are shown as rotated and aligned with the visual indicators 184 of the body indicator bezel 108 to indicate that the butterfly valve 500 is in an open position. Although illustrated in the open and closed positions, it should be understood that the butterfly valve 500 can also be positioned in intermediate positions, e.g., partially open positions. As discussed above and as shown in FIGS. 65-67, in some embodiments, a lock 552, e.g., a pad lock, a lock out tag out device, a cable, a wire, and the like, can be inserted through the hole 536 in the protrusion 534 of the locking cap 504 to restrict removal of the locking cap 504, the cap bezel 506 and/or the fastener 508.

Figure 68:
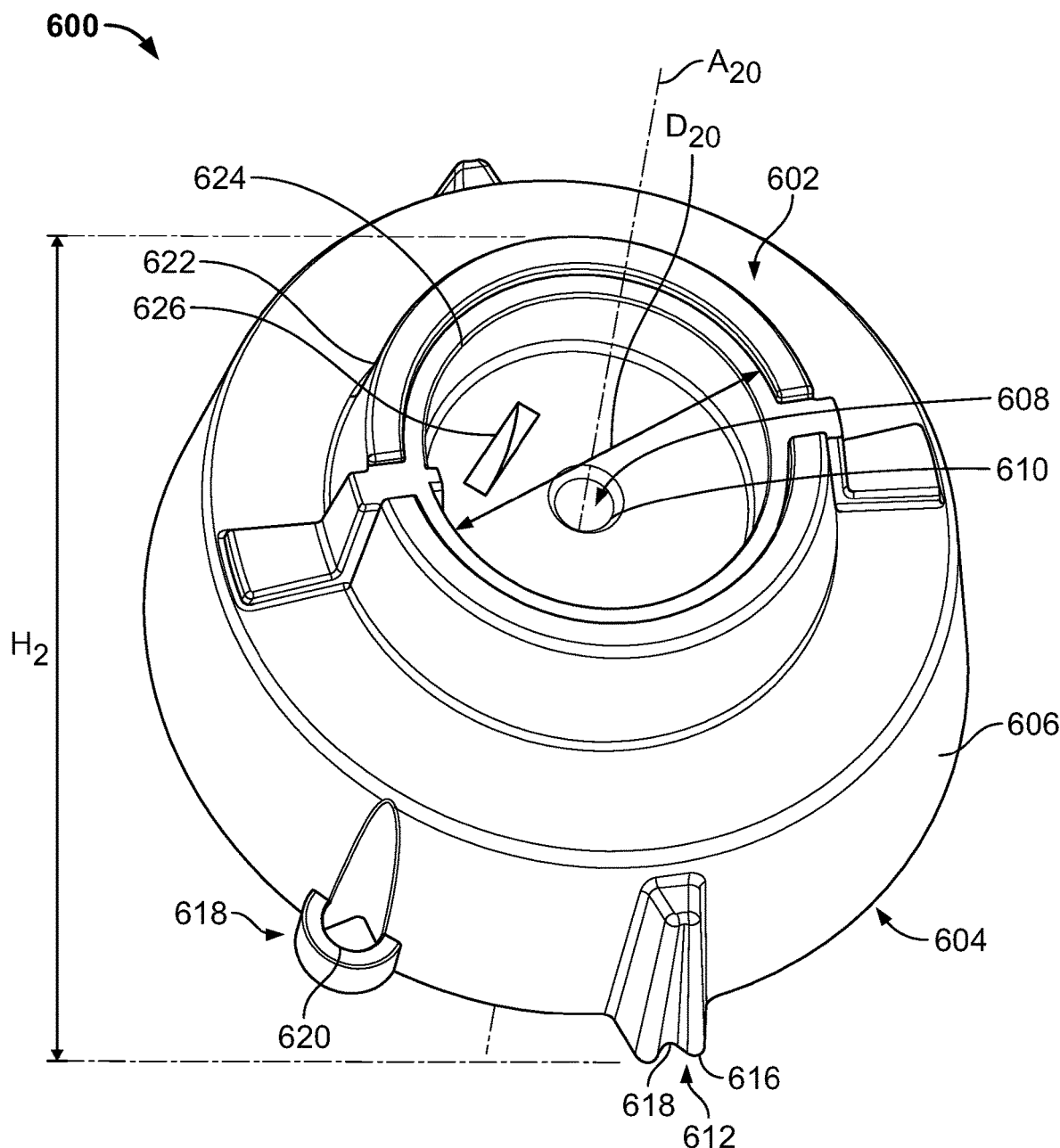
FIG. 68 shows a top, perspective view of a second embodiment of a cap of an exemplary butterfly valve according to the present disclosure.
Figure 69:
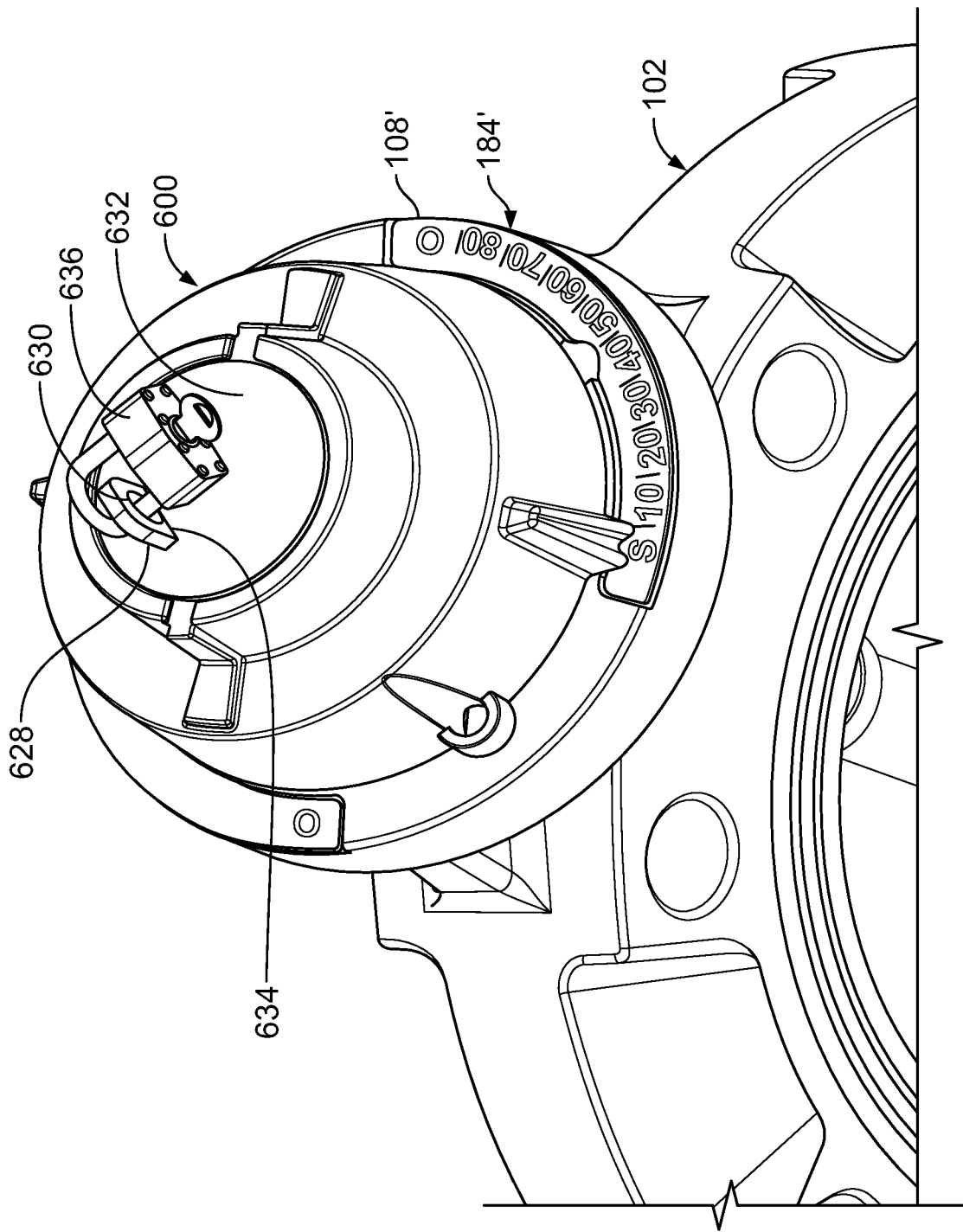
FIG. 69 shows a top, perspective view of a second embodiment of a cap on an exemplary butterfly valve in a closed position according to the present disclosure.

Turning to FIGS. 68 and 69, a top, perspective views of a second embodiment of a locking cap 600 is provided. In particular, FIG. 68 shows the locking cap 600 and FIG. 69 shows the locking cap 600 positioned onto a body assembly 102 of a butterfly valve 100. The locking cap 600 can include an upper surface 602 and a bottom surface 604. The locking cap 600 also includes an outer surface 606 and an inner surface (not shown). It should be understood that the inner surface of the locking cap 600 can be structured substantially similarly to the inner surface 516 of the locking cap 504 of FIGS. 62 and 63. In particular, the inner surface of the locking cap 600 can form a cavity on the bottom surface 604. The outer surface 606 can define a conical frustum shape at the upper surface 602 of the locking cap 600. A diameter $D_{20}$ of the frustum shape can be larger than a height $H_2$ of the locking cap 600. A diameter at the bottom surface 604 of the locking cap 600 can be greater than the diameter $D_{20}$ at the upper surface 602 of the locking cap 600.

Similar to the locking cap 504 described above, the bottom surface 604 and, in particular, the inner surface of the cavity of the locking cap 600 can include a radial pattern of splines positioned relative to the vertical axis $A_{20}$ configured and dimensioned to correspond or match the splines 288 of the cog 124. In some embodiments, the radial pattern of splines can radially extend 360 degrees around the vertical axis $A_{20}$ to create a spline engagement around a full circumference of the locking cap 600. In some embodiments, the radial pattern of splines can radially extend less than 360 degrees. In some embodiments, the splines 288 of the cog 124 and the splines of the locking cap 600 can overlap by a total of 360 degrees or less during operation. In some embodiments, rather than or in combination with splines, the locking cap 600 can include one or more male or female members configured to correspond to complementary one or more male or female members on the cog 124. The locking cap 600 further includes a boss (not shown) radially centered on the bottom surface 604 relative to the vertical axis $A_{20}$ which corresponds to the centerline or vertical axis $A_4$ of the stem 116. The center of the locking cap 600 includes a bore 608 extending therethrough. The bore 608 includes a first bore section 610 with a circular cross-section at the upper surface 602 of the locking cap 600 and a second bore section (not shown) with a cross-section matching the cross-section of the third section 238 of the stem 116 at the bottom surface 604 of the locking cap 600.

The second bore section can allow the locking cap 600 to be secured to the step 116 and the first bore section 610 can allow the passage of a fastener, e.g., fastener 508, a screw, and the like, therethrough to fasten the locking cap to the stem 116. It should be understood that as the locking cap 600 is fastened to the stem 116, the splines of the locking cap 600 can engage the splines 288 of the cog 124 to prevent rotation of the disc 116 within the body 106. The locking cap 600 thereby secures the position of the stem 116 and the disc 116 relative to the body 106. A step (not shown) protruding from the boss on the bottom surface 604 of the locking cap 600 can radially extend approximately 135 degrees relative to the vertical axis $A_{20}$ and can be configured and dimensioned to be inserted within the partial bore 290 and against the segment 298 of the cog 124 to prevent rotation of the cog 124.

The outer surface 606 of the locking cap 600 can include one or more protrusions 612 extending therefrom parallel to the vertical axis $A_{20}$ and extending from an edge of the bottom surface 604. Each of the protrusions 612 can define a face that creates two rounded points 616 with a rounded bridging area 618 bridging the points 616. In embodiments including two protrusions 612, the protrusions 612 can be positioned approximately 180 degrees relative to each other along the outer surface 606 of the locking cap 600. The locking cap 600 can be positioned onto the body assembly 102 such that the protrusions 612 align relative to the visual indicators 184' on the body indicator bezel 108' to indicate to a user the position of the disc 112 relative to the body 106, e.g., a fully closed position, a fully open position, an angle or degree of a partially open position, and the like. The body indicator bezel 108' of FIG. 69 can be substantially similar to the body indicator bezel 108 discussed above. In some embodiments, rather than indicating a closed position with a "C", the body indicator bezel 108' can define a closed position with an "S" representing stopping flow. In some embodiments, the locking cap 600 can include an eyelet 618 extending from the bottom surface 604 between the two protrusions 612. The eyelet 618 includes a bore 620 passing therethrough in a direction parallel to the vertical axis $A_{20}$. In some embodiments, when the locking cap 600 is positioned onto the body 106, the eyelet 618 can be used to pass a fastener, e.g., a screw, through the bore 620 and into a corresponding threaded hole 162 on the mounting plate 158 to secure the locking cap 600 to the body 106.

The upper surface 602 of the locking cap 600 can include a raised edge 622 and a counter bore 624 located within the raised edge 622 perimeter. The counter bore 624 can be configured and dimensioned to receive therein a cap bezel 632 (see, e.g., FIG. 69) to cover the fastener within the bore 608. In some embodiments, the cap bezel 632 can be press fit within the counter bore 624 of the locking cap 600. The counter bore 624 includes a blind slot 626, e.g., a rectangular slot, an oval slot, and the like, that extends in a direction parallel to the vertical axis $A_{20}$. In some embodiments, the protrusion 628 can be molded directly to the locking cap 600 and can extend through the opening 634 of the cap bezel 632. The protrusion 628 can further pass through a corresponding opening 634 in the cap bezel 632 when the cap bezel 632 is attached to the locking cap 600. The protrusion 628 includes a hole 630 passing therethrough perpendicular to the vertical axis $A_{20}$. A position of the hole 630 in the protrusion 628 can be close to the cap bezel 632 when the cap bezel 632 is positioned in the counter bore 624. The hole 630 can be configured and dimensioned to receive a lock 636, e.g., a pad lock, and/or a cable or wire to restrict removal of the locking cap 600, the cap bezel 632 and/or the fastener. Thus, the cap bezel 632 cannot be removed to expose the top of the fastener within the bore 608 until a user removes the lock 636 to remove the cap bezel 632, the fastener and the locking cap 600, thereby allowing the splines 288 of the cog 124 to be disengaged from the splines of the locking cap 600. Undesired operation of the butterfly valve can thereby be prevented. Alternatively or in combination with the lock 636, the eyelet 618 on the locking cap 600 can be used to further secure the locking cap 600 to the mounting plate 158 of the body 106.

Figure 70:
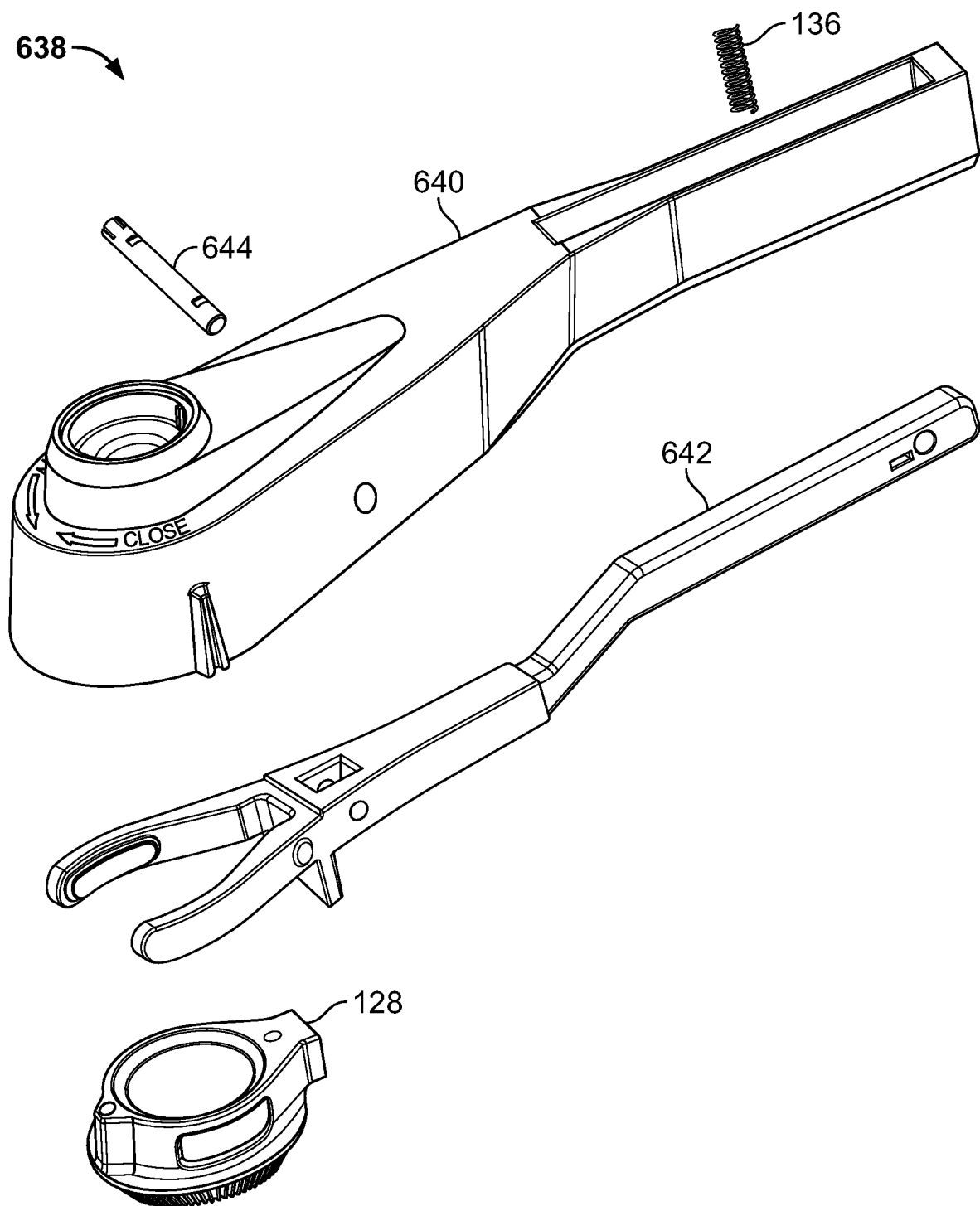
FIG. 70 shows an exploded, perspective view of a third embodiment of a handle assembly of an exemplary butterfly valve according to the present disclosure.

With reference to FIG. 70, an exploded, perspective view of a third embodiment of a handle assembly 638, e.g., a through-grip handle assembly design, is provided which can be implemented with the body assembly 102 for actuation of the butterfly valve 100. The handle assembly 638 can include a handle body 640, a lever/grip 642, a force ring 128 (discussed above), a pin 646 and a spring 136 (discussed above).

Figure 71:
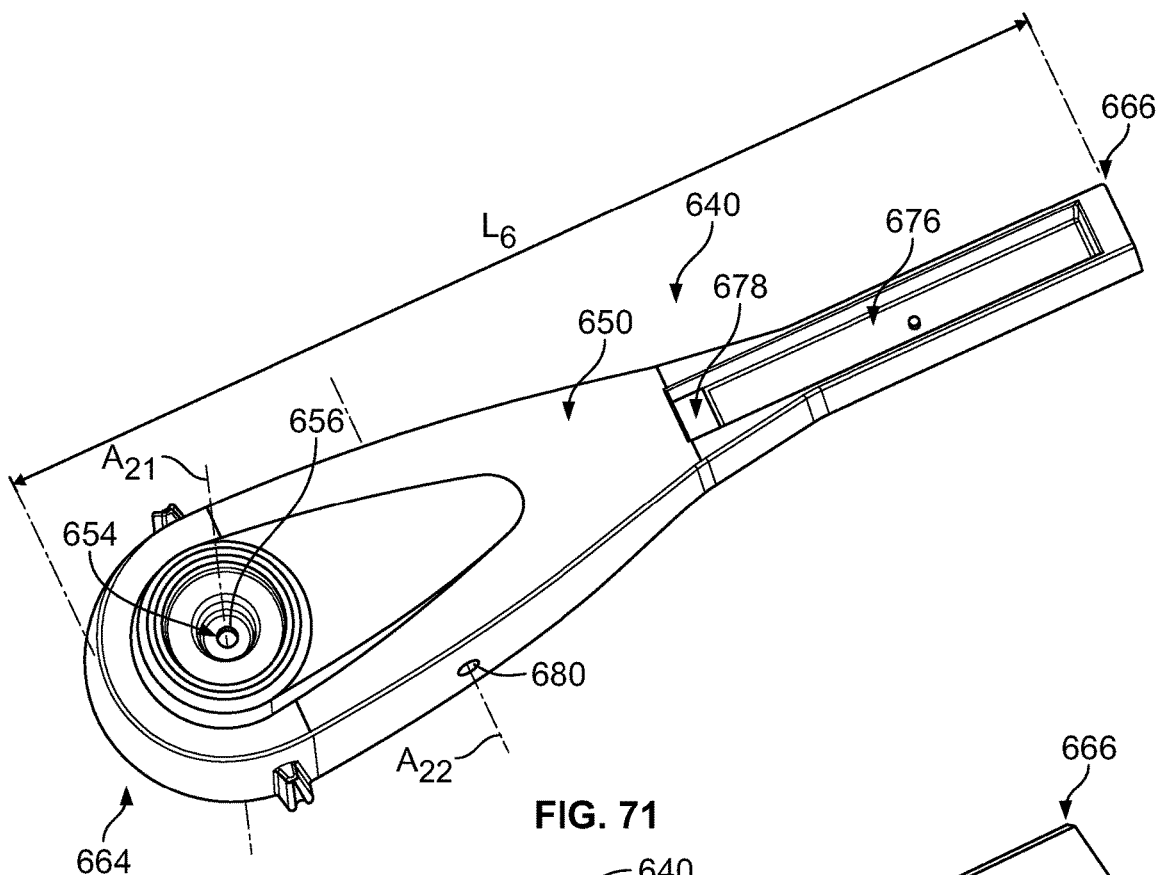
FIG. 71 is a top, perspective view of a handle body of an exemplary butterfly valve according to the present disclosure.
Figure 72:
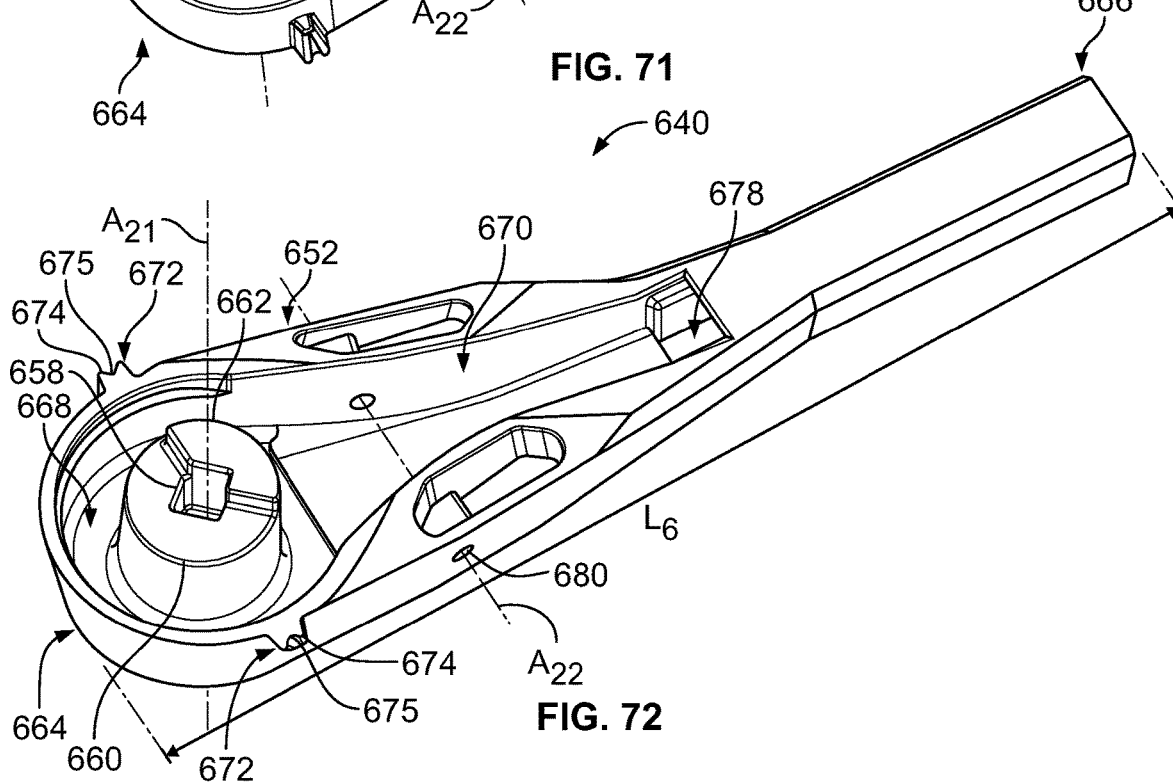
FIG. 72 is a bottom, perspective view of a handle body of an exemplary butterfly valve according to the present disclosure.

FIGS. 71 and 72 show top and bottom perspective views, respectively, of a handle body 640. As noted above, the handle body 640 can be part of the handle assembly 638 which can be implemented with the body assembly 102 for actuating the butterfly valve 100. The handle body 640 generally defines an elongated component of the butterfly valve 100 which can be positioned to extend perpendicularly relative to the vertical axis $A_1$. The handle body 640 includes an upper surface 650 and a bottom surface 652. The handle body 640 further includes a bore 654 extending therethrough along the vertical axis $A_{21}$, e.g., the axis along which the vertical axis $A_4$ of the stem 116 can be aligned when the butterfly valve 100 is assembled.

On the upper surface 650, the bore 654 can include a first bore section 656 configured as a circular bore. The upper surface 650 further includes a counter bore leading to the first bore section 656 configured and dimensioned to receive therein a first washer 140, a second washer 142 and a handle bezel 144 of FIG. 1. On the bottom surface 652, the bore 654 can include a second bore section 658, e.g., a recess, configured to correlate to the cross-sectional shape of the third section 238 of the stem 116. In the embodiment illustrated in FIGS. 71 and 72, the second bore section 658 is configured as substantially square in cross-section corresponding to the square cross-section of the third section 238 of the stem 116 of FIG. 14. When the body assembly 102 is assembled, at least part of the third section 238 of the stem 116 can extend out of the body 106 such that the third section 238 of the stem 116 can be inserted into at least a portion of the second bore section 658 of the handle body 640.

The handle body 640 includes a boss 660 on the bottom surface 652 which surrounds the second bore section 658 which mates to the stem 116. In some embodiments, the boss 660 can be fabricated from a single material. In some embodiments, the boss 660 can be fabricated from two or more materials. For example, a first material can be a separately produced component which can be placed in a mold such that the first material becomes over-molded by the material of the handle body 640. This component of the boss 660, e.g., a drive insert (not shown), can include a hole passing through its center axis which has a cross-section corresponding to the third section 238 of the stem 116. Alternatively, the drive insert or third section 238 can be, e.g., pressed into, welded into, glued, or secured by means other than over-molding. In some embodiments, one or more keyways (not shown) on an outer surface of the drive insert along axial paths parallel to the vertical axis $A_4$ of the stem 116 can be used to secure the drive insert relative to the handle body 640. The one or more keyways of the drive insert can correspond to keyways manufactured into the coincident surface of the handle body 640 (not shown).

The embodiment including the keyway(s) may be advantageous when keys are tailored to fail in shear at a given load applied to the handle body 640 while rotating the valve internals, e.g., the stem 116 and the disc 112, of the butterfly valve 100. For example, the keys can be configured to withstand a predetermined amount of shear force which is less than the shear force the handle body 640 can withstand. Thus, when a force greater than the predetermined shear force is applied to the handle body 640, rather than the handle body 640 failing in shear, one or more of the keys can fail in shear to prevent damage to the handle body 640. In particular, before the shear force the handle body 640 can withstand is reached, one or more of the keys can fail to prevent damage to the handle body 640. In some embodiments, the keys can be, e.g., square, round, rectangular, or of any shape that allows the keys to resist shear loads generated by operation of the butterfly valve 100. In some embodiments, the geometry of the keys may be molded or manufactured into the handle body 640 and/or the drive insert as an integral feature of the handle body 640 or drive insert of the boss 660. The boss 660 further includes a step 662 protruding therefrom which can interlock relative to the cog 124 of the body assembly 102 to limit the amount of rotation permitted by the handle assembly 638.

The handle body 640 defines a proximal end 664 relative to the vertical axis $A_{21}$ and a distal end 666 positioned away from the vertical axis $A_{21}$. The proximal end 664 defines a substantially circular configuration. The distal end 666 can define a rectangular cross-section. However, it should be understood that in some embodiments, other configurations of the distal end 666 cross-section can be used, e.g., square, round, rectangular, semi-circular, and the like.

The handle body 640 can include a shrouding volume 668 which encloses the internals near the proximal end 664. In particular, the handle body 640 can include a cavity 670 and a shrouding volume 668 extending along the bottom surface 652 of the handle body 640 such that the inner volume of the handle body 640 can be substantially hollow and surrounded by side walls. The upper surface 650 of the proximal end 664 can include two protrusions 672 or notches extending therefrom parallel to the vertical axis $A_{21}$ and extending from an edge of the bottom surface 652 of the shrouded volume 668. Each of the two protrusions 672 can define a face that creates two rounded points 674 with a rounded bridging area 675 bridging the points 674. Each of the two protrusions 672 can be positioned approximately 180 degrees relative to each other along the outer surface of the proximal end 664. A plane (not shown) passing through both protrusions 672 would therefore be perpendicular to the axis created by the length $L_6$ of the handle body 640. As the handle assembly 638 rotates the disc 112 relative to the body assembly 102, the protrusions 672 can rotate and align relative to the visual indicators 184 on the body indicator bezel 108 to indicate to a user the position of the butterfly valve 100, e.g., a closed position, a fully open position, or an angle or degree of a partially open position. In particular, the protrusions 672 or notches on the handle body 640 can partially surround the visual indicators 184 on the body indicator bezel 108 and can provide a greater visibility in indicating a precise position of the disc 112 relative to the body 106.

As will be discussed in greater detail below, the shrouded volume 668 and/or cavity 670 of the handle body 640 can be configured and dimensioned to receive therein the force ring 128, the lever/grip 642, and the spring 136 of FIG. 70. The cross-section along the length $L_6$ of the handle body 640 can vary accordingly to contain the inner components of the handle assembly 638, e.g., the force ring 128, the lever/grip 642 and the spring 136. The handle body 640 can include a second cavity 676 on the upper surface 650 from a mid-point of the handle body 640 to the distal end 666. The handle body 640 further includes an internal passage 678 connecting the cavity 670 with the second cavity 676. The second cavity 676 includes a pin 677 extending in a direction parallel to the vertical axis $A_{21}$ configured and dimensioned to receive thereon the spring 136. As will be described in greater detail below, during assembly, the lever/grip 642 can be passed through the internal passage 678 such that the lever/grip 642 can move between the inner surfaces of the internal passage 678 to allow actuation of the handle assembly 638. The spring 136 can maintain a force against a portion of the lever/grip 642 to require a user to depress the spring 136 by pressing onto the lever/grip 642 for actuation of the handle assembly 638.

The handle body 640 also includes a pin hole 680 extending horizontally through the handle body 640. In particular, the pin hole 680 can extend through the handle body 640 along a plane (not shown) defined by the length $L_6$ of the handle body 640. Further, the pin hole 680 can extend through the handle body 640 along a longitudinal axis $A_{22}$. The longitudinal axis $A_{22}$ can be perpendicular relative to the vertical axis $A_{21}$. The pin hole 680 can be configured and dimensioned to receive therein the pivot pin 644 of FIG. 70 to create a pivot point for the lever/grip 642 when assembled with the handle body 640. The pivot pin 644 can also be used to secure the location of the lever/grip 642 relative to the handle body 640.

A length $L_6$ of the handle body 640 can be dimensioned such that a user can apply a load to one end of the handle assembly 638, e.g., a distal end 666, and create a rotation of the stem 116 and disc 112 within the body 106. In particular, the handle body 640 can be attached to the stem 116 that intersects the body 106 and on the third section 238 of the stem 116 which extends beyond the outer envelope of the body 106. A load can be applied along the length $L_6$ of the handle body 640 at a distance from the vertical axis $A_{21}$, e.g., the butterfly valve 100 centerline, such that a moment can be created about the stem 116 axis, e.g., the vertical axis $A_4$. As the handle body 640 moves through an approximately 90 degree arc, the stem 116 can rotate through a corresponding angle to position the butterfly valve 100 in, e.g., an open position, a partially open position, or a closed position. In some embodiments, the handle body 640 can include designations along the upper surface 650 on the proximal end 664 to indicate which direction the handle body 640 may be rotated in to, e.g., open or close the butterfly valve 100. For example, the designations can be "OPEN" and "CLOSE" with arrows pointing in the appropriate direction of rotation to perform each action as shown in FIG. 24.

Figure 73:
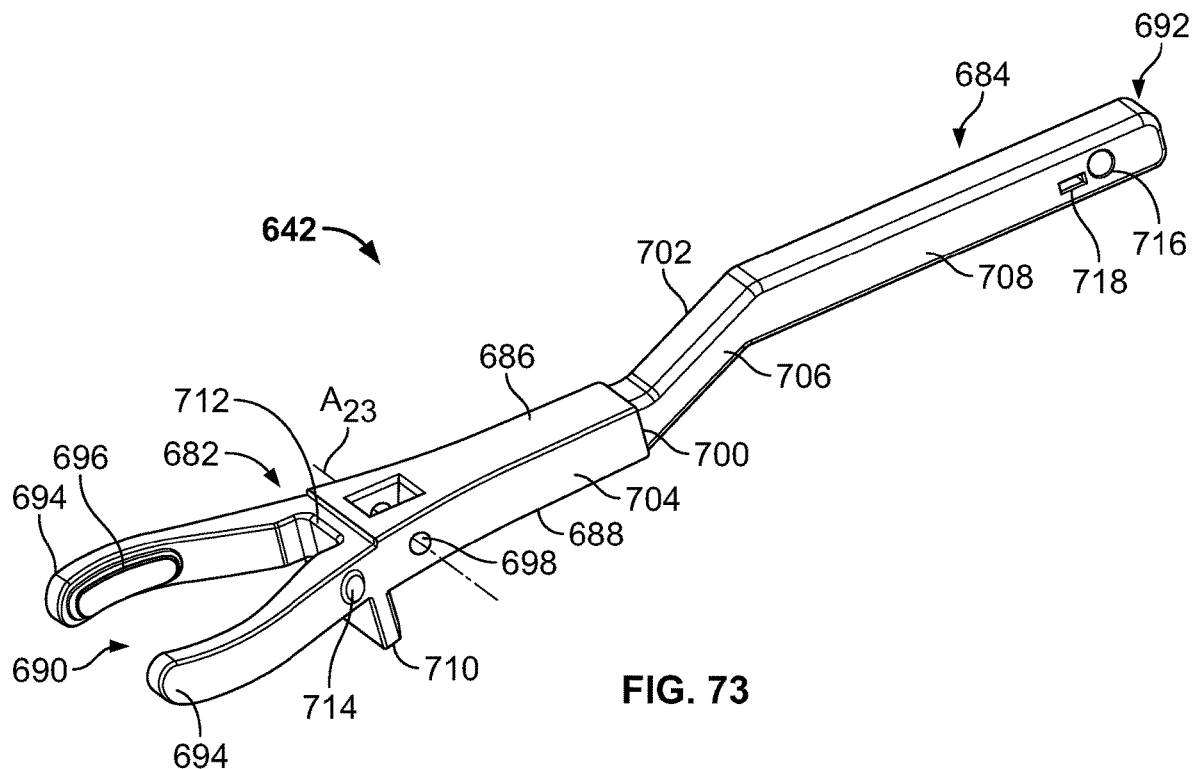
FIG. 73 shows a top, perspective view of a lever/grip of an exemplary butterfly valve according to the present disclosure.

FIG. 73 shows a top, perspective view of a lever/grip 642 of a handle assembly 638. The lever/grip 642 can be configured as a single-piece component which defines a lever section 682 and a grip section 684. The lever/grip 642 defines an upper surface 686 and a bottom surface 688, as well as a proximal end 690 and a distal end 692. The proximal end 690 can include the portion of the lever section 682 which is positioned closest to the vertical axis $A_1$ during assembly with the body assembly 102 and the distal end 692 can include the portion of the grip section 684 extending away from the vertical axis $A_1$ during assembly with the body assembly 102.

The lever section 682 includes two arms 694, e.g., fixed arms, extending from the body of the lever/grip 642 and defining the proximal end 690 of the lever section 682. Each of the arms 694 can include a protrusion 696, e.g., a boss, extending therefrom along an inner surface of the arms 694. The protrusions 696 can be configured and dimensioned to straddle and/or mesh with the side slots 342 or grooves of the force ring 128 such that the force ring 128 can be detachably interlocked relative to the lever section 682 of the lever/grip 642 via, e.g., a snap fit. It should be understood that the space created between the protrusion 696 on each arm 694 of the lever section 682 can be configured and dimensioned slightly smaller than the diameter of the force ring 128 to create a force against the force ring 128 when the force ring 128 has been interlocked with the arms 694 of the lever section 682. The lever section 682 includes a pin hole 698 extending therethrough along a longitudinal axis $A_{23}$ which can be positioned substantially perpendicular to the vertical axis $A_1$ of the force ring 128. Thus, when inserted within the handle body 640, the pin hole 698 along the longitudinal axis $A_{23}$ can be aligned with the pin hole 680 of the handle body 640 and a pivot pin 644 can be used to intersect the pin hole 698 and the pin hole 680 to secure the lever/grip 642 relative to the handle body 640.

At the distal end 700 of the lever section 682, the grip section 684 can connect to the lever section 682 via an angled portion 702 such that the grip section 684 is located on a plane offset from the plane of the lever section 682. During assembly, the lever/grip 642 can be passed through the internal passage 678 of the handle body 640 such that the lever section 682 of the lever/grip 642 is positioned within the cavity 670, the grip section 684 is positioned within the second cavity 676, and the angled portion 702 connecting the lever section 682 and the grip section 684 can be positioned within the internal passage 678 to permit movement of the lever/grip 642 at the angled portion 702 between the inner surfaces of the internal passage 678. In particular, the outer surfaces 704 of the sides of the lever section 682, running perpendicular to the pin hole 698 and the sides of the arms 694, can be configured and dimensioned to fit within the cavity 670 of the handle body 640. The outer surfaces 706 of the angled portion 702 can be configured and dimensioned to fit within the internal passage 678 and to permit movement of the lever/grip 642 therein. In particular, the angled portion 702 can move between an upper inner surface and a lower inner surface of the internal passage 678 as the grip section 684 is depressed by a user, while the lever/grip 642 pivots about the pin 644. The outer surfaces 708 of the grip section 684 can be configured and dimensioned to pass through the internal passage 678 and fit within the second cavity 676 of the handle body 640. The spring 136 positioned around the pin 677 of the handle body 640 can maintain a force against the bottom surface 688 of the grip section 684 such that a user is required to depress the spring 136 by pressing the grip section 684 in the direction of the handle body 640 to actuate the handle assembly 638. In particular, actuation of the handle assembly 638 can occur by depressing the grip section 684 from the top of the handle body 640. In some embodiments, the surfaces parallel to the direction of the pin hole 698, e.g., the pivot hole, can include differing features. For example, the upper surface 686 of the lever/grip 642 can be essentially flat with indentations to facilitate manufacture of the lever/grip 642. The opposing face, e.g., the bottom surface 688, can include one or more protruding ribs 710 which can aid in positioning the lever/grip 642 relative to the force ring 128 and/or the cog 124.

In addition to the interlocking between the slots 342 of the force ring 128 and the protrusions 696 of the lever section 682, in some embodiments, an additional interface between the lever section 682 and the force ring 128 can aid in interlocking and/or aligning the force ring 128 relative to the lever section 682. In particular, the lever section 682 can include an interior space 712 located between the arms 694 and where the yoke arms 694 meet the center of the lever section 682 configured and dimensioned to receive therein the protrusion 696, e.g., an extrusion, of the force ring 128 extending off the outer surface 330 of the force ring 128. The protrusion 338 on the force ring 128 can be positioned above the group of splines 334 and can be centered between the slots 342 or grooves which mate with the protrusions 696 of the lever section 682. Although discussed herein as implemented with the force ring 128, in some embodiments, the lever/grip 642 can be configured to connect relative to the force ring 128' of FIG. 28.

The fit between the interior space 712 and the protrusion 338 of the force ring 128 can be essentially planar and close to minimize independent rotational movement of the lever section 682 with respect to the force ring 128. The lever section 682 can also be fit closely to the interior cavity 670 of the handle body 640 near the planar interface of the force ring 128 and the lever section 682 to facilitate creating a minimal amount of independent movement between the lever section 682 and/or the lever/grip 642 and the handle body 640. In some embodiments, the lever section 682 can include a boss 714 protruding on each side of the lever section 682. The boss 714 can act as a centering means for centering or ensuring a correct positioning of the lever section 682 and/or the lever/grip 642 within the handle body 640. The meshing of the components of the lever section 682 and the force ring 128 advantageously provides an interface between the lever section 682 and the force ring 128 which substantially reduces the handle rotational load being transferred through the groove or pin arrangement used to apply a force from squeezing the lever/grip 642 to disengage the cog 124 and the force ring 128.

In some embodiments, additional holes or slots and additional components, e.g., a pin or a shaped component roughly corresponding to a slot in the force ring 128 (not shown) can be used to create an interface for load transfer and mobility of the force ring 128 relative to the rotation of the lever/grip 642. In particular, the lever/grip 642 can be mechanically interlocked relative to the force ring 128 and can pivot about the angled portion 702 to lift the force ring 128 off of the cog 124, thereby disengaging the mechanical ability of the force ring 128 and the cog 124 to impede rotation of the stem 116. In some embodiments, the lever/grip 642 can lift the force ring 128 off of the cog 124 while maintaining the force ring 128 in a substantially horizontal or level orientation relative to the cog 124, while allowing the yoke portion of the lever section 682 and the lever section 682 to travel in an arc centered about the pivot pin 644. The handle assembly 638 can then be used to rotate the stem 116 and, thereby, the disc 112, to position the butterfly valve 100 in, e.g., an open position, a closed position, or partially open positions.

In some embodiments, alternative configurations of the lever section 682 of the lever/grip 642 can be used to create a mechanically-interlocking interface relative to the force ring 128. The alternative embodiments for the interface of the force ring 128 and the lever section 682 create different geometries that can facilitate the same or an essentially similar result of moving the cog 124 juxtaposed to the force ring 128 during engagement or disengagement.

With respect to the grip section 684, the bottom surface 688 and the upper surface 686 can be flat such that the bottom surface 688 can align with the inner surface of the second cavity 676 when the grip section 684 is depressed. In some embodiments, the upper surface 686 of the grip section 684 can define a rounded configuration to match the contour of a palm of a user operating the handle assembly 638. The rounded upper surface 686 can create a comfortable surface against which a user can provide a force to depress the grip section 684 relative to the handle body 640. In particular, a user's fingers can wrap around the handle body 640 and the grip section 684 and the grip section 684 can be depressed against the second cavity 676 inner surface by tightening the hand against the upper surface 686 of the grip section 684 and compressing the internal spring 136. Squeezing of the grip section 684 disengages the splines 288 of the cog 124 relative to the splines 334 of the force ring 128 by moving the angled portion 702 downward at the internal passage 678, which in turn forces the lever section 682 of the lever/grip 642 to pivot at the pin 644. Pivoting of the lever section 682 lifts the force ring 128 off of the cog 124 such that the handle assembly 638 can be rotated relative to the cog 124 and body assembly 102.

In some embodiments, the lever section 682 can lift the force ring 128 off of the cog 124 while maintaining the force ring 128 in a substantially horizontal or level orientation relative to the cog 124, while allowing the yoke portion of the lever section 682 and the lever section 682 to travel in an arc centered about the pin 644. Releasing the grip section 684 forces the spring 136 between the grip section 684 and the handle body 640 to expand, which raises the grip section 684 and the angled portion 702 within the internal passage 678, which in turn forces the lever section 682 and the grip section 684 to pivot about the pin 644. The force ring 128 can thereby be lowered against the cog 124 and the splines 288 of the cog 124 can interlock with the splines 334 of the force ring 128 to lock the handle assembly 638 and the disc 112 relative to the body assembly 102 in the desired position. In some embodiments, rather than fully lifting the force ring 128 off of the cog 124, the force ring 128 can be partially lifted off of the cog 124 such that the splines 288 of the cog 124 and the splines 334 of the force ring 128 can ratchet over each other.

In some embodiments, the grip section 684 includes one or more bores 716 adjacent to the distal end 692 strategically placed to allow a user to insert a lock or a similar device (not shown) to inhibit rotation of the grip section 684 around its pivot point. For example, a lock can be inserted into the bore 716 to prevent the grip section 684 from being depressed into the handle body 640, thereby preventing the grip section 684 from pivoting about the pin 644, which in turn prevents the lever section 682 from pivoting about the pin 644. The lock blocks movement of the grip section 684 into the handle body 640, thereby not allowing the splines 288 of the cog 124 and the splines 334 of the force ring 128 to be disengaged. Operation of the butterfly valve 100, e.g., changing the position of the handle assembly 638 relative to the body assembly 102, can thereby be prevented until the lock has been removed from the bore 716. Similarly, in some embodiments, the grip section 684 includes one or more slots 718, e.g., rectangular slots, oval slots, and the like, adjacent to the distal end 692 to allow a user to insert a wire and/or cable in place of or in combination with the lock discussed above to prevent depression of the grip section 684 relative to the handle body 640.

Figure 74:
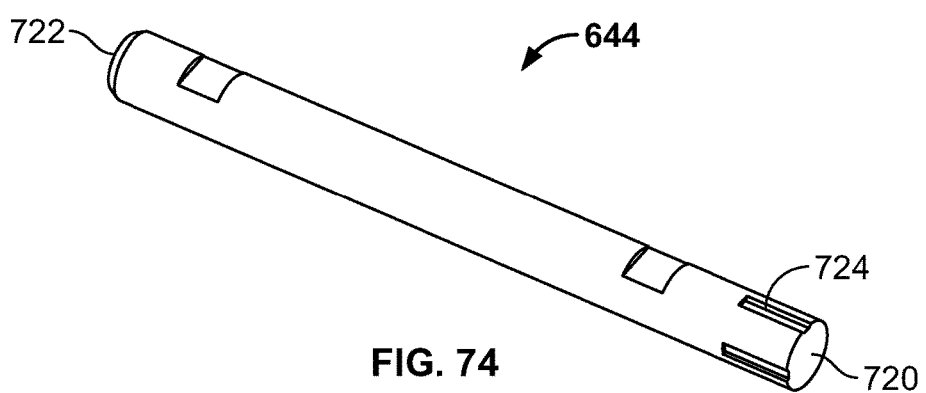
FIG. 74 is a perspective view of a pin of an exemplary butterfly valve according to the present disclosure.

FIG. 74 shows a perspective view of a pin 644 for implementation with the handle assembly 638. The pin 644 can define a cylindrical shape which further defines a first end 720 and a second end 722. The first end 720 can include one or more circumferentially spaced ribs 724, e.g., crush ribs, extending therefrom. The ribs 724 can assist assembly of the handle assembly 638 by providing a press fit between the pin 644 and the pin hole 680 of the handle body 640. For example, insertion of the pin 644 into the pin hole 680 can crush or bend the ribs 724 to create an interference fit of the pin 644 within the pin hole 680. The second end 722 can be chamfered to aid in insertion of the pin 644 into the pin hole 680 of the handle body 640.

Figure 75:
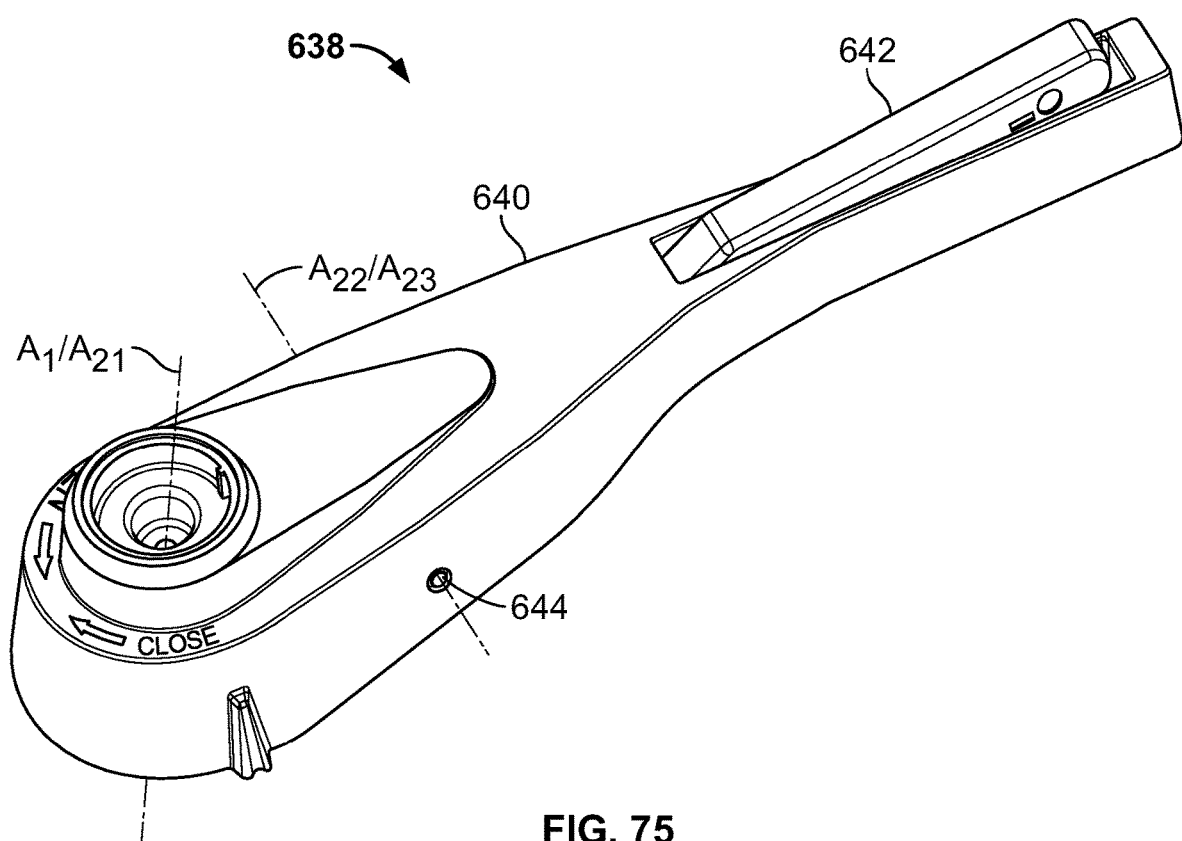
FIG. 75 is a top, perspective view of a handle assembly of an exemplary butterfly valve according to the present disclosure.
Figure 76:
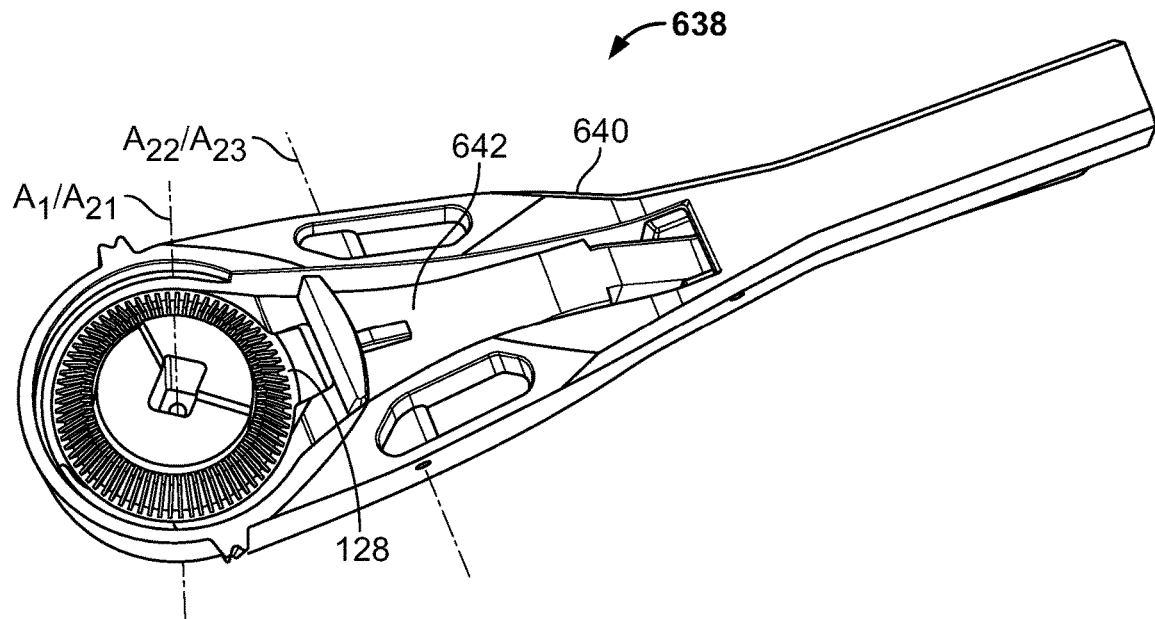
FIG. 76 is a bottom, perspective view of a handle assembly of an exemplary butterfly valve according to the present disclosure.
Figure 77:
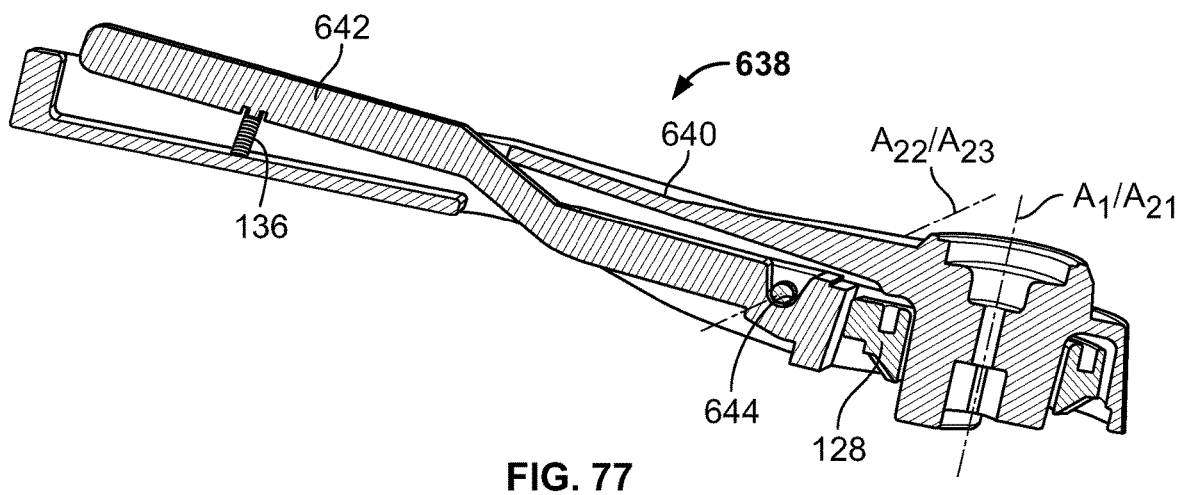
FIG. 77 is a cross-sectional, side view of a handle assembly of an exemplary butterfly valve according to the present disclosure.

FIGS. 75-77 show top perspective, bottom perspective and side cross-sectional views of an assembled handle assembly 638. As discussed above, the force ring 128 can initially be interlocked relative to the lever section 682 of the lever/grip 642. The spring 136 can be positioned onto the pin 677 within the second cavity 676 of the handle body 640. The grip section 684 of the lever/grip 642 can further be passed through the internal passage 678 of the handle body 640 up to the angled portion 702 and the grip section 684 can be positioned over the spring 136. In some embodiments, the bottom surface 688 of the grip section 684 can include a pin protruding therefrom around which the spring 136 can be positioned. The spring 136 can thereby be maintained in the desired position between the handle body 640 and the grip section 684. The pin 644 can then be passed into the pin hole 680 of the handle body 640 and through the pin hole 698 of the lever/grip 642 to interlock the lever/grip 642 with the handle body 640 at the pivot point created by the pin 644.

In the normal or default position, the spring 136 can be expanded, thereby forcing the lever/grip 642 to pivot about the pin 644 which positions the angled portion 702 of the lever/grip 642 against the upper inner surface of the internal passage 678, i.e., an edge formed by the cavity 670. The normal or default position of the lever/grip 642 also positions the force ring 128 against the cog 124 such that the splines 334 of the force ring 128 and the splines 288 of the cog 124 interlock to maintain the position of the disc 112 and the stem 116 relative to the body 106. To change the position of the disc 112 and the stem 116 relative to the body 106, the handle assembly 638 can be actuated by depressing the grip section 684 and the spring 136 against the second cavity 676 which, in turn, positions the angled portion 702 of the lever/grip 642 against the lower inner surface of the internal passage 678, i.e., an edge formed by the second cavity 676. Depressing the grip section 684 can pivot the lever section 682 at the pin 644 to lift the force ring 128 off of the cog 124 and disengage the splines 334 and 288 such that the handle assembly 638 can be rotated relative to the body assembly 102 to change a position of the disc 112 or stem 116. Once the desired position has been obtained, the grip section 684 of the lever/grip 642 can be released and the spring 136 can force the lever/grip 642 back into the normal or default position which, in turn, pivots the lever section 682 about the pin 644 and lowers the force ring 128 onto the cog 124 to interlock the splines 334 and 288. Undesired rotation of the handle assembly 638 relative to the body assembly 102 can thereby be prevented.

While exemplary embodiments have been described herein, it is expressly noted that these embodiments should not be construed as limiting, but rather that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

The invention claimed is:

1. A butterfly valve, comprising:
a body assembly, the body assembly including a body, a disc rotationally disposed inside an opening of the body, a bearing disposed inside the disc and the body, and a stem passing through the disc, the bearing and the body; and
a seal retainer positioned within a corresponding disc bore in the disc and a corresponding liner bore in a liner,
wherein the bearing includes an internal bearing edge provided as an internal bearing step,
wherein the stem includes a first external stem edge,
wherein the first external stem edge forms a step, the step abutting and engaging the internal bearing step when the butterfly valve is assembled to retain the stem along a vertical axis and prevent stem blowout from the body along the vertical axis,
wherein the stem includes a second external stem edge to engage the seal retainer to position the seal retainer within the corresponding liner bore in the liner,
wherein the stem defines a first section and a second section connected at the first external stem edge, and a third section connected to the second section at the second external stem edge, and
wherein the first section, the second section, and the third section of the stem define different external configurations.

2. The butterfly valve according to claim 1, wherein the body comprises a blind hole aligned with the corresponding disc bore and the corresponding liner bore.

3. The butterfly valve according to claim 2, wherein the seal retainer is positioned against the body.

4. The butterfly valve according to claim 1, wherein the body comprises a through hole aligned with the corresponding disc bore and the corresponding liner bore for passage of the seal retainer therethrough.

5. The butterfly valve according to claim 1, wherein the first section defines a round external configuration, the second section defines a hexagonal external configuration, and the third section defines a square external configuration.

6. The butterfly valve according to claim 5, wherein a central portion of the corresponding disc bore defines an internal configuration complementary to the second section of the stem.

7. The butterfly valve according to claim 6, wherein the bearing defines a first internal configuration complementary to the second section of the stem and a second internal configuration complementary to the third section of the stem.

8. The butterfly valve according to claim 1, wherein the stem includes no fluid seals positioned around a stem shaft.

9. A method of assembling a butterfly valve, comprising:
providing a body assembly, the body assembly including a body defining an opening, a disc, a bearing, a liner, and a stem, wherein (a) the bearing includes an internal bearing step, (b) the stem includes a first external stem edge forming a step, (c) the stem defines a first section and a second section connected at the first external stem edge, and a third section connected to the second section at a second external stem edge, and (d) the first section, the second section, and the third section of the stem define different external configurations,
positioning a seal retainer within a disc bore in the disc, positioning the disc within the opening of the body, passing the stem through a body bore and the disc bore,
positioning the seal retainer within a corresponding liner bore in the liner by engaging the seal retainer with the second external stem edge of the stem when passing the stem through the body bore and the disc bore, and
positioning the bearing through the body bore and around the stem to abut and engage the internal bearing step of the bearing with the step of the stem when the butterfly valve is assembled to retain the stem along a vertical axis and prevent stem blowout from the body along the vertical axis.

10. The method according to claim 9, wherein the step of positioning the seal retainer within the disc bore in the disc comprises aligning a blind hole in the body with the liner bore in the liner and the disc bore in the disc.

11. The method according to claim 10, comprising passing the seal retainer partially through the liner bore and against the body.

12. The method according to claim 9, wherein the step of positioning the seal retainer within the disc bore in the disc comprises passing the seal retainer through a through hole in the body aligned with the liner bore in the liner and the disc bore in the disc.

13. A butterfly valve, comprising:
a body assembly, the body assembly including a body, a disc rotationally disposed inside an opening of the body, a bearing disposed inside the disc and the body, a gland, and a stem passing through the disc, the bearing and the body; and
a seal retainer positioned within a corresponding disc bore in the disc and a corresponding liner bore in a liner,
wherein the bearing includes an internal bearing step,
wherein the stem includes a first external stem edge forming a step to abut and engage the internal bearing step when the butterfly valve is assembled to retain the stem along a vertical axis and prevent stem blowout from the body along the vertical axis, and
wherein the gland is positioned against an internal surface of the body to prevent stem blowout from the body,
wherein the stem includes a second external stem edge to engage the seal retainer to position the seal retainer within the corresponding liner bore in the liner,
wherein the stem defines a first section and a second section connected at the first external stem edge, and a third section connected to the second section at the second external stem edge, and
wherein the first section, the second section, and the third section of the stem define different external configurations.

14. The butterfly valve according to claim 13, wherein the gland positioned against the internal surface of the body limits movement of the stem within the body in a direction parallel to the vertical axis of the stem.

15. The butterfly valve according to claim 13, wherein the gland positioned against the internal surface of the body limits movement of the seal retainer in the direction parallel to the vertical axis of the stem.

16. The butterfly valve according to claim 13, wherein the gland is positioned against an upper surface of the bearing.

17. The butterfly valve according to claim 13, wherein the gland maintains a position of the stem within the body without providing a seal between the stem and the body.

18. A method of assembling a butterfly valve, comprising:
providing a body assembly, the body assembly including a body defining an opening, a disc, a bearing, a liner, a gland, and a stem, wherein (a) the bearing includes an internal bearing step, (b) the stem includes a first external stem edge forming a step, (c) the stem defines a first section and a second section connected at the first external stem edge, and a third section connected to the second section at a second external stem edge, and (d) the first section, the second section, and the third section of the stem define different external configurations, positioning a seal retainer within a disc bore in the disc, positioning the disc within the opening of the body, passing the stem through a body bore and the disc bore, positioning the seal retainer within a corresponding liner bore in the liner by engaging the seal retainer with the second external stem edge of the stem when passing the stem through the body bore and the disc bore, positioning the bearing through the body bore and around the stem to abut and engage the internal bearing step of the bearing with the step of the stem when the butterfly valve is assembled to retain the stem along a vertical axis and prevent stem blowout from the body along the vertical axis, and positioning the gland against an internal surface of the body to prevent stem blowout from the body.

19. The method according to claim 18, comprising limiting movement of the stem within the body in a direction parallel to the vertical axis of the stem by positioning the gland against the internal surface of the body.

20. The method according to claim 18, comprising limiting movement of the seal retainer within the body in a direction parallel to the vertical axis of the stem by positioning the gland against the internal surface of the body.

21. A butterfly valve, comprising:
a body assembly, the body assembly including (i) a body, (ii) a disc rotationally disposed inside an opening of the body, (iii) a bearing disposed inside the disc and the body, (iv) a stem passing through the disc, the bearing and the body, and (v) a seal retainer positioned within a corresponding disc bore in the disc and a corresponding liner bore in a liner,
wherein the bearing includes an internal bearing edge,
wherein the stem includes a first external stem edge to engage the internal bearing edge to prevent stem blowout from the body,
wherein the stem includes a second external stem edge to engage the seal retainer to position the seal retainer within the corresponding liner bore in the liner,
wherein the stem defines a first section and a second section connected at the first external stem edge, and a third section connected to the second section at the second external stem edge, and
wherein the first section, the second section, and the third section of the stem define different external configurations.

22. A method of assembling a butterfly valve, comprising:
providing a body assembly, the body assembly including (i) a body defining an opening, (ii) a disc, (iii) a bearing, (iv) a stem, (v) a seal retainer, and (vi) a liner, wherein (a) the bearing includes an internal bearing edge, (b) the stem includes a first external stem edge to engage the internal bearing edge, (c) the stem defines a first section and a second section connected at the first external stem edge, and a third section connected to the second section at a second external stem edge, and (d) the first section, the second section, and the third section of the stem define different external configurations,
positioning the seal retainer within a corresponding disc bore in the disc and a corresponding liner bore in the liner, the stem including a second external stem edge to engage the seal retainer to position the seal retainer within the corresponding liner bore in the liner, positioning the disc within the opening of the body, passing the stem through a body bore and the disc bore, and positioning the bearing through the body opening and around the stem to engage the internal bearing edge of the bearing with the first external stem edge to prevent stem blowout from the body.

23. A butterfly valve, comprising:
a body assembly, the body assembly including (i) a body defining a threaded counter bore, (ii) a disc rotationally disposed inside an opening of the body, (iii) a bearing disposed inside the disc and the body, the bearing including an internal bearing step, (iv) a gland having threads, (v) a stem passing through the disc, the bearing and the body, and (vi) a seal retainer positioned within a corresponding disc bore in the disc and a corresponding liner bore in a liner,
wherein the stem includes a first external stem edge forming a step to abut and engage the internal bearing step when the butterfly valve is assembled to retain the stem along a vertical axis and prevent stem blowout from the body along the vertical axis,
wherein the gland threadedly engages the threaded counter bore and is positioned against an internal surface of the body to prevent stem blowout from the body,
wherein the stem includes a second external stem edge to engage the seal retainer to position the seal retainer within the corresponding liner bore in the liner,
wherein the stem defines a first section and a second section connected at the first external stem edge, and a third section connected to the second section at the second external stem edge, and
wherein the first section, the second section, and the third section of the stem define different external configurations.

24. A method of assembling a butterfly valve, comprising:
providing a body assembly, the body assembly including a body defining a threaded counter bore and an opening, a disc, a bearing, a liner, a gland having threads, a stem, and a seal retainer, wherein (a) the bearing includes an internal bearing step, (b) the stem includes a first external stem edge forming a step, (c) the stem defines a first section and a second section connected at the first external stem edge, and a third section connected to the second section at a second external stem edge, and (d) the first section, the second section, and the third section of the stem define different external configurations,
positioning the seal retainer within a disc bore in the disc,
positioning the disc within the opening of the body,
passing the stem through a body bore and the disc bore,
positioning the seal retainer within a corresponding liner bore in the liner by engaging the seal retainer with the second external stem edge of the stem when passing the stem through the body bore and the disc bore,
positioning the bearing through the body bore and around the stem,
engaging the threads of the gland with the threaded counter bore, and
positioning the gland against an internal surface of the body to prevent stem blowout from the body.

* * * * *